(12) United States Patent
Tanabe et al.

(10) Patent No.: US 11,888,376 B2
(45) Date of Patent: Jan. 30, 2024

(54) ROTARY ELECTRIC MACHINE UNIT HAVING ROTARY ELECTRIC MACHINE WITH COOLING PART AND ELECTRIC POWER CONVERSION DEVICE

(71) Applicant: DENSO CORPORATION, Kariya (JP)

(72) Inventors: Ryota Tanabe, Kariya (JP); Yuta Hashimoto, Kariya (JP); Tomohisa Sano, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 459 days.

(21) Appl. No.: 17/154,697

(22) Filed: Jan. 21, 2021

(65) Prior Publication Data

US 2021/0175771 A1 Jun. 10, 2021

Related U.S. Application Data

(63) Continuation of application No. PCT/JP2019/022083, filed on Jun. 4, 2019.

(30) Foreign Application Priority Data

Jul. 25, 2018 (JP) .................................. 2018-139475

(51) Int. Cl.
*H02K 5/20* (2006.01)
*H02K 11/33* (2016.01)
*H02K 5/22* (2006.01)

(52) U.S. Cl.
CPC ............... *H02K 5/203* (2021.01); *H02K 5/20* (2013.01); *H02K 5/225* (2013.01); *H02K 11/33* (2016.01)

(58) Field of Classification Search
CPC ............ H02K 5/20; H02K 5/203; H02K 9/19; H02K 9/193; H02K 11/30; H02K 11/33
See application file for complete search history.

(56) References Cited

U.S. PATENT DOCUMENTS

| 5,533,943 | A | 7/1996 | Ichioka et al. | |
| 2004/0090130 | A1 | 5/2004 | Kaneko et al. | |
| 2007/0284157 | A1* | 12/2007 | Heller | H02K 7/006 |
| | | | | 180/54.1 |
| 2013/0049495 | A1 | 2/2013 | Matsuo | |
| 2013/0278090 | A1* | 10/2013 | Matsuo | H02K 9/193 |
| | | | | 310/54 |

(Continued)

FOREIGN PATENT DOCUMENTS

| JP | 2002016202 A | * | 1/2002 |
| JP | 2005224008 A | * | 8/2005 |

OTHER PUBLICATIONS

Okochi, Machine Translation of JP2002016202, dated Jan. 2002 (Year: 2002).*

(Continued)

*Primary Examiner* — Eric Johnson
(74) *Attorney, Agent, or Firm* — Oliff PLC

(57) ABSTRACT

A rotary electric machine unit including a rotary electric machine, and an electric power conversion device having a plurality of power modules. The rotary electric machine includes a stator, a rotor, and a housing. The housing includes a housing flow path through which a refrigerant flows. The power modules of the electric power conversion device and the rotary electric machine are configured to be cooled by the refrigerant.

17 Claims, 45 Drawing Sheets

(56) References Cited

U.S. PATENT DOCUMENTS

| | | |
|---|---|---|
| 2014/0070639 A1 | 3/2014 | Tamura |
| 2015/0199376 A1 | 7/2015 | Matsuo |
| 2015/0214857 A1* | 7/2015 | Kosuga .................... B60L 3/04 318/400.26 |
| 2016/0105084 A1 | 4/2016 | Ishimaru et al. |
| 2018/0347675 A1 | 12/2018 | Kawahara et al. |
| 2019/0229584 A1 | 7/2019 | Shinozaki et al. |

OTHER PUBLICATIONS

Kuno, Machine Translation of JP2005224008, dated Aug. 2005 (Year: 2005).*

U.S. Appl. No. 17/155,729, filed Jan. 22, 2021 in the name of Tomohisa Sano et al.

U.S. Appl. No. 17/155,174 filed Jan. 22, 2021 in the name of Tomohisa Sano et al.

* cited by examiner

FIG. 44
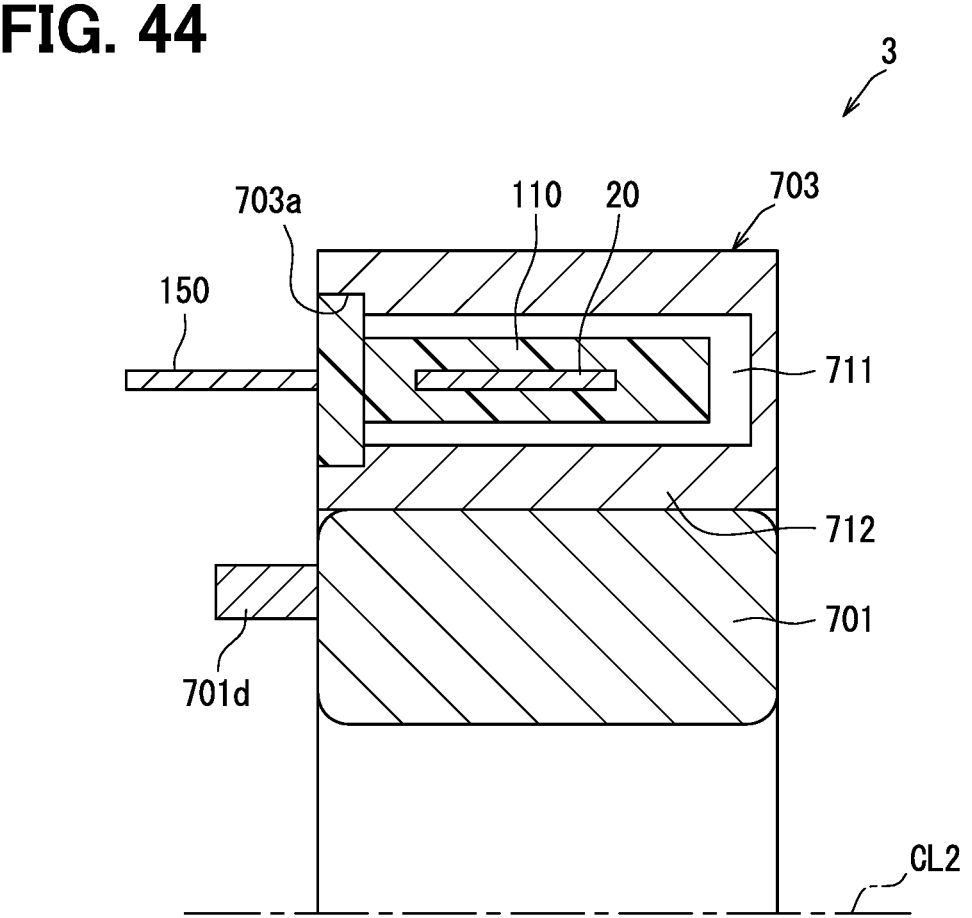
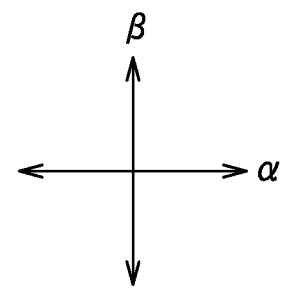

ROTARY ELECTRIC MACHINE UNIT HAVING ROTARY ELECTRIC MACHINE WITH COOLING PART AND ELECTRIC POWER CONVERSION DEVICE

CROSS REFERENCE TO RELATED APPLICATIONS

The present application is a continuation application of International Patent Application No. PCT/JP2019/022083 filed on Jun. 4, 2019, which designated the U.S. and claims the benefit of priority from Japanese Patent Application No. 2018-139475 filed on Jul. 25, 2018. The entire disclosures of all of the above applications are incorporated herein by reference.

TECHNICAL FIELD

The present disclosure relates to a rotary electric machine unit.

BACKGROUND

For example, a rotary electric machine unit has an electric motor as a rotary electric machine, an electric power conversion device that converts an electric power to be supplied to the electric motor from DC power to AC power, and a cooling device that cools the electric motor and the electric power conversion device. The cooling device may be formed into a tubular shape as a whole, and the electric motor may be accommodated in an internal space of the cooling device. The electric power conversion device may be packaged into a rectangular parallelepiped shape and be attached to an outer peripheral surface of the cooling device. The cooling device may cool the outer peripheral surface of the electric motor and the contact surface with the electric power conversion device.

SUMMARY

The present disclosure describes a rotary electric machine unit including a rotary electric machine, and an electric power conversion device having a plurality of power modules. The rotary electric machine includes a stator, a rotor, and a housing. The housing includes a housing flow path through which a refrigerant flows. The power modules of the electric power conversion device and the rotary electric machine are configured to be cooled by the refrigerant.

BRIEF DESCRIPTION OF DRAWINGS

Features and advantages of the present disclosure will become more apparent from the following detailed description made with reference to the accompanying drawings.

FIG. 44 is a cross-sectional view of a housing around power modules in a direction orthogonal to a circumferential direction.

DETAILED DESCRIPTION

Figure 1:
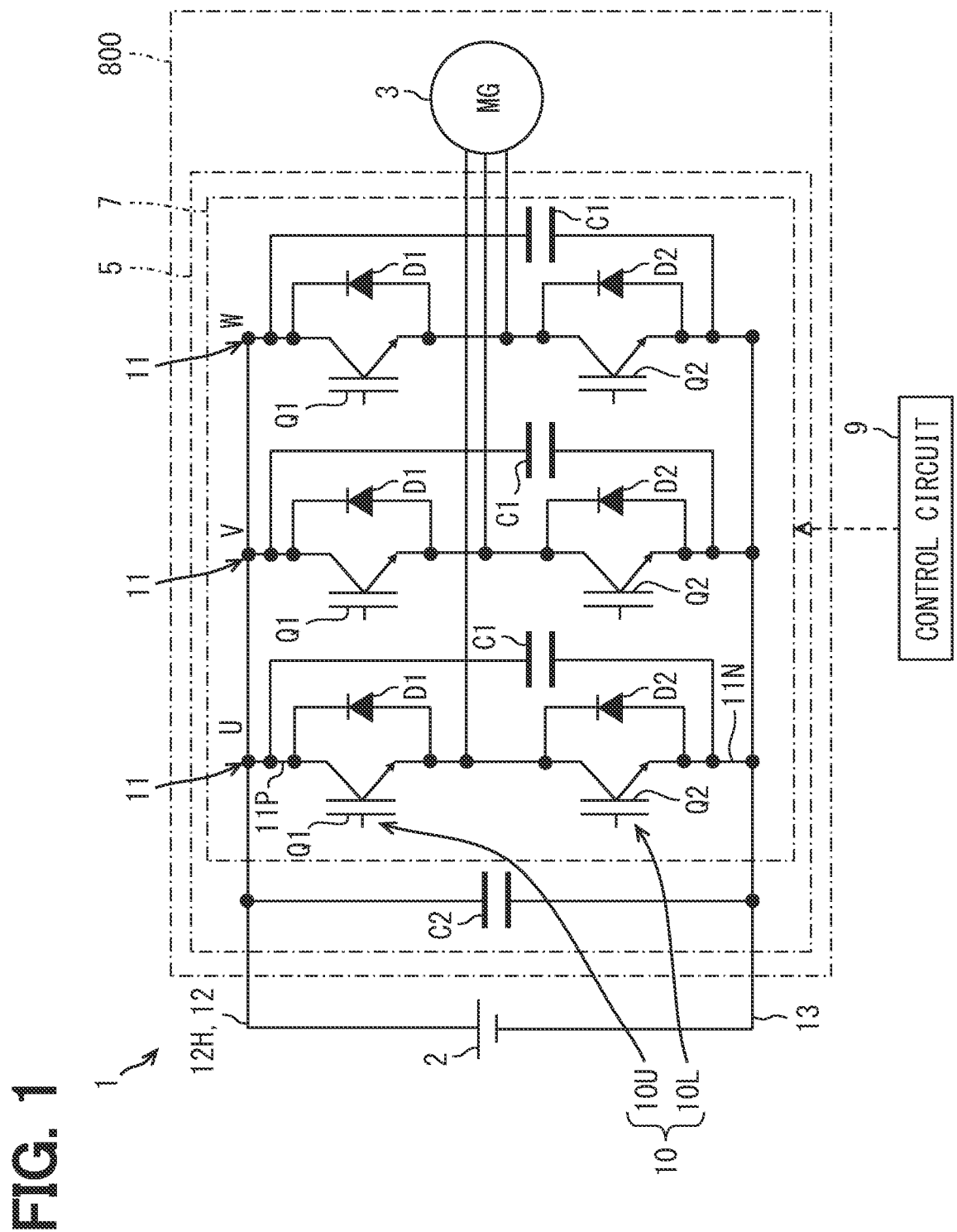
FIG. 1 is an equivalent circuit diagram showing a drive system to which an electric power conversion device according to a first embodiment is applied.

A rotary electric machine unit, for example, has an electric motor as a rotary electric machine, an electric power conversion device that converts an electric power to be supplied to the electric motor from DC power to AC power, and a cooling device that cools the electric motor and the electric power conversion device. The cooling device may be formed into a tubular shape as a whole, and the electric motor may be accommodated in an internal space of the cooling device. The electric power conversion device may be packaged into a rectangular parallelepiped shape and be attached to an outer peripheral surface of the cooling device. The cooling device may cool the outer peripheral surface of the electric motor and the contact surface with the electric power conversion device.

In such a rotary electric machine unit, however, when heat is generated due to its driving, it is considered that the temperature of each part is not uniform, and hence there are a part where the temperature readily rises and a part where the temperature does not readily rise. In an electric power conversion device, therefore, in a configuration where a surface of a package of the electric power conversion device is simply attached to the outer peripheral surface of a cooling device, the cooling effect is likely to be insufficient in the part where the temperature readily rises. Further, in the rotary electric machine, since the outer peripheral surface is covered with the electric power conversion device, the cooling effect is insufficient. As such, there is a concern that the cooling effects of the rotary electric machine and the electric power conversion device constituting the rotary electric machine unit are insufficient.

A rotary electric machine unit according to a first aspect includes: a rotary electric machine that has an annular stator, a rotor disposed on an inner side of the stator, and a housing accommodating the stator and the rotor therein; and an electric power conversion device that converts an electric power to be supplied to the rotary electric machine from DC power to AC power. The electric power conversion device includes a plurality of power modules having semiconductor devices constituting upper and lower arm circuits and being attached to the housing individually from each other. The housing includes: a housing flow path through which a refrigerant flows; a first cooling part that extends along an outer peripheral surface of the stator and cools the rotor with the refrigerant flowing in the housing flow path; and a second cooling part that cools the power modules with the refrigerant flowing in the housing flow path. The plurality of power modules are arranged along the second cooling part in a circumferential direction about a centerline of the rotor.

According to the first aspect, since the first cooling part of the housing extends along the outer peripheral surface of the stator, the first cooling part can cool the stator in a wider range. Further, since the plurality of power modules, which are separately attached to the housing, are arranged along the second cooling part of the housing, the plurality of power modules can be individually cooled by the second cooling part. In addition, each of power modules can be individually arranged at a location or in a position so that the cooling effect by the second cooling unit is enhanced. Therefore, the cooling effect of the power module by the second cooling unit is readily enhanced. Accordingly, the cooling effect can be enhanced for both of the rotary electric machine and the electric power conversion device.

Moreover, the plurality of power modules are arranged in the circumferential direction about the centerline. A direction in which the center line extends is referred to as an axial direction. Each of the power modules can be arranged adjacent to one end of the housing in the axial direction. Therefore, in a structure in which connection terminals of the stator are arranged adjacent to an end of the rotary electric machine, each power module can be arranged at a position as close as possible to the connection terminals. In such a case, since electric wirings connecting the power module and the rotary electric machine can be shortened as much as possible, the heat generated from the electric wirings can be reduced. In this way, since the heat generated in the rotary electric machine unit is reduced, the cooling effect in the rotary electric machine unit can be further enhanced.

A rotary electric machine unit according to a second aspect includes: a rotary electric machine that has an annular stator, a rotor disposed on an inner side of the stator, and a housing accommodating the stator and the rotor therein; and an electric power conversion device that converts an electric power to be supplied to the rotary electric machine from DC power to AC power. The housing includes: a housing flow path that extends along an outer peripheral surface of the stator and allows a refrigerant to flow therein; and a housing cooling part that cools the rotor with the refrigerant flowing through the housing flow path. The electric power conversion device includes a plurality of power modules that include semiconductor devices constituting upper and lower arm circuits, are attached to the housing individually from each other and along the housing flow path, and are oriented such that one surface of each semiconductor device is adjacent to the housing. The electric power conversion deice further includes a module cooling unit that includes a module flow path being in communication with the housing flow path and extending along a rear surface of each semiconductor device opposite to the one surface, and cools the semiconductor devices with the refrigerant flowing in the module flow path.

According to the second aspect, since the housing cooling part is extended along the outer peripheral surface of the stator, the stator can be cooled by the housing cooling part in a wider range, in a similar manner to the first cooling part of the first aspect.

In addition, in each of the power modules, the module flow path of the module cooling unit is extended along the rear surface of the semiconductor device. Therefore, the semiconductor device can be directly cooled by the module cooling part. In this way, a cooling operation of the semiconductor device by the module cooling part is performed inside of the power module. Therefore, the entirety of the power module can be cooled from its inside together with the semiconductor device. As such, the cooling effect can be enhanced for both of the rotary electric machine and the electric power conversion device, in the similar manner to the first aspect as described above.

A rotary electric machine according to a third aspect includes: a rotary electric machine that has an annular stator, a rotor disposed on an inner side of the stator, and a housing accommodating the stator and the rotor therein; and an power conversion device that converts an electric power to be supplied to the rotary electric machine from DC power to AC power. The housing includes: a housing flow path that extends along an outer peripheral surface of the stator and allows a refrigerant to flow therein; and a housing cooling part that cools the rotor with the refrigerant flowing through the housing flow path. The electric power conversion device includes a plurality of power modules that include semiconductor devices constituting upper and lower arm circuits. Each of the semiconductor devices has one surface and a rear surface opposite to the one surface in a thickness direction. The plurality of power modules are attached to the housing individually from each other and arranged along the housing flow path such that the housing flow path is located on both the one surface and the rear surface of each semiconductor device, and the semiconductor device is cooled with the refrigerant flowing in the housing flow path.

According to the third aspect, since the housing cooling part is extended along the outer peripheral surface of the stator, the stator can be cooled by the housing cooling part in a wider range, in a similar manner to the first cooling part of the first aspect. In addition, the housing flow path is located to face both of the one surface and the rear surface of the semiconductor device, the power module can be cooled from both sides by the refrigerant flowing in the housing flow path. As such, the cooling effect of the power modules by the refrigerant is readily enhanced. As such, the cooling effect can be enhanced for both of the rotary electric machine and the electric power conversion device, in the similar manner to the first aspect as described above.

Multiple embodiments will be described with reference to the drawings. In the multiple embodiments, functionally and/or structurally corresponding parts are given the same reference numerals. Hereinafter, a thickness direction of a semiconductor device 20 is referred to as a Z direction, and a direction that is orthogonal to the Z direction and along which semiconductor devices 200 in one power module 110 are arranged is referred to as an X direction. A direction orthogonal to both of the Z direction and the X direction is referred to as a Y direction. Unless otherwise specified, a shape along an XY plane including the X direction and the Y direction is referred to as a planar shape.

First Embodiment

An electric power conversion device and a motor unit of the present embodiment can be, for example, employed to a vehicle, such as an electric vehicle (EV) or a hybrid vehicle (HV). Hereinafter, an example in which the electric power conversion device and the motor unit are employed to the hybrid vehicle will be described.

(Drive System)

First, a schematic configuration of a drive system to which an electric power conversion device and a motor unit are applied will be described with reference to FIG. 1.

As shown in FIG. 1, a drive system 1 of a vehicle includes a DC power supply 2, a motor generator 3, an electric power conversion device 5 that converts electric power between the DC power supply 2 and the motor generator 3.

The DC power supply 2 is a secondary battery capable of charging and discharging, such as a lithium ion battery or a nickel hydrogen battery. The motor generator 3 is a three-phase alternating current type rotary electric machine. The motor generator 3 is mounted on the vehicle together with an engine, as a traveling drive source. The motor generator 3 may function as an electric generator (alternator) that generates an electric power as being driven by an engine (not shown) and as an electric motor (starter) that starts the engine. The motor generator 3 may also function as the electric generator at the time of regeneration.

The electric power conversion device 5 includes an inverter 7, a control circuit 9, a smoothing capacitor C2, and a filter capacitor. The inverter 7 is a power conversion unit. The inverter 7 is a DC-to-AC conversion unit that converts a DC voltage into an AC voltage. The inverter 7 includes parallel circuits 11 each having an upper and lower arm circuit 10 and a capacitor C1.

The upper and lower arm circuit 10 includes switching elements Q1 and Q2 and diodes D1 and D2. In the present embodiment, as the switching elements Q1 and Q2, n-channel type IGBTs are employed. An upper arm 10U includes the switching element Q1 and a freewheeling diode D1 connected in anti-parallel to the switching element Q1. A lower arm 10L includes the switching element Q2 and a freewheeling diode D2 connected in anti-parallel to the switching element Q2. Note that the switching elements Q1 and Q2 are not limited to the IGBTs. For example, MOSFETs can be employed as the switching elements Q1 and Q2. As the diodes D1 and D2, parasitic diodes can be employed.

The upper arm 10U and the lower arm 10L are connected in series between a VH line 12H and an N line 13, such that the upper arm 10U is positioned adjacent to the VH line 12H. A P line 12 is an electric power line on a high potential side, and includes the VH line 12H is connected to a positive electrode terminal of the DC power supply 2.

The N line 13 is connected to a negative electrode of the DC power supply 2, and is also referred to as a ground line. As described above, the upper and lower arm circuit 10 is provided by the upper arm 10U and the lower arm 10L connected in series between the electric power lines. A semiconductor device 20 described hereinbelow provides one arm.

A collector electrode of the switching element Q1 is connected to the VH line 12H. An emitter electrode of the switching element Q2 is connected to the N line 13. The emitter electrode of the switching element Q1 and the collector electrode of the switching element Q2 are connected to each other.

A positive electrode terminal of the capacitor C1 is connected to the collector electrode of the switching element Q1 of the upper arm 10U. A negative electrode terminal of the capacitor C1 is connected to the emitter electrode of the switching element Q2 of the lower arm 10L. That is, the capacitor C1 is connected in parallel to the corresponding upper and lower arm circuit 10. The parallel circuit 11 includes the upper and lower arm circuit 10 and the capacitor C1 that are connected in parallel. The parallel circuit 11 has common wirings 11P and 11N. A connection point between the upper arm 10U and the positive electrode terminal of the capacitor C1 is connected to the VH line 12H via the common wiring 11P. A connection point between the lower arm 10L and the negative electrode of the capacitor C1 is connected to the N line 13 via the common wiring 11N.

In the present embodiment, the capacitor C1 is provided separately from the smoothing capacitor C2. The capacitor C1 may have a function of supplying electric charges required for switching the switching elements Q1 and Q2 of the upper and lower arm circuit 10, which is connected in parallel to the capacitor C1. Due to the switching, an energy loss occurs, and voltage between both ends of the upper arm and the lower arm drops. Therefore, the insufficient electric charges are supplied from the capacitor C1, which is connected in parallel. For this reason, the capacitance of the capacitor C1 is set to a value sufficiently smaller than the capacitance of the smoothing capacitor C2. For example, the capacitance of the smoothing capacitor C2 is set to 1000 μF, and the capacitance of the capacitor C1 is set to 10 μF to 20 μF. A power module 110, which will be described later, constitutes one parallel circuit 11.

The smoothing capacitor C2 is connected between the VH line 12H and the N line 13. The smoothing capacitor C2 is connected in parallel to the inverter 7. The smoothing capacitor C2 smooths, for example, a DC voltage, and stores the electric charge of the DC voltage. The voltage between the ends of the smoothing capacitor C2 provides a DC high voltage for driving the motor generator 3.

The inverter 7 is connected to the DC power supply 2 via the smoothing capacitor C2. The inverter 7 has three sets of the parallel circuits 11 descried above. That is, the inverter 7 has the upper and lower arm circuits 10 for three phases. The connection point of the upper and lower arm circuit 10 of the V phase is connected to a U phase winding provided in a stator of the motor generator 3. Similarly, the connection point of the upper and lower arm circuit 10 of the V phase is connected to a V phase winding of the motor generator 3. The connection point of the upper and lower arm circuit 10 of the W phase is connected to a W phase winding of the motor generator 3. The connection point of the upper and lower arm circuit 10 of each phase is connected to the winding of the corresponding phase via an output wiring 15 provided for each phase.

In the electric power conversion device 5, the voltage of the DC power supply 2 is applied directly to the inverter 7 without being boosted. In the electric power conversion device 5, a converter may be provided as a DC-DC conversion unit that converts the DC voltage into a DC voltage having a different value. Examples of this converter include a boost converter that is provided between the DC power supply 2 and the inverter 7. In the power conversion device 5 provided with the boost converter, the VH line 12H on the high potential side has, for example, 650V.

Further, in the electric power conversion device 5, a filter capacitor may be connected in parallel with the DC power supply 2. This filter capacitor is connected between the VH line 12H and the N line, and removes power supply noise from, for example, the DC power supply 2. In a case where the electric power conversion device 5 has both the converter and the filter capacitor, the filter capacitor is provided between the DC power supply 2 and the converter, and is arranged on the low voltage side than the smoothing capacitor C2. In this case, the filter capacitor may also be referred to as a low voltage side capacitor, and the smoothing capacitor may also be referred to as a high voltage side capacitor. The voltage between the ends of the smoothing capacitor C2 is set to be equal to or higher than a voltage between the ends of the filter capacitor. At least one of the N line 13 or the VH line 12H is provided with a system main relay (SMR) (not shown) between the DC power supply 2 and the filter capacitor.

The inverter 7 converts the DC voltage into a three-phase AC voltage in accordance with the switching control by the control circuit 9, and outputs the three-phase AC voltage to the motor generator 3. Thus, the motor generator 3 is driven to generate a predetermined torque. In response to the output of the engine, the inverter 7 can convert the three-phase AC voltage generated by the motor generator 3 into the DC voltage in accordance with the switching control by the control circuit 9, and output the DC voltage to the VH line 12H. In this way, the inverter 7 performs bidirectional electric power conversion between the DC power supply 2 and the motor generator 3.

The control circuit 9 generates a drive instruction for operating the switching elements of the inverter 7, and outputs the drive instruction to a drive circuit (driver), which is not shown. The control circuit 9 generates the drive instruction based on a torque request received from a higher-level ECU (not shown) or signals detected by various sensors.

The various sensors include a current sensor that detects a phase current flowing in the wiring of each phase of the motor generator 3, a rotation angle sensor that detects a rotation angle of the rotor of the motor generator 3, a voltage sensor that detects the voltage between the both ends of the smoothing capacitor C2, that is, the voltage of the VH line 12H. The electric power conversion device 5 has these sensors (not shown). Specifically, the control circuit 9 outputs a PWM signal as the drive instruction. The control circuit 9 includes, for example, a microcomputer.

The drive circuit generates the drive signal based on the drive instruction from the control circuit 9, and outputs the drive instruction to the gate electrodes of switching elements Q1 and Q2 of the corresponding upper and lower arm circuit 10. In this way, the drive circuit drives, that is, turns on and off the switching elements Q1 and Q2. In the present embodiment, the drive circuit is provided for each upper and lower arm circuit 10.

Next, prior to the description of the electric power conversion device 5, the semiconductor device 20 and the power module 110 including the semiconductor device 20 will be described. The semiconductor device 20 and the power module 110 are the components of the electric power conversion device 5.

(Semiconductor Device)

An example of the semiconductor device 20 applicable to the electric power conversion device 5 of the present embodiment will be described. The semiconductor device 20 described hereinafter is configured to provide one of upper arm or lower arm of the upper and lower arm circuit 10, that is, one arm. In other words, the upper and lower arm circuit 10 includes two semiconductor devices 20. The semiconductor device 20 is packaged as one element forming one arm. Thus, such a semiconductor device 20 is also referred to as 1-in-1 package. The semiconductor devices 20 have the same configuration between the upper arm 10U and the lower arm 10L, and thus can be provided as a common part.

Figure 3:
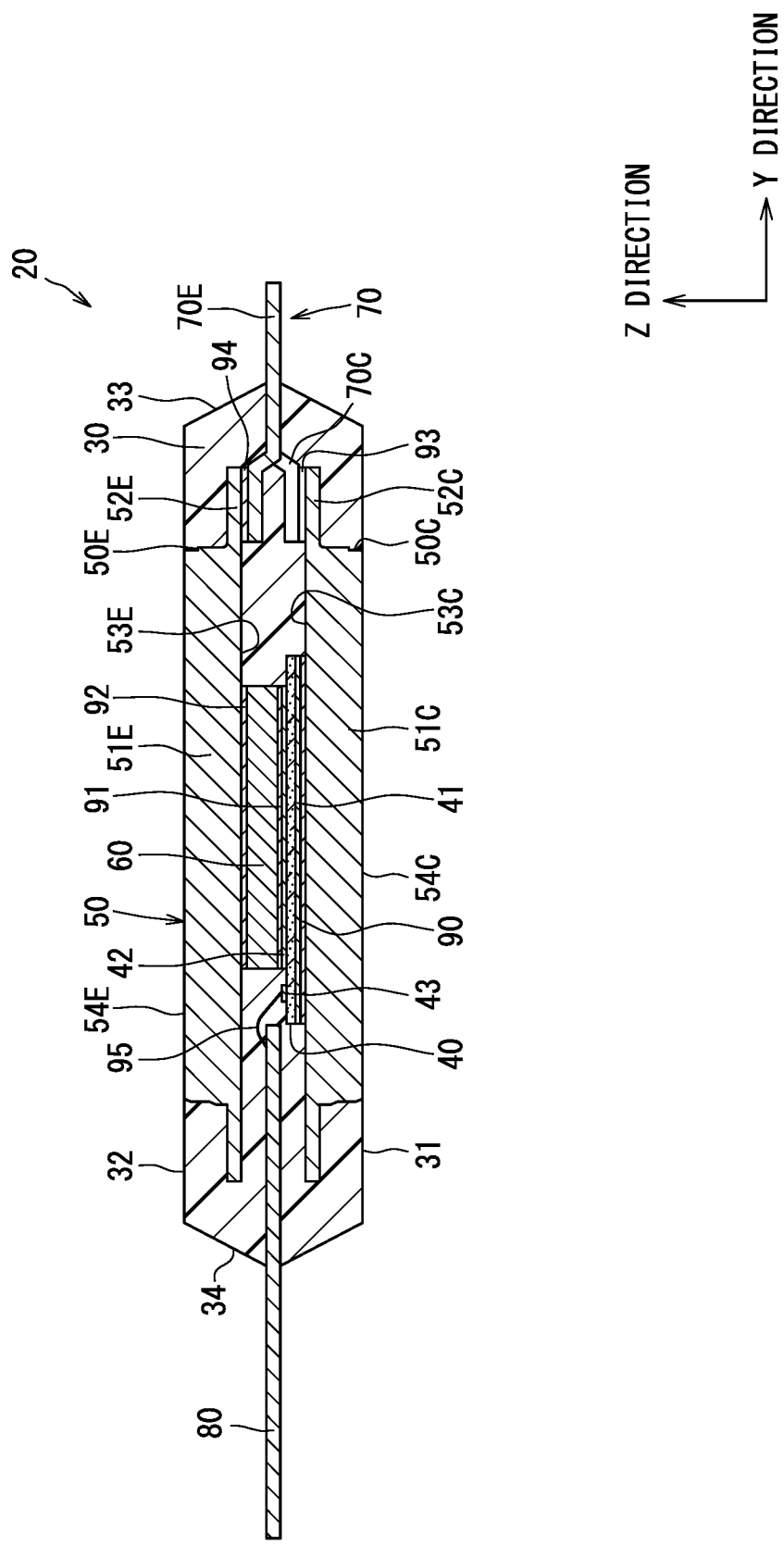
FIG. 3 is a cross-sectional view taken along a line III-Ill in FIG. 2.
Figure 4:
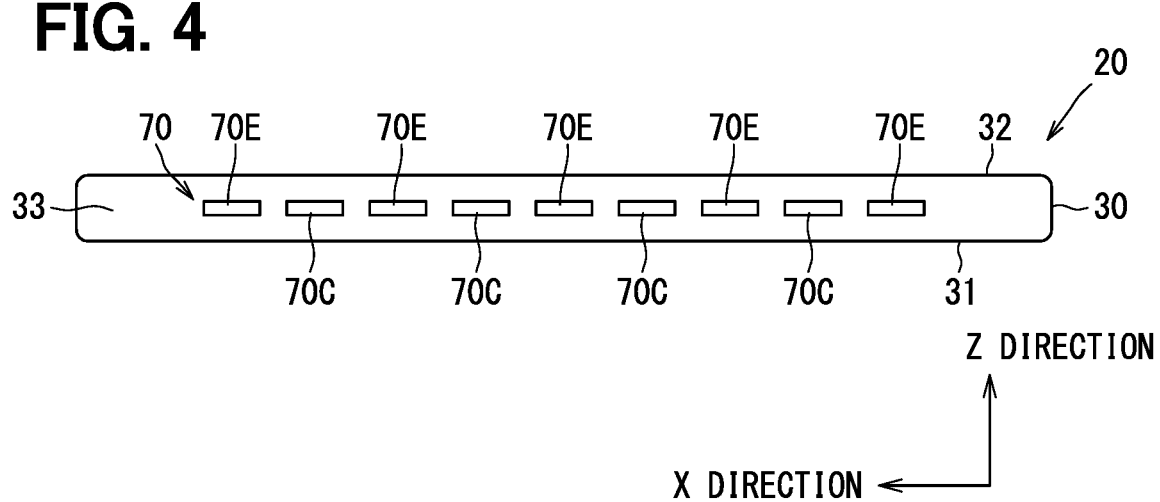
FIG. 4 is a plan view of the semiconductor device when viewed from a main terminal side.
Figure 5:
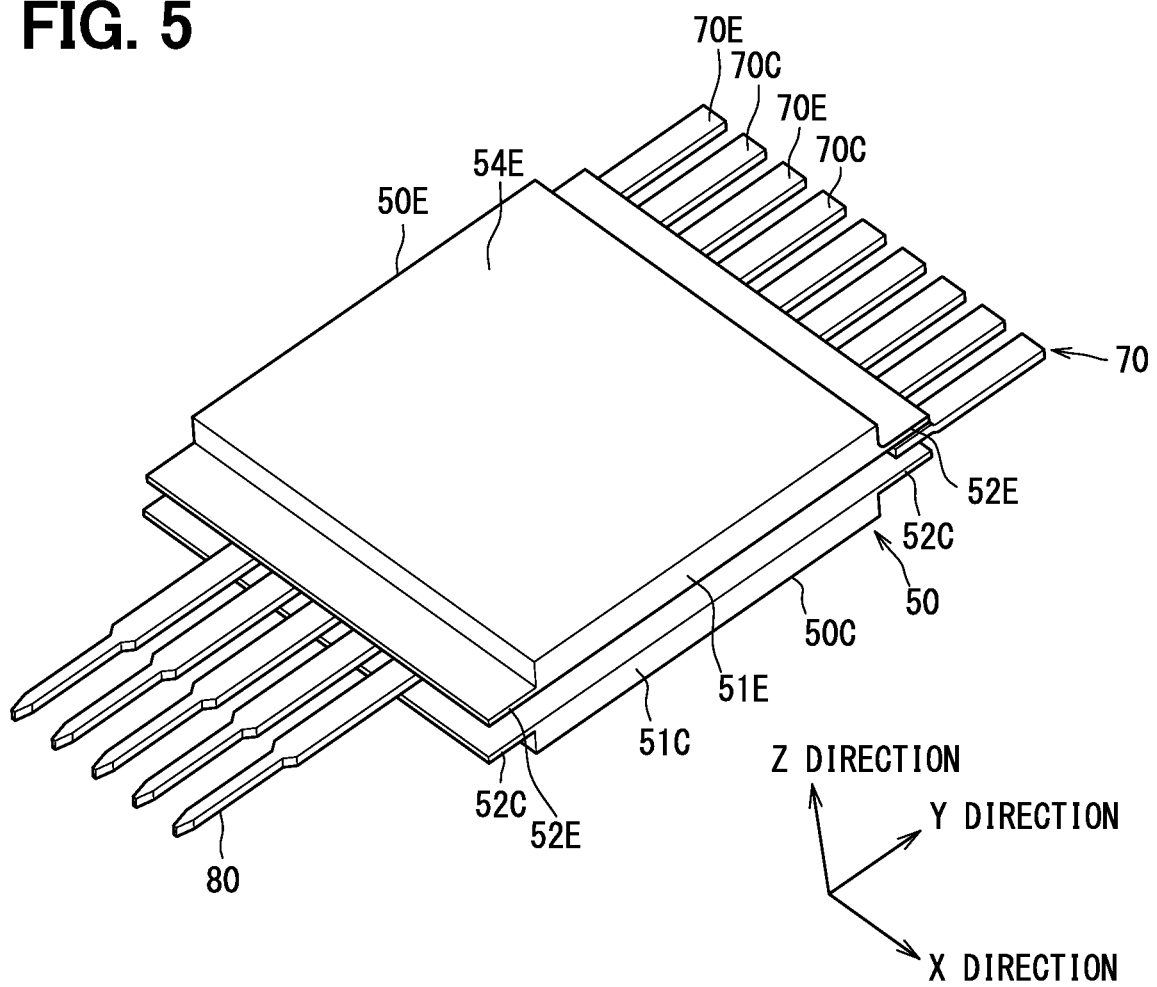
FIG. 5 is a perspective view of the semiconductor device in which a sealing resin body is deleted from the view of FIG. 2.
Figure 6:
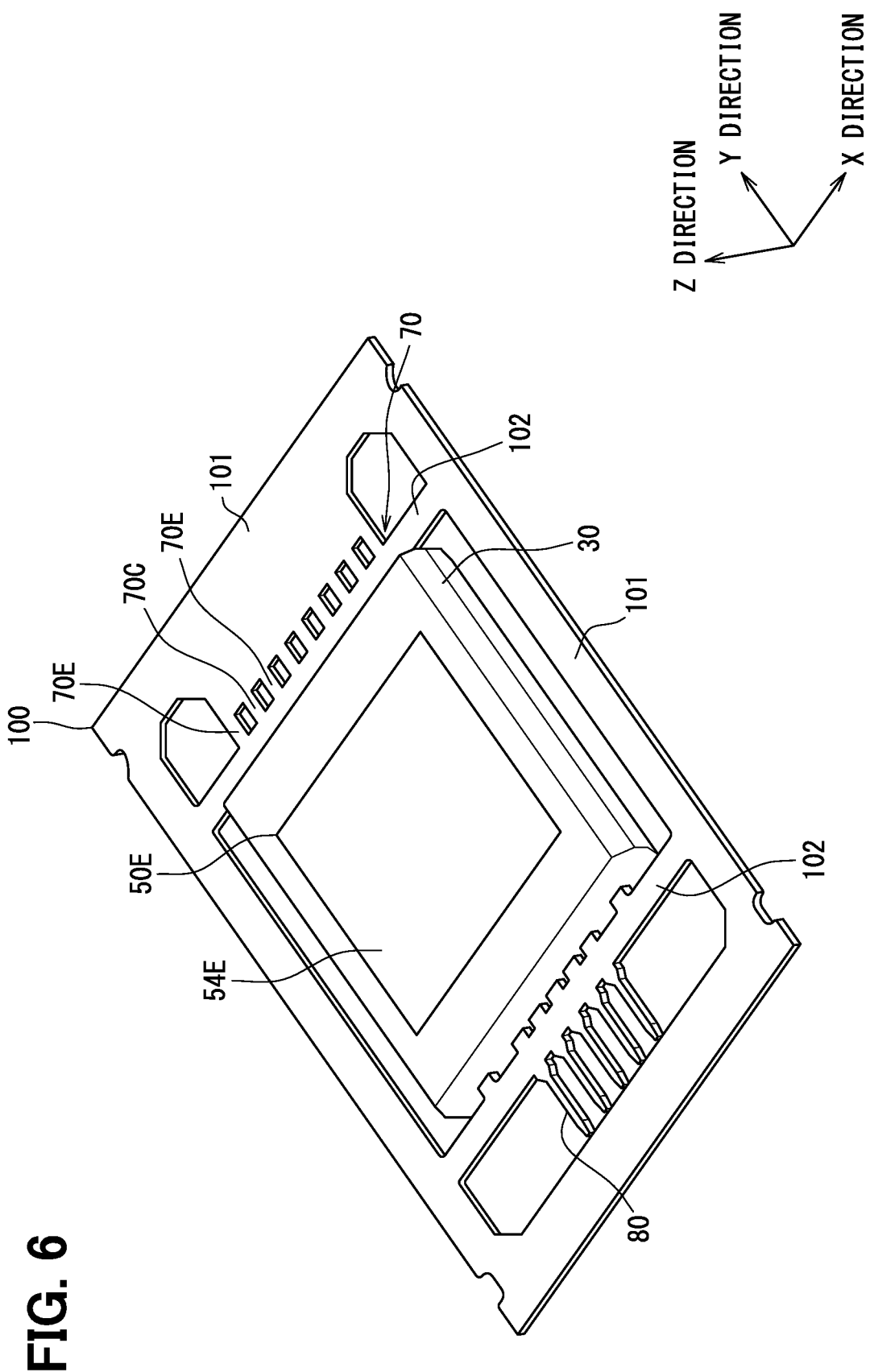
FIG. 6 is a perspective view of a lead frame before an unnecessary portion is cut off.
Figure 7:
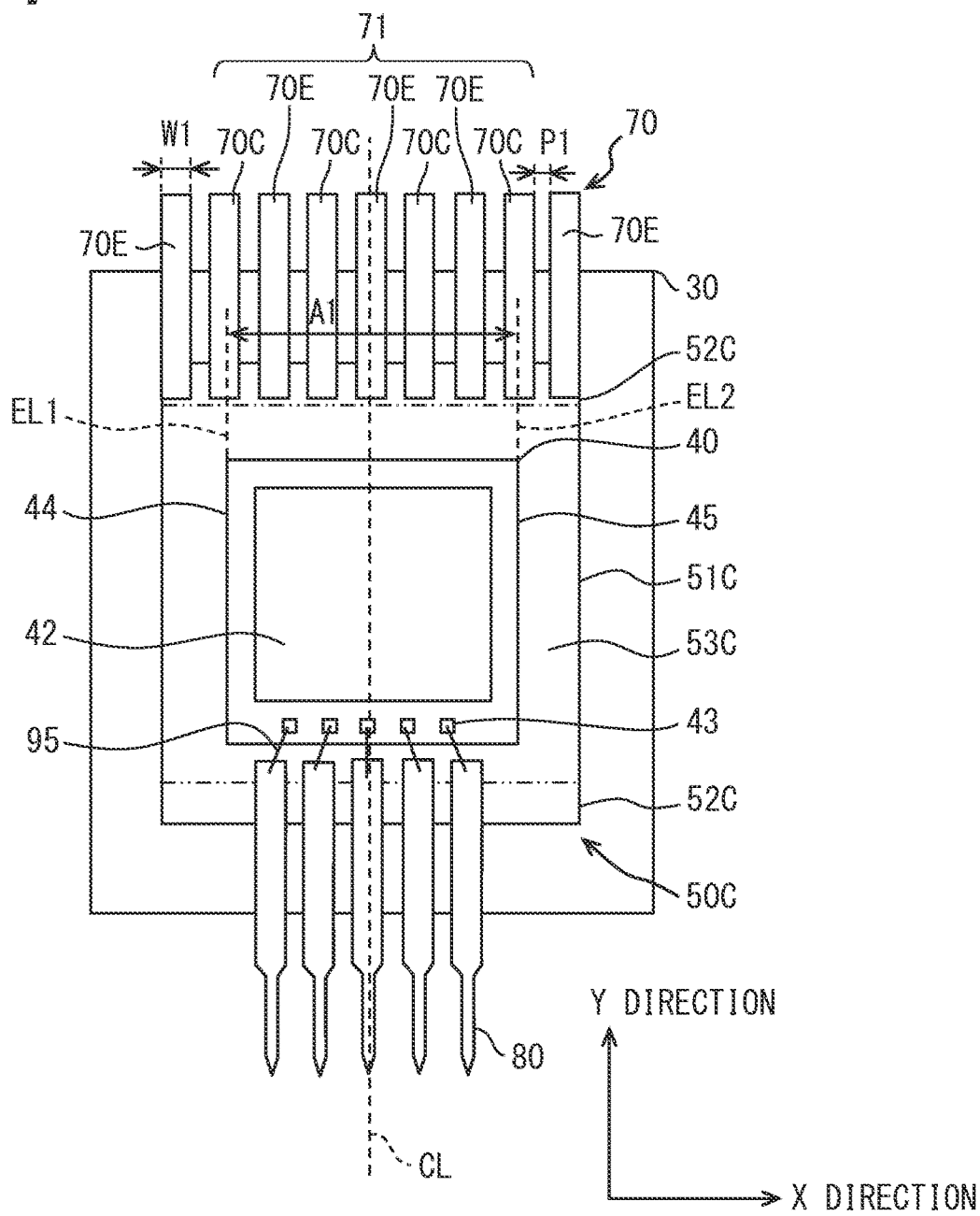
FIG. 7 is a plan view showing a positional relationship between an IGBT and main terminals.

As shown in FIGS. 2 to 7, the semiconductor device 20 includes a sealing resin body 30, a semiconductor chip 40, a conductive member 50, a terminal member 60, a main terminal 70, and a signal terminal 80. FIG. 5 is a view in which the sealing resin body 30 is deleted from the view in FIG. 2. FIG. 6 shows the semiconductor device 20 after the sealing resin body 30 is molded, but before an unnecessary portion of a lead frame 100 is removed. FIG. 7 is a plan view showing a positional relationship between the semiconductor chip 40 and the main terminal 70, and in which a part of the sealing resin body 30, a conductive member 50E, and the terminal member 60 are eliminated and not illustrated.

In a state where the power module 110 including the semiconductor device 20 is arranged on a cooling unit 120 described later, a plate thickness direction of the semiconductor chip 40 is substantially parallel with a Z direction that is a thickness direction of a heat exchange part 123 of the cooling unit 120. An alignment direction of plural main terminals 70 and an alignment direction of plural signal terminals 80 are substantially parallel to the X direction, which is the alignment direction of the plural power modules 110. Therefore, also in the following description, the plate thickness direction of the semiconductor chip 40 is indicated as the Z direction, and the alignment directions of the main terminals 70 and the signal terminals 80 are indicated as the X direction.

Figure 2:
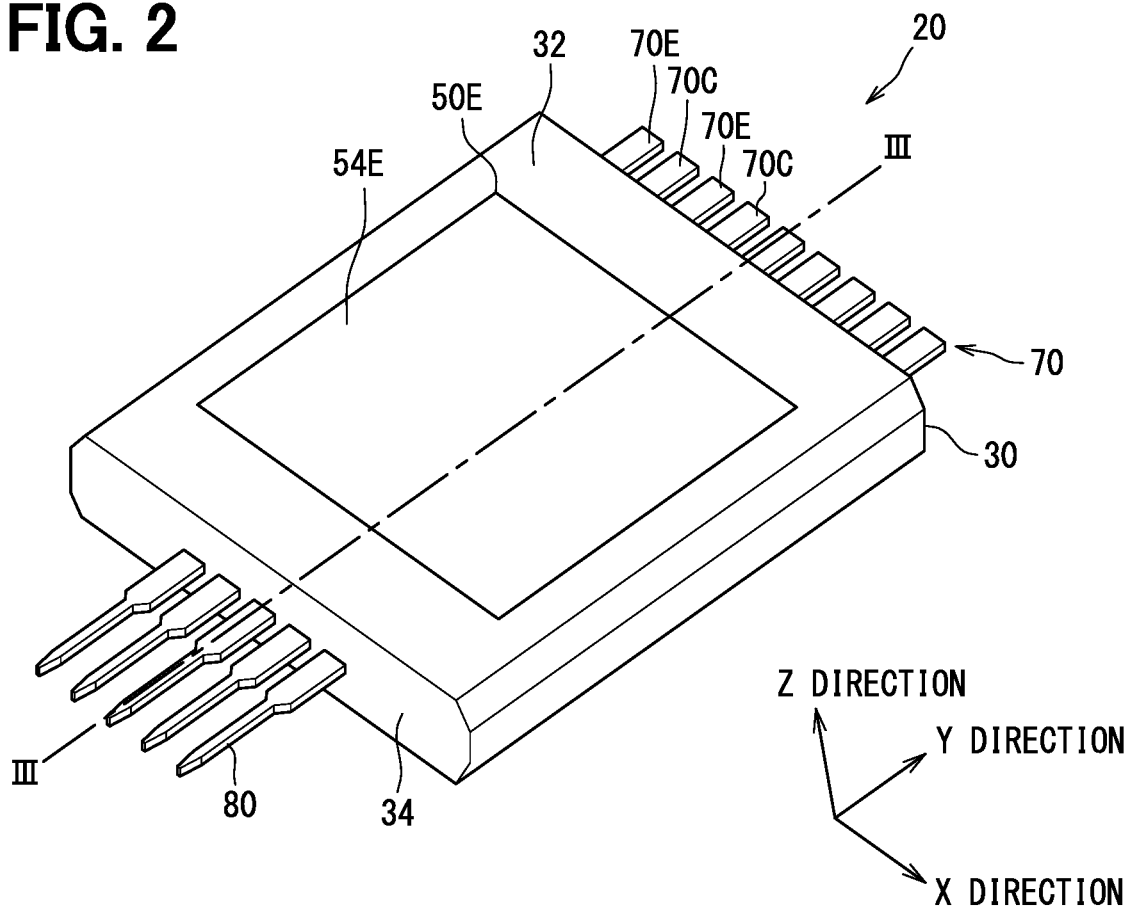
FIG. 2 is a perspective view showing a semiconductor device.

The sealing resin body 30 is made of, for example, an epoxy resin. The sealing resin body 30 is formed by, for example, a transfer molding method. As shown in FIGS. 2 to 4, the sealing resin body 30 has one surface 31 and a rear surface 32 opposite to the one surface 31 in the Z direction, which is parallel to the plate thickness direction of the semiconductor chip 40. The one surface 31 and the rear surface 32 are, for example, flat surfaces. The sealing resin body 30 has a lateral surface connecting the one surface 31 and the rear surface 32. In the present example, the sealing resin body 30 has substantially a rectangular shape in a plan view.

The semiconductor chip 40 is provided by a semiconductor substrate, such as Si, SiC, or GaN substrate, on which elements are formed. The semiconductor device 20 has one semiconductor chip 40. The semiconductor chip 40 is formed with elements (switching element and diode) constituting one arm as described above. That is, an RC (reverse conducting)-IGBT is formed as the elements. For example, when the semiconductor chip 40 is used for the upper arm 10U, the element formed in the semiconductor chip 40 functions as the switching element Q1 and the diode D1. On the other hand, when the semiconductor chip 40 is used for the lower arm 10L, the element formed in the semiconductor chip 40 functions as the switching element Q2 and the diode D2.

The element has a vertical structure so that the main current flows in the Z direction. Although not illustrated, the element has a gate electrode. The gate electrode has a trench structure. As shown in FIG. 3, the semiconductor chip 40 has main electrodes on opposite surfaces in the Z direction. Specifically, the semiconductor chip 40 has, as the main electrodes, a collector electrode 41 on one surface and an emitter electrode 42 on a rear surface opposite to the one surface. The collector electrode 41 also serves as a cathode electrode of the diode, and the emitter electrode 42 also serves as an anode electrode of the diode. The collector electrode 41 is formed in an almost entire region on the one surface. The emitter electrode 42 is formed at a part of the rear surface.

As shown in FIG. 3 and FIG. 7, the semiconductor chip 40 has pads 43 for signal electrodes on the rear surface on which the emitter electrode 42 is formed. The pads 43 are formed in a region different from the emitter electrode 42. The pads 43 are electrically separated from the emitter electrode 42. The pads 43 are formed at an end on the side opposite to the formation region of the emitter electrode 42 in the Y direction.

In the present example, the semiconductor chip 40 has five pads 43. Specifically, the five pads 43 are provided for a gate electrode, a Kelvin emitter for detecting a potential of the emitter electrode 42, a current sense, an anode potential of a temperature sensor (temperature-sensitive diode) for detecting a temperature of the semiconductor chip 40, and a cathode potential. The five pads 43 are collectively formed in an area adjacent to one end in the Y direction in the semiconductor chip 40 having a substantially rectangular planar shape, and are aligned side by side in the X direction.

The conductive member 50 electrically connects the semiconductor chip 40 and the main terminal 70. That is, the conductive member 50 functions as a wiring for the main electrode. In the present example, the conductive member 50 also functions to dissipate heat of the semiconductor chip 40 (element) to the outside of the semiconductor device 20. Therefore, the conductive member 50 is also referred to as a heat sink. The conductive member 50 is formed of at least a metal material such as Cu for securing an electrical conductivity and a thermal conductivity.

The conductive members 50 are arranged in a pair so as to interpose the semiconductor chip 40 therebetween. Each of the conductive members 50 is arranged so as to encompass the semiconductor chip 40 in a projection view in the Z direction. The semiconductor device 20 has, as the pair of the conductive members 50, a conductive member 50C arranged adjacent to the collector electrode 41 of the semiconductor chip 40 and a conductive member 50E arranged adjacent to the emitter electrode 42. The conductive member 50C electrically connects the collector electrode 41 and a main terminal 70C described later. The conductive member 50E electrically connects the emitter electrode 42 and a main terminal 70E described later.

As shown in FIG. 3, FIG. 5, and FIG. 7, the conductive member 50C has a main portion 51C that is a thick portion in the Z direction and an extension portion 52C that is a portion thinner than the main portion 51C. The main portion 51C has a substantially planar shape with a substantially constant thickness. The main portion 51C has a mounting surface 53C adjacent to the semiconductor chip 40 in the Z direction and a heat radiation surface 54C opposite to the mounting surface 53C in the Z direction. The extension portion 52C extends from the end of the main portion 51C in the Y direction. The extension portion 52C extends in the Y direction with the same length in the X direction, that is, the same width as the main portion 51C. A surface of the extension portion 52C adjacent to the semiconductor chip 40 is substantially flush with the mounting surface 53C of the main portion 51C. An opposite surface of the extension portion 52C further from the semiconductor chip 40 is sealed by the sealing resin body 30. The extension portion 52C may be provided at, at least, an end of the conductive member 50C, at which the main terminals 70 are provided. In the present example, the conductive member 50C has the extension portions 52C at both ends of the main portion 51C.

In FIG. 7, a boundary between the main portion 51C and the extension portion 52C is shown by a long dashed double-dotted line.

As shown in FIG. 3 and FIG. 5, the conductive member 50E has a main portion 51E that is a thick portion in the Z direction and an extension portion 52E that is a portion thinner than the main portion 51E. The main portion 51E has the substantially planar shape having the substantially constant thickness. The main portion 51E has a mounting surface 53E adjacent to the semiconductor chip 40 in the Z direction and a heat radiation surface 54E opposite to the mounting surface 53C in the Z direction. The extension portion 52E extends from the end of the main portion 51E in the Y direction. The extension portion 52E extends in the Y direction with the same length in the X direction, that is, the same width as the main portion 51E. A surface of the extension portion 52E adjacent to the semiconductor chip 40 is substantially flush with the mounting surface 53E of the main portion 51E. An opposite surface of the extension portion 52E farther from the semiconductor chip 40 is sealed by the sealing resin body 30. The extension portion 52E may be provided at, at least, an end of the conductive member 50E, at which the main terminals 70 are provided. In the present example, the conductive member 50E has the extension portions 52E at both ends of the main portion 51E. In the present example, the conductive members 50C and 50E are provided by common parts.

The mounting surface 53C of the main portion 51C of the conductive member 50C is connected to the collector electrode 41 of the semiconductor chip 40 via a solder 90. The connection method is not limited to solder joining. Most part of the conductive member 50C is covered with the sealing resin body 30. The heat radiation surface 54C of the conductive member 50C is exposed from the sealing resin body 30. The heat radiation surface 54C is substantially flush with the one surface 31. Of the surfaces of the conductive member 50C, areas other than a connection portion with the solder 90, the heat radiation surface 54C, and portions to which the main terminals 70 are connected are covered with the sealing resin body 30.

The terminal member 60 is located between the semiconductor chip 40 and the conductive member 50E. The terminal member 60 has a substantially rectangular parallelepiped shape. The terminal member 60 has the planar shape (substantially rectangular shape) that substantially coincides with the emitter electrode 42. Since the terminal member 60 is positioned in the middle of an electric conduction and thermal conduction path between the emitter electrode 42 of the semiconductor chip 40 and the conductive member 50E, the terminal member 60 is formed of at least a metal material such as Cu for securing the electric conductivity and the thermal conductivity. The terminal member 60 is arranged to face the emitter electrode 42 and is connected to the emitter electrode 42 via a solder 91. The connection method is not particularly limited to solder joining. The terminal member 60 may be provided as a part of the lead frame 100 as described later.

The mounting surface 53E of the main portion 51E of the conductive member 50E is electrically connected to the emitter electrode 42 of the semiconductor chip 40 via a solder 92. Specifically, the conductive member 50E and the terminal member 60 are connected via the solder 92. The emitter electrode 42 and the conductive member 50E are electrically connected via the solder 91, the terminal member 60, and the solder 92. Most part of the conductive member 50E is covered with the sealing resin body 30. The heat radiation surface 54E of the conductive member 50E is exposed from the sealing resin body 30. The heat radiation surface 54E is substantially flush with the rear surface 32. Of the surfaces of the conductive member 50E, areas other than a connection portion with the solder 92, the heat radiation surface 54E, portions to which the main terminals 70 are connected are covered with the sealing resin body 30.

The main terminals 70 are terminals through which the main current flows, among external connection terminals for electrically connecting the semiconductor device 20 and an external device. The semiconductor device 20 includes the multiple main terminals 70. The main terminals 70 connect to the corresponding conductive member 50. The main terminals 70 may be formed integrally with the corresponding conductive member 50 by processing one metal member. Alternatively, the main terminals 70 may be formed as separate members and be integrated to connect to the conductive member 50. In the present example, as shown in FIG. 6, the main terminals 70 are formed as parts of the lead frame 100 together with the signal terminals 80, and are provided as members different from the conductive member 50. As shown in FIG. 3, the main terminals 70 are connected to the corresponding conductive member 50 in the sealing resin body 30.

As shown in FIG. 3 and FIG. 4, each of the main terminals 70 extends from the corresponding conductive member 50 in the Y direction, and projects from one lateral surface 33 of the sealing resin body 30 to the outside. The main terminal 70 extends from the inside of the sealing resin body 30 to the outside. The main terminal 70 is a terminal electrically connected to the main electrode of the semiconductor chip 40. The semiconductor device 20 includes, as the main terminals 70, a main terminal 70C electrically connected to the collector electrode 41 and a main terminal 70E electrically connected to the emitter electrode 42. The main terminal 70C is also referred to as the collector terminal, and the main terminal 70E is also referred to as the emitter terminal.

The main terminal 70C connects to the conductive member 50C. Specifically, the main terminal 70C is connected to a surface of one of the extension portions 52C via a solder 93, the surface being adjacent to the semiconductor chip 40. The connection method is not particularly limited to solder joining. The main terminal 70C extends in the Y direction from the conductive member 50C and projects outside of the sealing resin body 30 from the lateral surface 33. The main terminal 70E connects to the conductive member 50E. Specifically, the main terminal 70E is connected to a surface of one of the extension portions 52E via a solder 94, the surface being adjacent to the semiconductor chip 40. The connection method is not particularly limited to solder joining. The main terminal 70E extends from the conductive member 50E in the Y direction that is the same direction as the main terminal 70C, and projects outside of the sealing resin body 30 from the same lateral surface 33 as the main terminal 70C, as shown in FIG. 3 and FIG. 4. Details of the main terminals 70C and 70E will be described later.

The signal terminals 80 are connected to the respective pads 43 of the semiconductor chip 40. The semiconductor device 20 includes the multiple signal terminals 80. In the present example, the multiple signal terminals 80 are connected via bonding wires 95. The signal terminals 80 are connected to the bonding wires 95 inside the sealing resin body 30. Five signal terminals 80 connected to the respective pads 43 extend in the Y direction, and project outside of the sealing resin body 30 from a lateral surface 34 opposite to the lateral surface 33. The signal terminals 80 are made as parts of the lead frame 100. The signal terminals 80 may be integrally formed with the conductive member 50C, together with the main terminals 70C, by processing the same metal member.

The lead frame 100 includes an outer peripheral frame portion 101 and tie bars 102 in a state before being cut, as shown in FIG. 6. Each of the main terminals 70 and each of the signal terminals 80 are fixed to the outer peripheral frame portion 101 through tie bars 102. After the sealing resin body 30 is molded, unnecessary portions of the lead frame 100 such as the outer peripheral frame portion 101 and the tie bars 102 are removed. As a result, the main terminals 70 and the signal terminals 80 are electrically separated, and the semiconductor device 20 is obtained. As the lead frame 100, either a material having a constant thickness or a deformed material having non-constant thickness can be used In the semiconductor device 20 configured as described above, the sealing resin body 30 integrally seals the semiconductor chip 40, a part of each of the conductive members 50, the terminal member 60, a part of each of the main terminals 70, and a part of each of the signal terminals 80. That is, the sealing resin body 30 seals the elements constituting one arm. Therefore, the semiconductor device 20 is also referred to as 1-in-1 package.

The heat radiation surface 54C of the conductive member 50C is substantially flush with the one surface 31 of the sealing resin body 30. The heat radiation surface 54E of the conductive member 50E is substantially flush with the rear surface 32 of the sealing resin body 30. The semiconductor device 20 has a double-sided heat radiation structure in which the heat radiation surfaces 54C and 54E are both exposed from the sealing resin body 30. The semiconductor device 20 having such a structure can be formed, for example, by cutting the conductive members 50 together with the sealing resin body 30. Alternatively, the semiconductor device 20 can be formed by molding the sealing resin body 30 in a state where the heat radiation surfaces 54C and 54E contact with a cavity wall surface of a mold for molding the sealing resin body 30.

Next, the main terminals 70 will be described in detail.

The main terminals 70 include plural terminals as at least one of the main terminals 70C and the main terminals 70E. The main terminals 70C and the main terminals 70E are aligned such that plate surfaces of the main terminals 70C and plate surfaces of the main terminals 70E do not face each other, but lateral surfaces of the main terminals 70C and lateral surfaces of the main terminals 70E face each other in the X direction, which corresponds to the plate width direction of the main terminals 70. The semiconductor device 20 includes multiple lateral surface facing portions formed by the adjacent main terminals 70C and 70E. The plate surface is a surface facing in the plate thickness direction of the main terminal 70 among the surfaces of the main terminal 70. The lateral surface is a surface that connects between the plate surfaces and is along the extension direction of the main terminal 70. The remaining surfaces of the main terminal 70 include opposite end surfaces in the extension direction, that is, a projection tip surface and an opposite back end surface. The lateral surfaces of the main terminals 70, which form the lateral surface facing portion, face each other at least at a part in the plate thickness direction of the main terminals 70. For example, the main terminals 70 may be arranged to be offset in the plate thickness direction. However, it is effective when the lateral surfaces of the main terminals 70 face each other in an entire area. As the meaning of the facing, it is sufficient that, at least, facing surfaces face each other. It is preferable that surfaces are substantially parallel to each other, and is more preferable that surfaces are completely parallel to each other.

The lateral surface of the main terminal 70 is a surface that has a smaller area than that of the plate surface. The main terminals 70C and the 70E are arranged next to each other. In a configuration in which the main terminals 70 includes the multiple main terminals 70C and the multiple main terminals 70E, when the main terminals 70C and the main terminals 70E are arranged next to each other, the main terminals 70C and the main terminal 70E are located alternately. The main terminals 70C and the main terminals 70E are arranged in order.

As shown in FIG. 7, three or more main terminals 70 that are arranged continuously next to each other in the X direction are included in a main terminal group 71. As described above, the main terminals 70C and the main terminals 70E are arranged adjacent to each other. Thus, the main terminal group 71 includes both of the main terminal 70C and the main terminal 70E, as well as includes plural number of at least one of the main terminals 70C and the main terminal 70E. The main terminals 70 included in the main terminal group 71 are arranged such that at least a part of each main terminal 70 is located in a predetermined area A1. The area A1 is defined between an extension line EL1 virtually extending from an end surface 44 of the semiconductor chip 40 and an extension line EL2 virtually extending from an end surface 45 of the semiconductor chip 40 opposite to the end surface 44. The distance between the extension line EL1 and the extension line EL2 in the X direction corresponds to the width of the semiconductor chip 40 in the X direction, that is, an element width.

In the present example, the main terminals 70C and 70E extend in the same direction (Y direction) over their entire length. The main terminal 70 has a straight plane shape, and does not have an extended portion in the X direction. The thickness of the main terminal 70C is thinner than that of the main portion 51C, and is, for example, almost the same as that of the extension portion 52C. The thickness of the main terminal 70E is thinner than that of the main portion 51E, and is, for example, almost the same as that of the extension portion 52E. The thickness of the main terminal 70 is substantially constant in its entire length, and the main terminal 70C and the main terminals 70E have substantially the same thickness. A width W1 of the main terminal 70 is substantially constant in its entire length, and the main terminal 70C and the main terminal 70E have the same width. An interval P1 between the adjacent main terminals 70 in the X direction is also the same for all the main terminals 70. The interval P1 is also referred to as an inter-terminal pitch.

Each of the main terminals 70 has two bent portions inside of the sealing resin body 30. Thus, the main terminal 70 has a substantially crank shape in a ZY plane. In the main terminal 70, a portion close to the tip end than the bent portion has a flat plate shape, and a part of the flat plate shaped portion projects from the sealing resin body 30. The projected portions of the main terminals 70C and 70E projecting from the sealing resin body 30, that is, the flat plate shaped portions of the main terminals 70C and 70E are located at substantially the same position in the Z direction, as shown in FIG. 3 and FIG. 4. Further, in the flat plate shaped portions, the plate thickness directions of the main terminals 70C and 70E are substantially coincide with the Z direction. As a result, the lateral surfaces of the main terminals 70C and the lateral surfaces of the main terminals 70E face each other in substantially entire areas in the Z direction. Further, the extension lengths of the flat shaped portions of the main terminals 70C and 70E are substantially the same. The main terminals 70C and the main terminal 70E are located at substantially the same positions in the Y direction. As a result, the lateral surfaces of the main terminal 70C and the lateral surfaces of the main terminals 70E face each other in substantially entire areas in the flat plate shaped portions.

As shown in FIG. 2, and FIGS. 5 to 7, the semiconductor device 20 includes an odd number of main terminals 70, specifically, nine main terminals 70. The nine main terminals 70 include four main terminals 70C and five main terminals 70E. The main terminals 70C and 70E are alternately arranged in the X direction. Thus, the semiconductor device 20 has eight lateral surface facing portions. The main terminals 70E are located at opposite ends of the nine main terminals 70 in the X direction, and seven main terminals 70 excluding the main terminals 70E at the opposite ends are included in the main terminal group 71. The main terminal group 71 is composed of an odd number (seven) of the main terminals 70, specifically, four main terminals 70C and three main terminals 70E. The entire part of each of the two main terminals 70E that are not included in the main terminal group 71 is located outside of the area A in the X direction. The number of main terminals 70 that are included in the main terminal group 71 is larger than the number of main terminals 70 that are not included in the main terminal group 71.

Of the seven main terminals 70 included in the main terminal group 71, a part of each of the two main terminals 70C at both ends is located in the area A1 in the X direction. The remaining five main terminals 70 are located entirely in the area A1 in the X direction. As described above, some of the main terminals 70 included in the main terminal group 71 are entirely located in the area A1, and the remaining main terminals 70 are partially located in the area A1. In particular, in the present example, each of the multiple (five) main terminals 70 included in the main terminal group 71 is entirely placed in the area A1.

As described above, the main terminals 70C and 70E have the same width W1, and the interval P1 between the main terminals 70C and 70E is also the same for all the main terminals 70. A center of the width of the main terminal 70E placed at the center in the X direction among the odd number of main terminals 70 is located on a center line CL passing through the center of the semiconductor chip 40. In this way, the main terminals 70C and 70E are arranged symmetrically with respect to the center line CL passing through the center of the semiconductor chip 40 in the X direction. The multiple main terminals 70C are arranged symmetrically with respect to the center line CL, and the main terminal 70E are arranged symmetrically with respect to the center line CL. The odd number of main terminals 70 included in the main terminal group 71 are arranged symmetrically with respect to the center line CL. The extension direction of the center line CL is orthogonal to the Z direction and the X direction.

Next, the effects of the semiconductor device 20 described above will be described.

In the semiconductor device 20, at least one of the number of main terminals 70C or the number of main terminals 70E is multiple, and the main terminals 70C and 70E are arranged adjacent to each other in the X direction. The lateral surfaces of the adjacent main terminals 70C and 70E face each other. The flow direction of the main current in the main terminal 70C is opposite to that in the main terminal 70E. In this way, the main terminals 70C and 70E are arranged so as to cancel out the magnetic fluxes to each other, which are generated when the main currents flow. Therefore, it is possible to reduce the inductance. In particular, in the present example, since the multiple lateral surface facing portions of the main terminals 70C and 70E are provided, the inductance can be effectively reduced. Since the multiple main terminals 70 having the same type are arranged in parallel, the inductance can be reduced.

The main terminal group 71 is provided by at least three main terminals 70 continuously arranged. At least a part of each main terminal 70 included in the main terminal group 71 is located in the area A1 defined, in the X direction, between the extension lines EL1 and EL2 extending from the opposite end surfaces 44 and 45 of the semiconductor chip 40. That is, the multiple lateral surface facing portions are located in the area A1. As a result, it is possible to simplify the current path between the main terminal 70 included in the main terminal group 71 and the main electrode of the semiconductor chip 40, specifically, shorten the current path. As such, the inductance can be reduced.

As described above, according to the semiconductor device 20 described hereinabove, it is possible to reduce the inductance of the main circuit wiring, as compared with a conventional structure. In the configuration in which the multiple main terminals 70 are arranged in the X direction so that the lateral surfaces face each other and at least one of the main terminal 70C and the main terminal 70E includes a plural number of main terminals, the main terminal group 71 may be provided by at least three main terminals 70 and the same type of main terminals 70 may be arranged continuously at least at a part. In such a configuration, at least one of the main terminal 70C and the main terminal 70E is provided with plural number, and arranged in parallel. Therefore, it is possible to reduce the inductance. Since the main terminal group 71 is provided, it is possible to simplify the current path between the main terminal 70 included in the main terminal group 71 and the main electrode of the semiconductor chip 40. As such, it is possible to reduce the inductance. Accordingly, the effects in accordance with the present example can be achieved. However, as shown in the present example, when the main terminals 70C and 70E are arranged adjacent to each other, it is possible to further reduce the inductance due to the effect of canceling out the magnetic fluxes.

In the main terminal group 71, the main terminal 70 entirely located in the area A1 in the X direction is more preferable in respect of the simplification of the current path as compared with the main terminal 70 partially located in the area A1. In the present example, some of the main terminals 70 included in the main terminal group 71 are entirely located in the area A1, and the remaining main terminals 70 are partially located in the area A1. Since the main terminal group 71 includes the main terminals 70 that are more effective for simplifying the current path, it is possible to effectively reduce the inductance. In particular, in the present example, the main terminal group 71 includes the multiple number of the main terminals 70 entirely located in the area. Since the main terminal group 71 includes the multiple main terminals 70 that are more effective for simplifying the current path, it is possible to further effectively reduce the inductance.

In the present example, the number of the main terminals 70 is an odd number. In the case where the number of the main terminals 70 is an odd number, it is easy to arrange symmetrically in the X direction, and thus it is possible to suppress the bias of the current paths between the main terminals 70 and the semiconductor chip 40. Further, the arrangement order of the main terminals 70 in the X direction is the same when viewed from the one surface 31 and when viewed from the rear surface 32. Accordingly, it is possible to improve freedom of arrangement of the semiconductor device 20.

In particular, in the present example, the main terminals 70C and 70E are arranged symmetrically with respect to the center line CL of the semiconductor chip 40 in the X direction. Thus, the main current of the semiconductor chip 40 flows symmetrically with respect to the center line CL. The main current flows almost evenly on the left side and the right side with respect to the center line CL. Accordingly, it is possible to further reduce the inductance. In addition, it is possible to suppress local heat generation.

Figure 8:
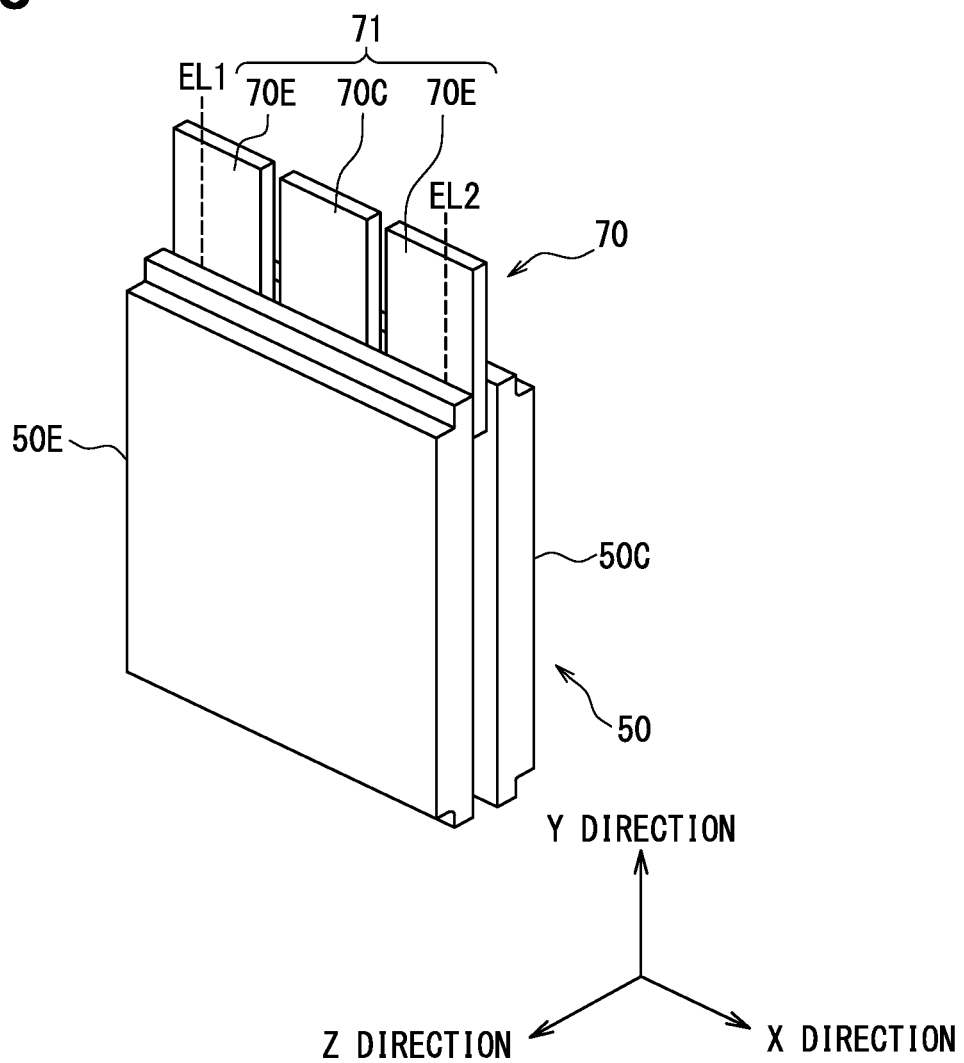
FIG. 8 is a perspective view showing another example of the semiconductor device.
Figure 9:
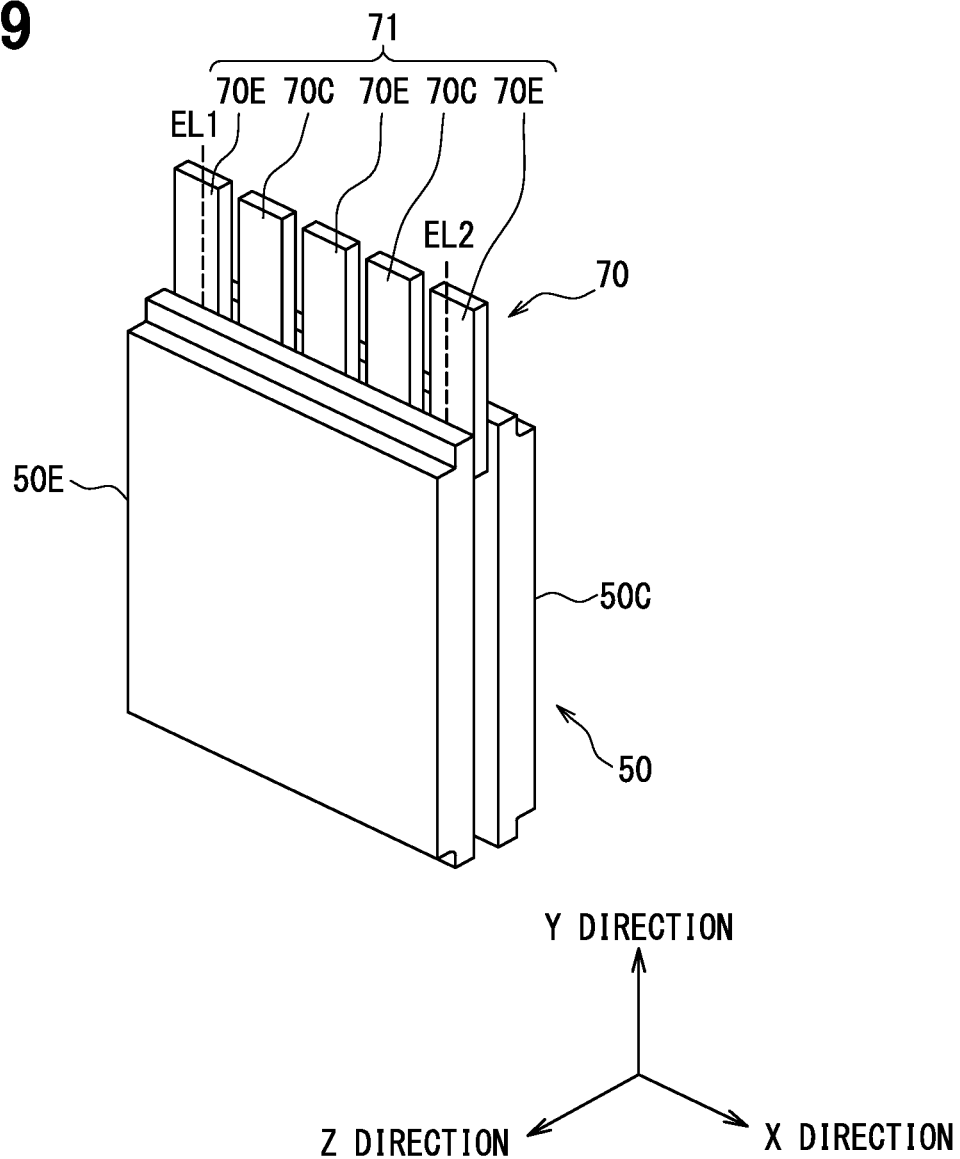
FIG. 9 is a perspective view showing another example of the semiconductor device.
Figure 10:
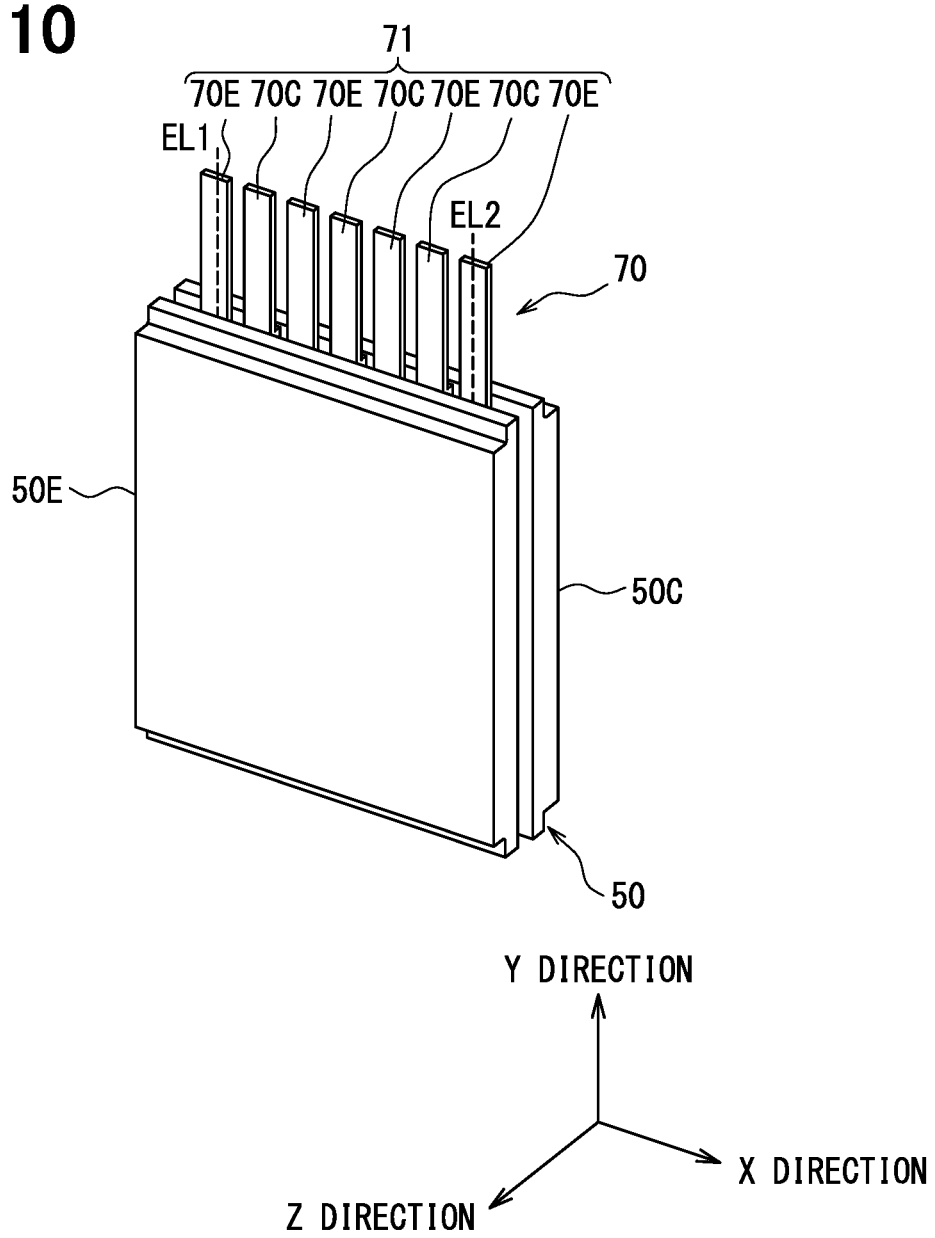
FIG. 10 is a perspective view showing another example of the semiconductor device.

FIGS. 8 to 10 show other examples. In FIGS. 8 to 10, for the sake of convenience, the sealing resin body 30 and the signal terminal 80 are not illustrated. In FIGS. 8 to 10, for the sake of convenience, the area A1 is not illustrated, rather the extension lines EL1 and EL2 defining the area A1 are illustrated.

In an example shown in FIG. 8, the semiconductor device 20 includes three main terminals 70, specifically, one main terminal 70C and two main terminals 70E. That is, the semiconductor device 20 includes two lateral surface facing portions. All the main terminals 70 are included in the main terminal group 71. The main terminal 70C located at the center is entirely arranged, in the X direction, in the area A1. The main terminals 70E at the both ends are partially located in the area A1.

In an example shown in FIG. 9, the semiconductor device 20 includes five main terminals 70, specifically, two main terminals 70C and three main terminals 70E. That is, the semiconductor device includes four lateral surface facing portions. All the main terminals 70 are included in the main terminal group 71. Each of the main terminals 70E at both ends is partially located in the area A1. Each of the remaining three main terminals 70 is entirely located in the area A1.

In an example shown in FIG. 10, the semiconductor device 20 includes seven main terminals 70, specifically, three main terminals 70C and four main terminals 70E. That is, the semiconductor device 20 includes six lateral surface facing portions. All the main terminals 70 are included in the main terminal group 71. Each of the main terminals 70E at both ends is partially located in the area A1. Each of the remaining five main terminals 70 is entirely located in the area A1.

Figure 11:
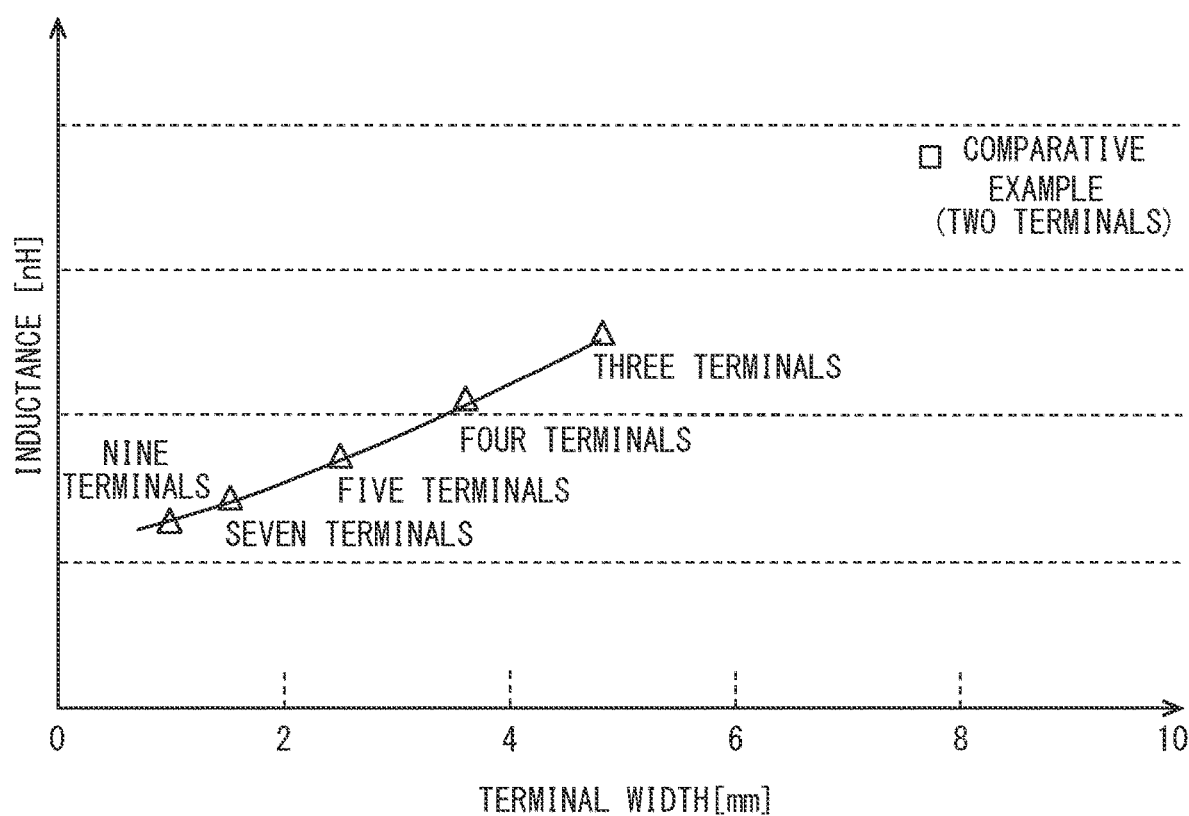
FIG. 11 is a diagram showing a magnetic analysis result of the total inductance of the main terminals.

FIG. 11 shows a result of a magnetic field analysis of a total inductance of the main terminals of the semiconductor device 20. In this magnetic field analysis (simulation), a length (width) of the conductive member 50 in the X direction is set to 17 millimeters (mm), and the interval P1 of the main terminals 70 is set to 1.0 mm. In the main terminals 70 of the same semiconductor device 20, the widths W1 are set to be equal to each other. For example, the result of the configuration in which the semiconductor device 20 has three main terminals 70 is indicated as "three terminals" in FIG. 11. In FIG. 11, the result of a configuration including only two main terminals is shown as a comparative example (two terminals). "Nine terminal" is the result of the same configuration as shown in FIG. 7. Similarly, "three terminals", "five terminals", and "seven terminals" are, respectively, results of the same configurations as shown in FIG. 8, FIG. 9 and FIG. 10.

As the number of terminals increases, the width of each terminal becomes narrower and the inductance (self-inductance) increases. However, the number of the lateral surface facing portions increases. With this, the number of the main terminals 70 included in the main terminal group 71 increases up to a predetermined number with the increase in the number of the main terminals 70. Therefore, the inductance can be reduced. In the configurations of the three terminal, the five terminals and the seven terminals, as shown in FIGS. 8 to 10, all the main terminals 70 are included in the main terminal group 71. That is, all the main terminals 70 are located in the area A1. In the configuration of the nine terminals, as shown in FIG. 7, seven main terminals 70 are included in the main terminal group 71.

According to the results shown in FIG. 11, when the main terminal group 71 includes there or more main terminals 70, it is clear that the total inductance of the main terminals can be reduced while suppressing the increase in size, as compared with the comparative example. It is considered that, when the number of terminals is three or more, the effect of reducing the inductance exceeds the increase in inductance due to the decrease in the width, and thus the inductance is reduced. In particular, in the configuration where the main terminal group 71 includes five or more main terminals 70, the inductance can be reduced by half or less as compared with the comparative example. That is, it is clear to effectively reduce the inductance.

In the configuration of the nine terminals, the seven main terminals 70 are included in the main terminal group 71 and the two main terminals 70 are located outside the area A1. Although the two main terminals 70 are located outside the area A1 as described above, the number of the main terminals 70 located in the area A1 is larger than that of the main terminals 70 not included in the main terminal group 71, that is, most of the main terminals 70 are located in the area A1. In addition, the number of lateral surface facing portions is larger by two, as compared with the configuration of the seven terminals. Accordingly, the inductance is lower than that of the configuration of the seven terminals.

In the example described above, the configuration in which the main terminals 70E are located at both ends, that is, the configuration in which the number of main terminals 70E is larger than the number of main terminals 70C has been exemplified. However, the present embodiment is not limited to such an example. In the configuration of the odd number of main terminals 70, the number of main terminals 70C may be larger than the number of main terminals 70E.

The example in which the projection lengths of all the main terminals 70 projecting from the sealing resin body 30 are the same has been described. However, the present embodiment is not limited to such an example. In consideration of connectivity with bus bars or the like, the projected portions of the adjacent main terminals 70C and 70E may have different length from each other. In another example shown in FIG. 12, the main terminals 70C are longer than the main terminals 70E.

Figure 12:
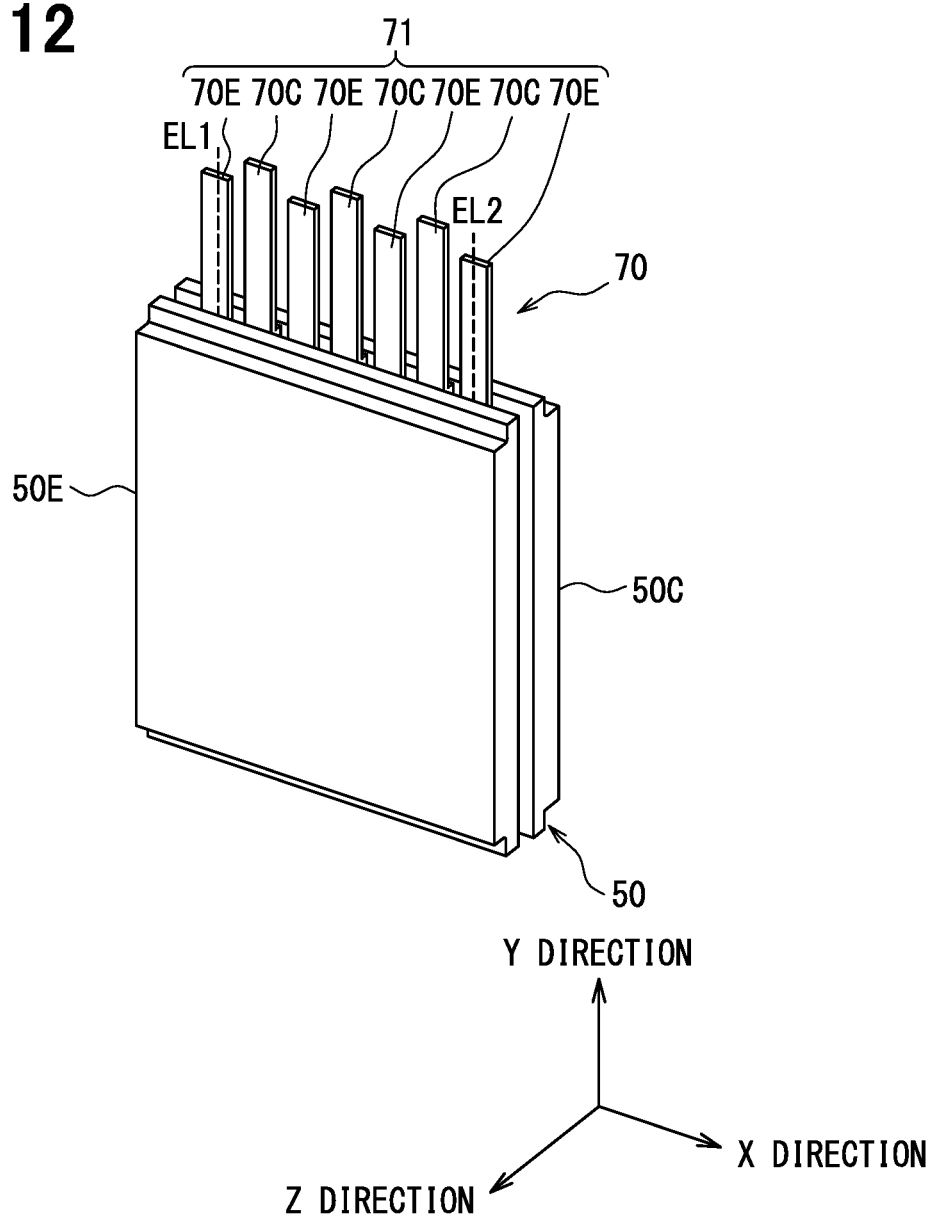
FIG. 12 is a perspective view showing another example of the semiconductor device.
Figure 13:
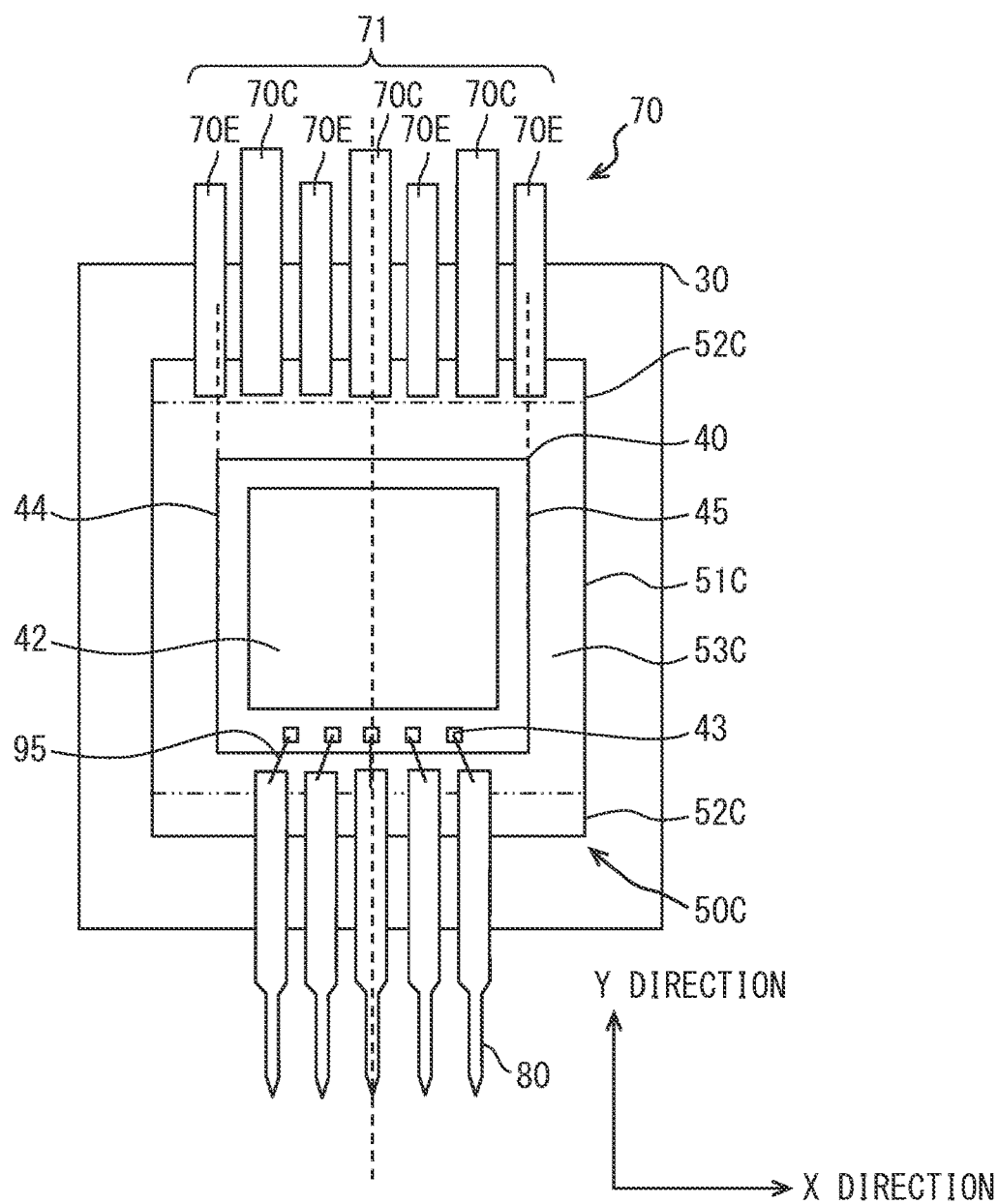
FIG. 13 is a plan view showing another example of the semiconductor device and corresponds to FIG. 7.

In another example shown in FIG. 13, the number of main terminals 70C is smaller than the number of main terminals 70E. Further, a cross-sectional area of the main terminal 70C is larger than a cross-sectional area of the main terminal 70E, so that the total impedance of the main terminals 70C and the total impedance of the main terminals 70E are made to be substantially the same. Accordingly, it is possible to suppress the heat generation of a smaller number of main terminals 70C. In the example shown in FIG. 13, the cross-sectional area of the main terminal 70C is made larger than the cross-sectional area of the main terminal 70E by increasing the width. However, the cross-sectional area of the main terminal 70C may be made larger than the cross-sectional area of the main terminal 70E by increasing the thickness of the main terminal 70C larger than that of the main terminal 70E. Alternatively, both of the width and the thickness may be adjusted. In the example shown in FIG. 13, the length of the smaller number of the main terminals 70C in the extension direction is longer than the length of the larger number of the main terminals 70E. The longer main terminal has the larger cross-sectional area. Therefore, it is possible to ensure the rigidity of the main terminals 70. FIG. 12 and FIG. 13 show the examples of the seven terminals. However, the configurations are not limited to such examples.

The example in which the adjacent main terminals 70C and 70E face each other entirely in the extension direction in the projected portions projecting from the sealing resin body 30 has been described. However, the present embodiment is not limited to such an example. Alternatively, the lateral surfaces may not face each other at least at a part of the projected portions. For example, the projection tip end portion of at least one of the main terminal 70C or the main terminal 70E is bent, and thereby the lateral surface may not face at the projection tip end portion. Even when the extension lengths are the same, the connectivity with the bus bar or the like can be improved. However, the effect of reducing the inductance is reduced.

In the example in which the number of main terminals 70 is odd and the number of main terminals 70 configuring the main terminal group 71 is odd has been shown. However, the present embodiment is not limited to such an example. The main terminal group 71 may include an even number of (four or more) main terminals 70.

The semiconductor device 20 includes at least one semiconductor chip 40. For example, in a configuration in which the semiconductor device 20 includes the multiple semiconductor chips 40 and these semiconductor chips 40 are connected in parallel between the main terminals 70C and 70E, the above described arrangement of the main terminals 70 may be employed to each of the semiconductor chips 40.

Figure 14:
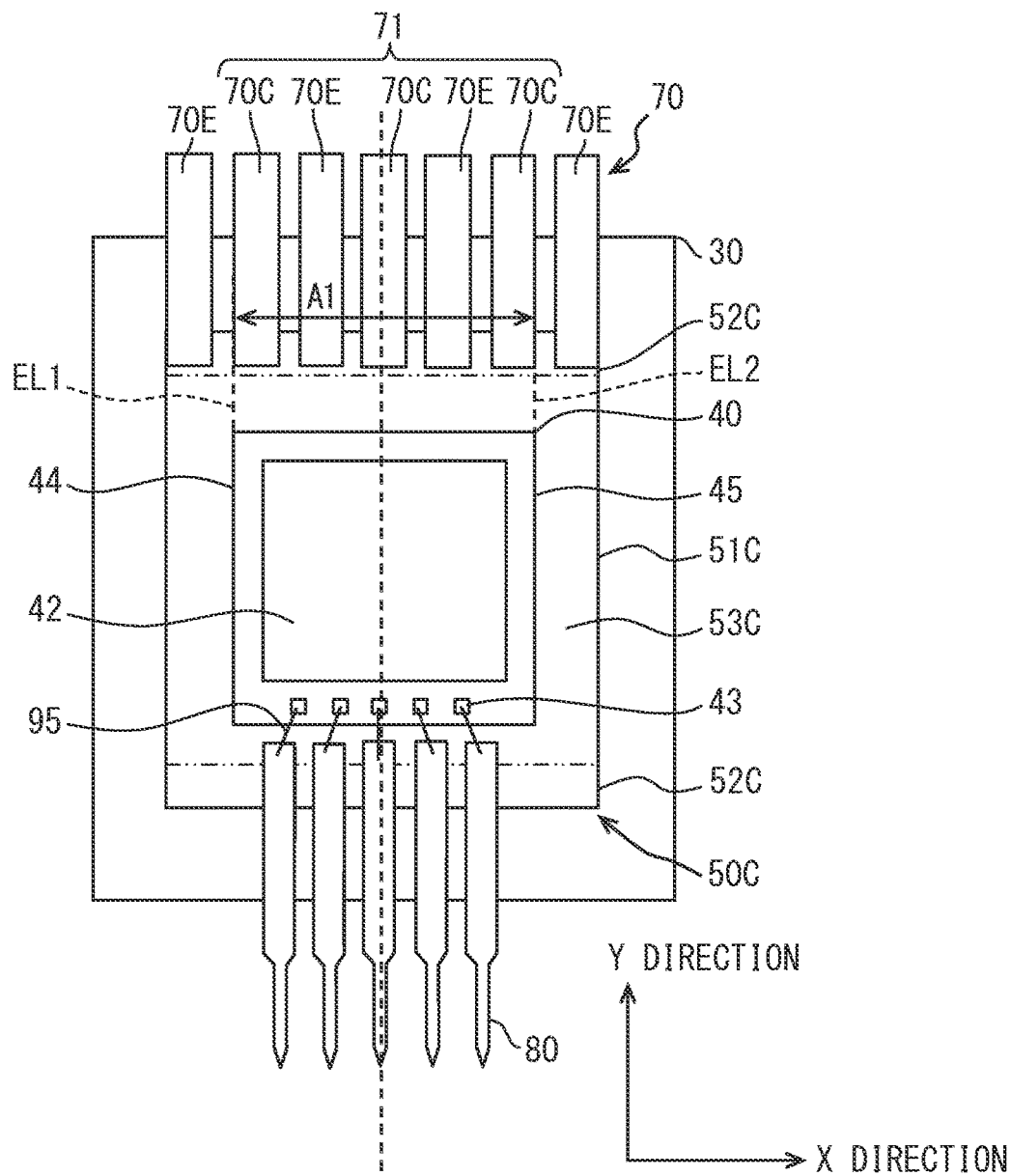
FIG. 14 is a plan view showing another example of the semiconductor device and corresponds to FIG. 7.

All the main terminals 70 included in the main terminal group 71 may be entirely arranged in the area A1. In another example shown in FIG. 14, the main terminal group 71 includes five main terminals 70, among the seven main terminals 70. The five main terminals 70 included in the main terminal group 71 are entirely arranged in the area A1. In such a configuration, it is possible to more simplify the current path with the main electrode of the semiconductor chip 40.

The semiconductor device 20 may have an even number of (four or more) of main terminals 70. In another example shown in FIG. 15, the semiconductor device 20 includes two main terminals 70C and two main terminals 70E. The main terminals 70C and the main terminals 70E are alternately arranged. The four main terminals 70 have the equal width W1 and the equal thickness to each other. That is, the cross sectional areas of the four main terminals 70 orthogonal to the extension direction are equal to each other. Further, the four main terminals 70 have the equal length to each other in the Y direction. All the main terminals 70 are included in the main terminal group 71. The two main terminals 70C and 70E, which are at opposite ends, are partially located in the area A1 in the X direction. The two main terminals 70C and 70E, which are in the middle, are entirely located in the area A1.

Even in such a configuration, the min terminals 70C and 70E form multiple lateral surface facing portions, and thus it is possible to effectively reduce the inductance. Since the semiconductor device 20 has the main terminal group 71, it is possible to simplify the current path between the main terminals 70 of the main terminal group 71 and the main electrode of the semiconductor chip 40, thereby to reduce the inductance. As described above, it is possible to reduce the inductance of the main circuit wiring as compared with the conventional structure. FIG. 11 also shows the result of the configuration of the four terminals. From the results of FIG. 11, even when the number of terminals is four, it is clear that the total inductance of the main terminals can be reduced while suppressing the increase in the size, as compared with the comparative example.

Figure 15:
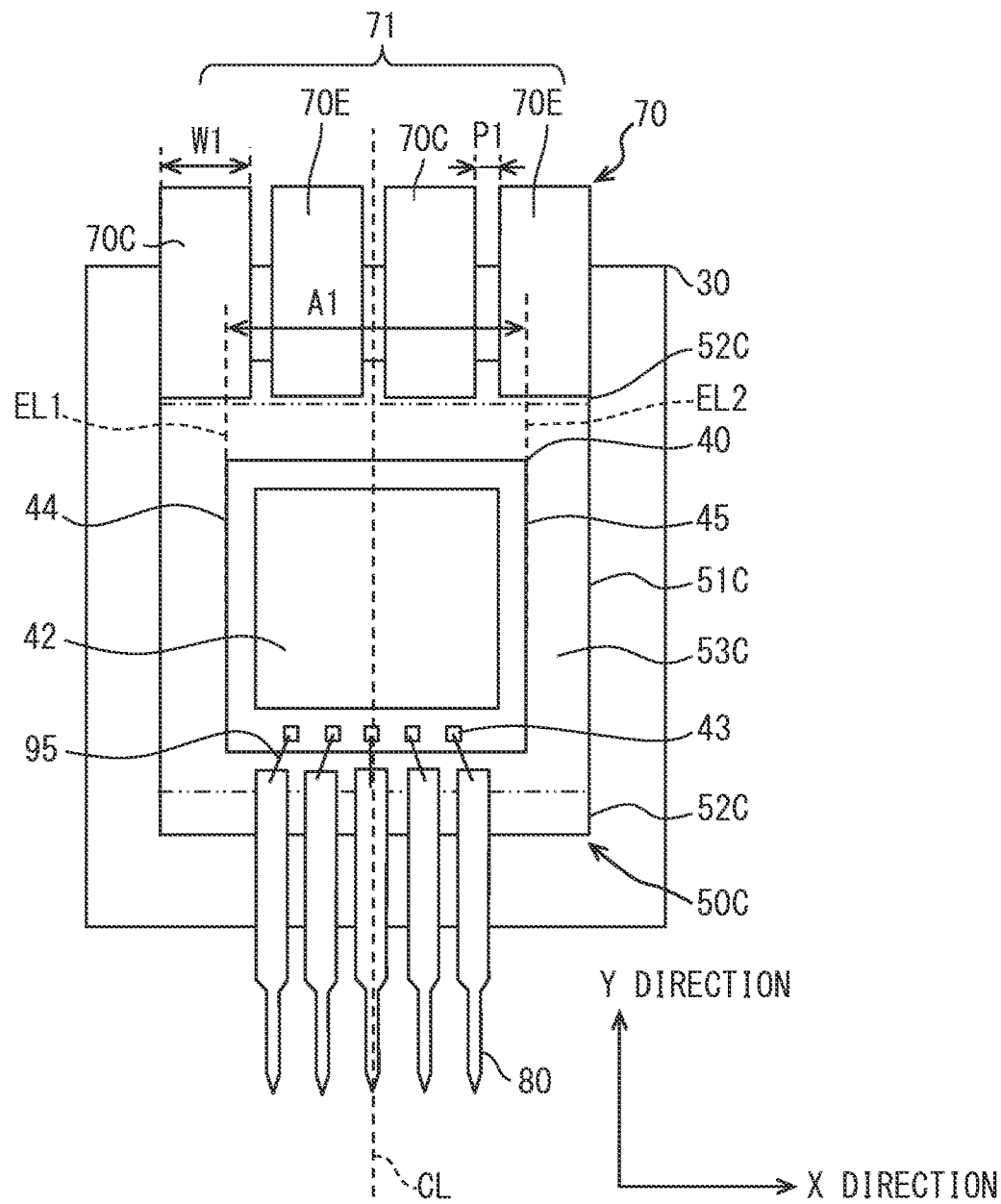
FIG. 15 is a plan view showing another example of the semiconductor device and corresponds to FIG. 7.

In FIG. 15, since the main terminal group 71 is provided by all the main terminals 70, the inductance can be effectively suppressed. Even when the number of main terminals 70 is an even number, it is sufficient that the main terminal group 71 is provided by three or more main terminals 70 arranged continuously. Accordingly, in the configuration including the four main terminals 70, the three main terminals 70 may be included in the main terminal group 71 and the remaining one main terminal 70 may be arranged outside the area A1. As described above, in the case where the number of main terminal 70 is the even number, the main terminal group 71 may be made of the odd number of (three or more) main terminals 70.

In the case where the number of main terminals 70 is the even number, the number of main terminals 70C and the number of main terminals 70E are the same. Therefore, the main current flowing in the main terminal 70C and the main current flowing in the main terminal 70E are equal. As such, variations in heat generation can be suppressed. In the example shown in FIG. 15, the extension lengths of the main terminals 70C and 70E are equal to each other, and the cross-sectional areas of the main terminals 70C and 70E are equal to each other. As such, the impedances of the main terminals 70C and 70E are substantially equal to each other. Accordingly, the variation in heat generation can be effectively suppressed.

The even number is not limited to four. The even number may be four or more. For example, a configuration including six main terminals 70 or a configuration including eight main terminals 70 may be applicable. Similarly to the configuration of the odd number, the length of the projected portions may be different between the adjacent main terminals 70C and 70E. Further, of the main terminals 70C and 70E, the cross-sectional area of the one having the longer projected portion may be larger than the cross-sectional area of the other having the shorter projected portion. As a result, rigidity can be ensured. Further, the impedance can be made equal between the main terminal 70C and the main terminal 70E. The lateral surfaces may not face each other at a part of the projected portions.

Figure 16:
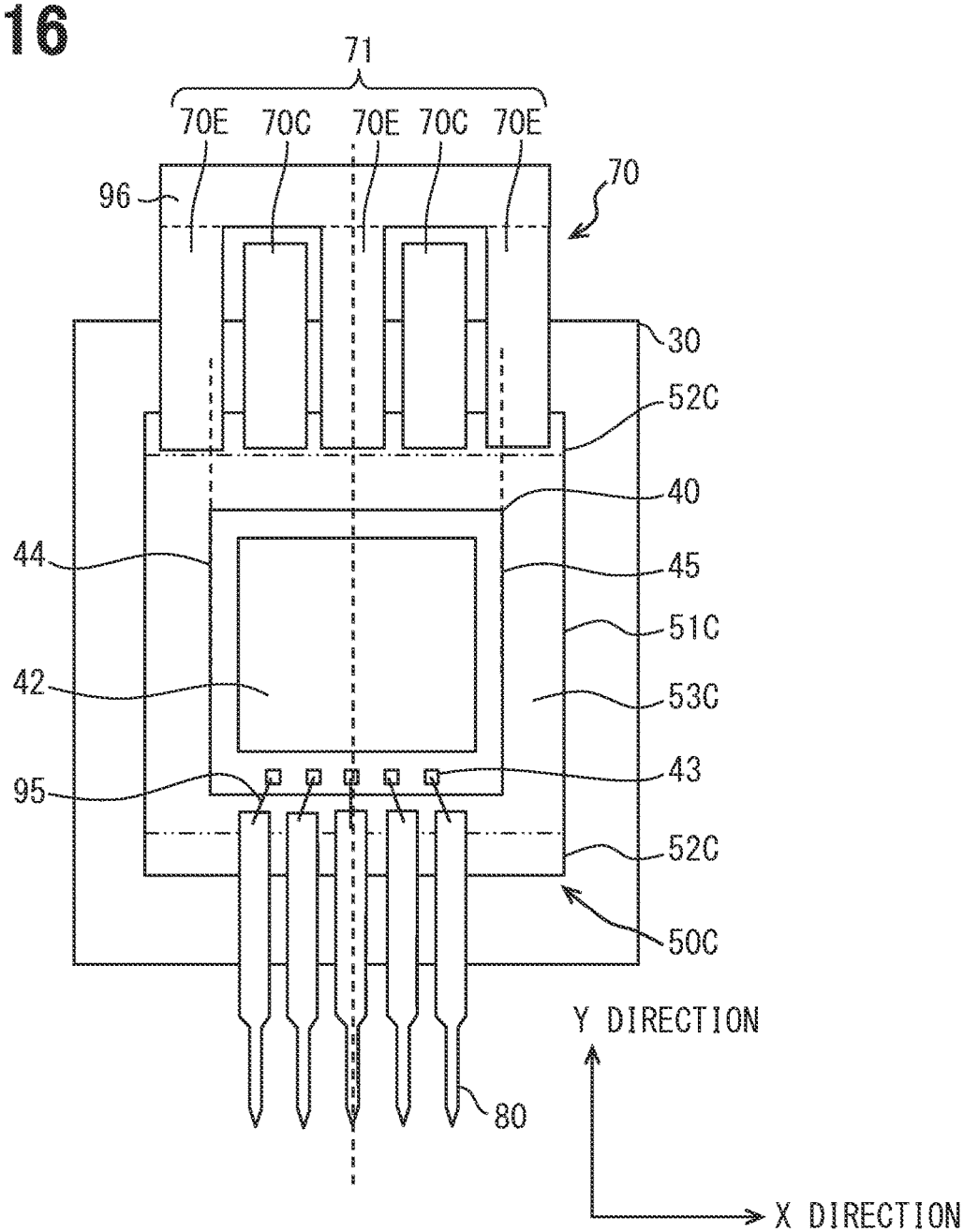
FIG. 16 is a plan view showing another example of the semiconductor device and corresponds to FIG. 7.

It may be possible to further have a connecting portion, as a part of the lead frame, integrally provided with at least one of the main terminals 70C and the main terminals 70E to connect the at least same one of the main terminals 70C and the main terminals 70E to each other through the connecting portion. In another example shown in FIG. 16, the semiconductor device 20 includes five main terminals 70, specifically, two main terminals 70C and three main terminals 70E. The lead frame 100 described above has a connecting portion 96 connecting between the main terminals 70E. The main terminals 70E have the longer projection length than the main terminals 70C from the sealing resin body 30, and the connecting portion 96 connects the projection tip end portions of the main terminals 70E. The connecting portion 96 is extended in the X direction, and is spaced apart from the main terminals 70C in the Y direction. The connecting portion 96 is located at the same position as the projecting portions of the main terminals 70C and 70E in the Z direction.

Thus, when the main terminals 70 having the same potential (the main terminals 70E) are connected through the connecting portion 96, connection points with bus bars or the like can be reduced. That is, the connectivity can be improved. In particular, in FIG. 16, the main terminals 70E having the larger number are connected to each other. Thus, in the configuration where the main terminals 70C and 70E and the connecting portion 96 are provided in the same lead frame 100, the number of connection points can be further reduced. In place of the main terminals 70E, the main terminals 70C may be connected through the connecting portion 96. Of the main terminals 70C and the main terminals 70E, the one having smaller number may be connected through the connecting portion 96. The number and the arrangement of the main terminals 70 are not limited to the example shown in FIG. 16. In a case where the connecting portion 96 is provided to only either the main terminals 70C or the main terminals 70E, the connecting portion 96 can be arranged on the same plane as the projecting portions of the main terminals 70C and 70E as described above. Such a configuration may be combined with the configuration of having the even number of the main terminals 70.

Each of the main terminals 70C and 70E may be connected through the connecting portion. In another example shown in FIG. 17 and FIG. 18, the conductive members 50C and 50E have the main portions 51C and 51E, but may not have the extension portions 52C and 52E, respectively. Further, the conductive member 50C, the main terminals 70C and the signal terminals 80 are formed in the same lead frame. The conductive member 50E and the main terminals 70E are formed in a lead frame, which is different from the lead frame in which the main terminals 70C are formed. The main terminals 70C extend from the conductive member 50C and the main terminals 70E extend from the conductive member 50E. FIG. 18 is a cross-sectional view of the semiconductor device 20 taken along the line XVIII-XVIII in FIG. 17.

Figure 17:
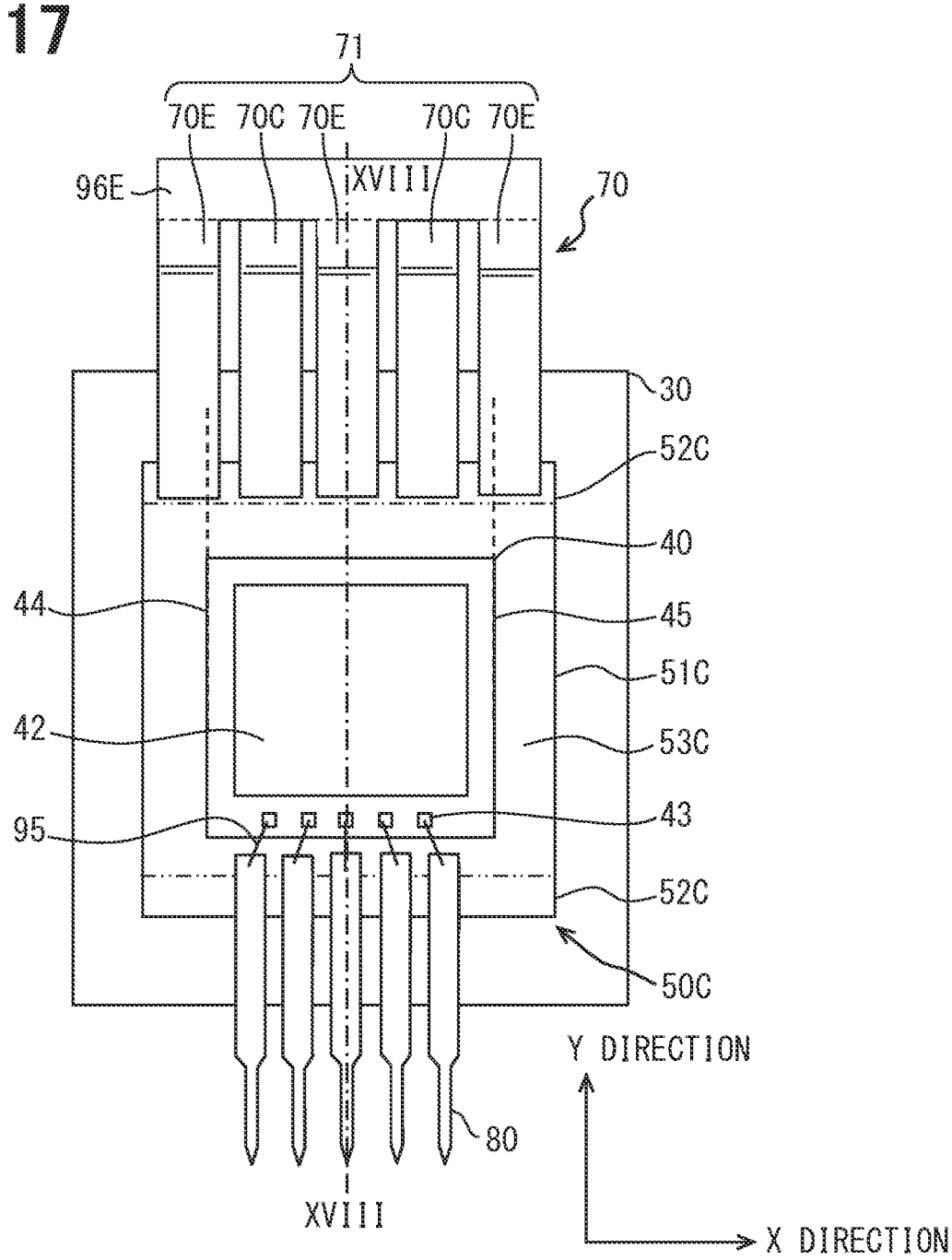
FIG. 17 is a cross-sectional view showing another example of the semiconductor device and corresponds to FIG. 3.
Figure 18:
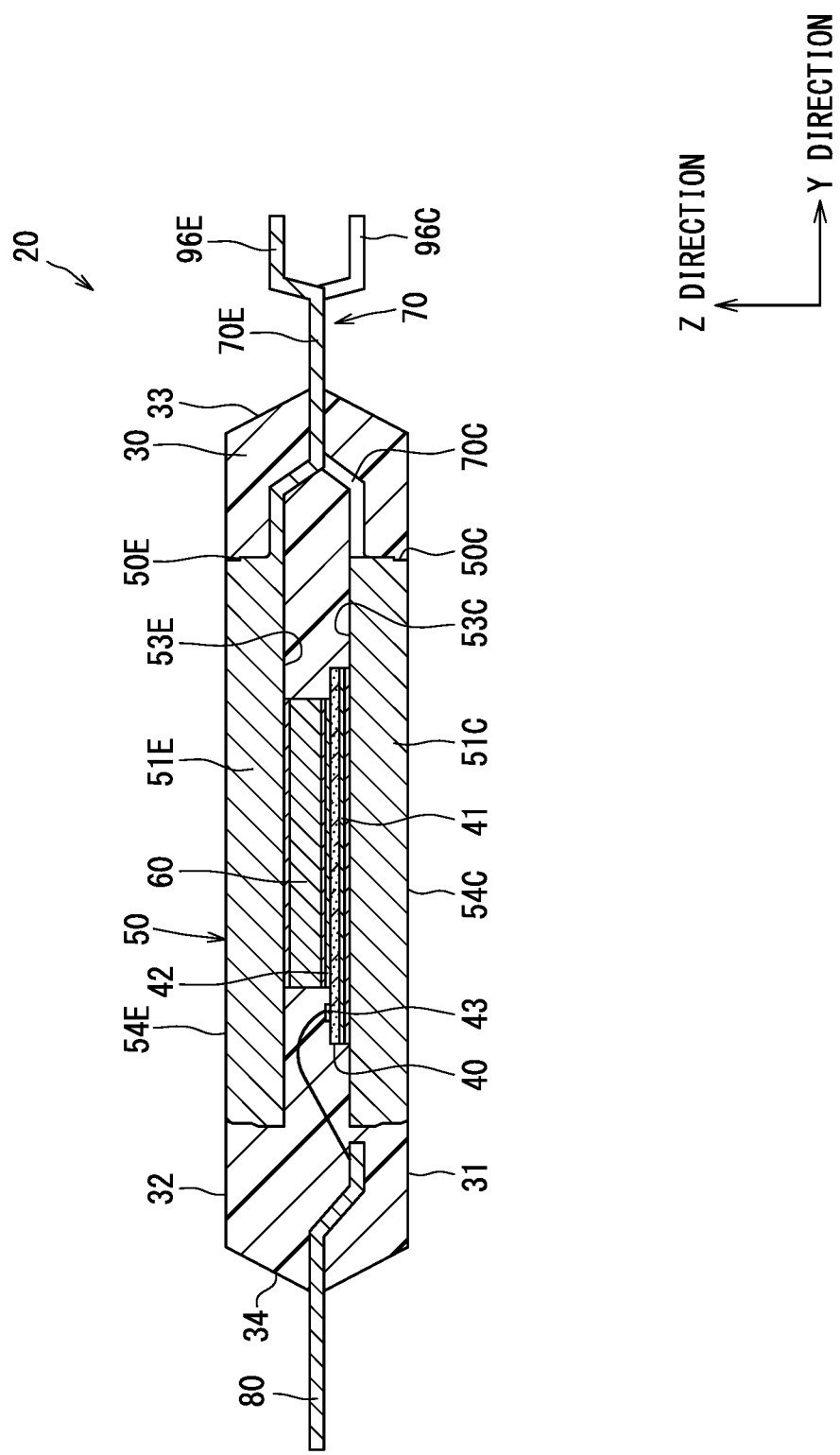
FIG. 18 is a cross sectional view taken along a line XVIII-XVIII in FIG. 17.

In FIG. 17 and FIG. 18, the lead frame including the main terminals 70C is provided with the connecting portion 96C, and the lead frame including the main terminals 70E is provided with the connecting portion 96E. The connecting portion 96C connects the projection tip end portions of the projected portions of the main terminals 70C. Likewise, the connecting portion 96E connects the projection tip end portions of the projected portions of the main terminals 70E. The main terminals 70C and 70E each have a bent portion in the projected portion, and hence the connecting portions 96C and 96E are separated from each other in the Z direction. That is, the connecting portions 96C and 96E are arranged at different positions from each other in the Z direction. As such, even if the main terminals 70C and 70E have the same extension length, the main terminals 70C and the main terminals 70E can be connected respectively through the connecting portions 96C and 96E. Thus, the number of the connection points can be further reduced.

Figure 19:
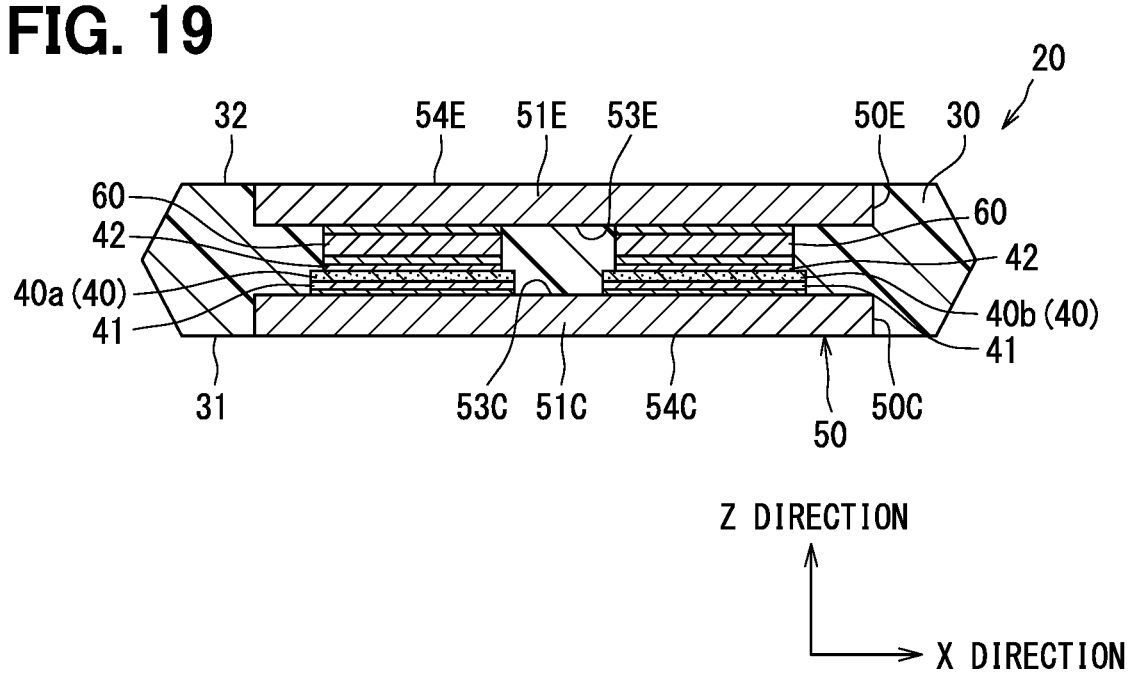
FIG. 19 is a cross-sectional view showing another example of the semiconductor device.
Figure 20:
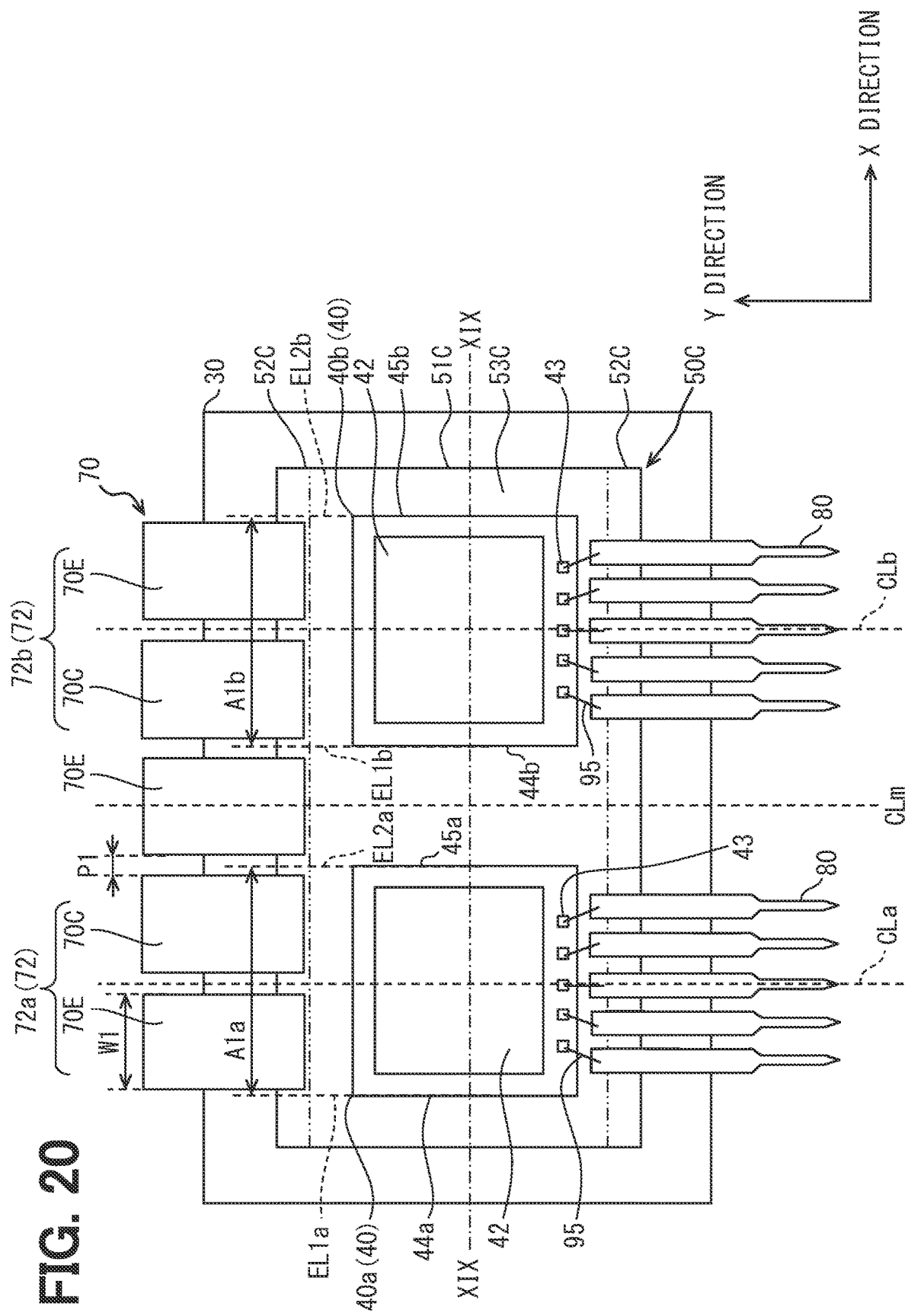
FIG. 20 is a plan view showing a positional relationship between the IGBT and the main terminals and correspond to FIG. 7.

In another example shown in FIG. 19 and FIG. 20, the semiconductor device 20 includes multiple semiconductor chips 40 connected in parallel to each other. Specifically, the semiconductor device 20 includes, as the semiconductor chips 40, a semiconductor chip 40a and a semiconductor chip 40b. Note that FIG. 19 is a cross-sectional view of the semiconductor device 20 taken along a line XIX-XIX in FIG. 20. Collector electrodes 41 of the semiconductor chips 40a and 40b are connected to a mounting surface 53C of the same conductive member 50C. Emitter electrodes 42 of the semiconductor chips 40a and 40b are connected to a mounting surface 53E of the same conductive member 50E through terminal members 60, which are individually arranged. In the present embodiment, the two semiconductor chips 40a and 40b have substantially the same planar shape, in particular, the rectangular planar shape. Further, the two semiconductor chips 40a and 40b have substantially the same size and substantially the same thickness. The semiconductor chips 40a and 40b are arranged at substantially the same height in the Z direction, and are aligned side by side in the X direction.

As shown in FIG. 20, a main terminal group 72 is provided by two or more main terminals 70 that are continuously aligned in the X direction. The semiconductor device 20 includes, as the main terminal group 72, a main terminal group 72a corresponding to the semiconductor chip 40a and a main terminal group 72b corresponding to the semiconductor chip 40b. At least a part of each main terminal 70 included in the main terminal group 72a is arranged in an area A1a that is defined between, in the X direction, extension lines EL1a and EL2a extending from opposite end surfaces 44a and 45a of the semiconductor chip 40a. At least a part of each main terminal 70 included in the main terminal group 72b is arranged in an area A1b that is defined between, in the X direction, extension lines EL1b and EL2b extending from opposite end surfaces 44b and 45b of the semiconductor chip 40b.

The semiconductor device 20 includes five main terminals 70. Specifically, the five main terminals 70 include two main terminals 70C and three main terminals 70E. The widths W1 of the main terminals 70 are equal to each other, and the thicknesses of the main terminals 70 are equal to each other. Also, the intervals P1 of the main terminals 70 are equal to each other. The main terminal 70E in the middle is arranged outside the areas A1a and A1b. The main terminal group 72a includes two main terminals 70C and 70E arranged adjacent to the semiconductor chip 40a than the main terminal 70E in the middle in the X direction. The main terminal group 72b includes two main terminals 70C and 70E arranged adjacent to the semiconductor chip 40b than the main terminal 70E in the middle in the X direction.

Further, the main terminals 70C and 70E included in the main terminal group 72a are entirely located in the area A1a. Similarly, the main terminals 70C and 70E included in the main terminal group 72b are entirely located in the area A1b. The five main terminals 70 are symmetrically arranged with respect to a center line CLm passing through an elemental center of the two semiconductor chips 40. The elemental center is a center position between the centers of the semiconductor chips 40a and 40b in the alignment direction, and the center line CLm is a virtual line that is orthogonal to the alignment direction and passes through the elemental center line CL.

As described above, in the semiconductor device 20 in which the multiple semiconductor chips 40 are connected in parallel, the main terminal 70C and the main terminal 70E are alternately arranged. The lateral surfaces of the adjacent main terminals 70C and 70E face each other. In this way, since the main terminals 70 have the plural number of lateral surfaces, i.e., four lateral surfaces facing each other between the main terminals 70C and the main terminals 70E, the inductance can be effectively reduced. At least a part of each of the main terminals 70C and 70E included in the main terminal group 72a is arranged in the area A1a. Therefore, the current paths between the main terminals 70C and 70E included in the main terminal group 72a and the main electrodes of the semiconductor chip 40a can be simplified and hence the inductance can be reduced. Likewise, at least a part of each of the main terminals 70C and 70E included in the main terminal group 72b is arranged in the area Alb. Therefore, the current paths between the main terminals 70C and 70E included in the main terminal group 72b and the main electrodes of the semiconductor chip 40b can be simplified and hence the inductance can be reduced. Accordingly, the inductance of the main circuit wiring can be reduced, as compared with the conventional structure.

The main terminals 70 of the odd number are symmetrically arranged with respect to the center line CLm of the two semiconductor chips 40. In other words, the lateral surface facing portions are symmetrically arranged with respect to the center line CLm. Therefore, the main currents of the semiconductor chips 40a and 40b flow symmetrically with respect to the center line CLm. That is, the inductance of the semiconductor chip 40a and the inductance of the semiconductor chip 40b are substantially equal. In this way, since the inductances are equal to each other, current imbalance can be reduced.

Although the example in which the two semiconductor chips 40 are connected in parallel has been described, the configuration of the present embodiment is not limited to such an example. The present embodiment may be applied to the configuration in which three or more semiconductor chips 40 are connected in parallel. Also, the number of the main terminals 70 is not limited particularly. Each of the main terminal groups 72 may be provided by two or more main terminals 70 including the main terminals 70C and 70E. For example, the semiconductor device 20 may have the seven main terminals 70, and each of the main terminal groups 72a and 72b may be provided by three main terminals 70. The connecting portion 96 (86C, 86E) shown in FIGS. 16 to 18 may be combined.

The example in which the switching element and the diode are integrally formed into the same semiconductor chip 40 has been described. However, the present embodiment is not limited to such a configuration. The switching element and the diode may be formed in separate chips. The example in which the semiconductor device 20 has the terminal members 60 as for a double-sided heat radiation structure has been described. However, the present embodiment is not limited to such a configuration. The semiconductor device 20 may not have the terminal members 60. For example, in place of the terminal members 60, the conductive member 50E may have protrusions protruding toward the emitter electrodes 42. The example in which the heat radiation surfaces 54C and 53E are exposed from the sealing resin body 30 has been described. Alternatively, the heat radiation surfaces 54C and 54E may not expose from the sealing resin body 30. For example, the heat radiation surfaces 54C and 54E may be covered with an insulating member (not shown). The sealing resin body 30 may be formed in a state where the insulating member is attached to the heat radiation surfaces 54C and 54E.

(Power Module)

An example of a power module 110 applicable to the electric power conversion device 5 of the present embodiment will be described. The power module 110 forms the parallel circuit 11 of one set, as described above.

Figure 26:
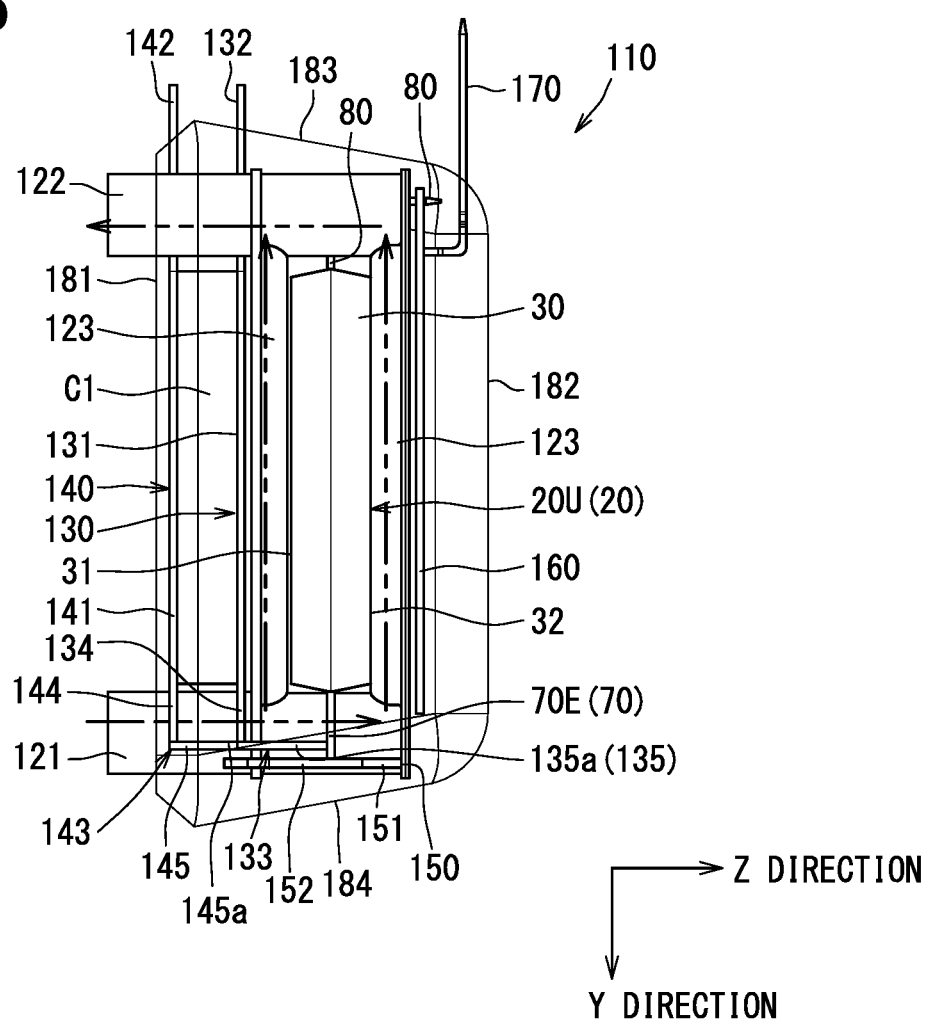
FIG. 26 is a plan view when the power module shown in FIG. 21 is viewed in a direction C.
Figure 27:
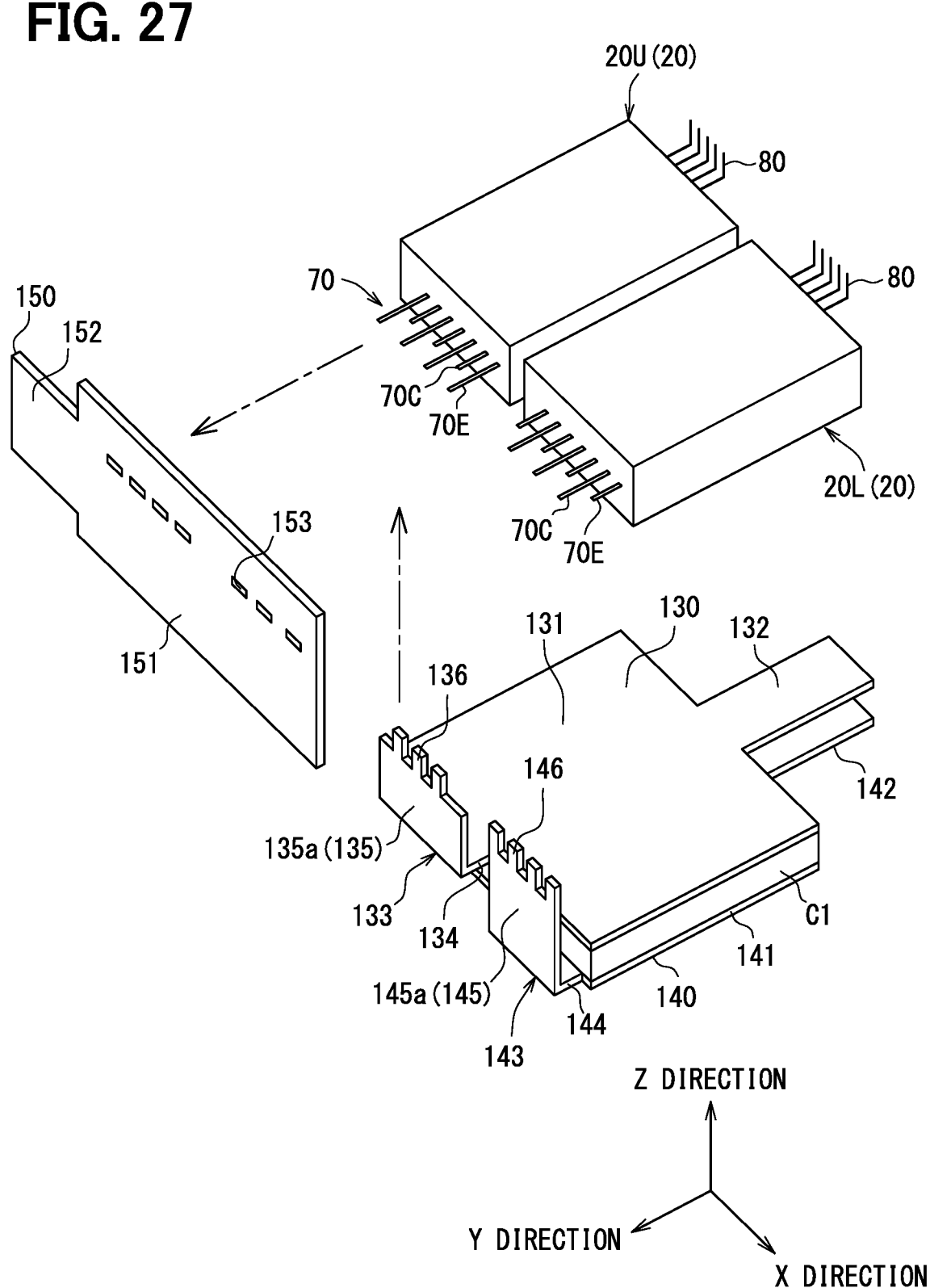
FIG. 27 is a view for illustrating connections of the semiconductor device, a smoothing capacitor, and each bus bar.

As shown in FIGS. 21 to 27, the power module 110 includes a semiconductor device 20, a cooling unit 120, the capacitor C1, a P bus bar 130, an N bus bar 140, an output bus bar 150, a drive substrate 160, and an external connection terminal 170, and a protective member 180. Although FIG. 21 and FIGS. 23 to 26 are plan views, internal elements are shown by solid lines so that the internal elements of the protective member 180 are easily understood. FIG. 27 is a schematic diagram explaining the connections of the semiconductor device 20, the capacitor C1, and the respective bus bars 130, 140, and 150.

The semiconductor device 20 has the 1-in-1 package structure as described above. The power module 110 includes the two semiconductor devices 20. One semiconductor device 20 forms the upper arm 10U, and the other semiconductor device 20 forms the lower arm 10L. That is, the semiconductor devices 20 include a semiconductor device 20U forming the upper arm 10U, and a semiconductor device 20L forming the lower arm 10L. The semiconductor devices 20U and 20L have substantially the same basic configurations. Each of the semiconductor devices 20U and 20L includes seven main terminals 70, specifically, three main terminals 70C and four main terminals 70E. The main terminals 70C and 70E are alternately arranged in the X direction. Hereinafter, the semiconductor chip 40 included in the semiconductor device 20U and forming the upper arm 10U is referred to as a semiconductor chip 40U, and the semiconductor chip 40 included in semiconductor device 20L and forming the lower arm 10L is referred to as a semiconductor chip 40L.

The semiconductor device 20L has the same structure as that shown in FIG. 12. The main terminal 70C has the longer projection length from the sealing resin body 30 than that of the main terminal 70E. The semiconductor device 20U has the reversed structure from the semiconductor device 20L. The main terminal 70E has the longer projection length from the sealing resin body 30 than that of the main terminal 70C. As described above, the main terminal 70E is longer than the main terminal 70C in the semiconductor device 20U, whereas the main terminal 70C is longer than the main terminal 70E in the semiconductor device 20L. The main terminal 70C of the semiconductor device 20U and the main terminal 70E of the semiconductor device 20L have the same length. The main terminal 70E of the semiconductor device 20U and the main terminal 70C of the semiconductor device 20L have the same length.

The semiconductor devices 20U and 20L are aligned in the X direction, and a predetermined gap is provided between the semiconductor devices 20U and 20L. That is, the semiconductor devices 20U and 20L are aligned in a direction orthogonal to the plate thickness direction of the semiconductor chip 40, that is, the Z direction. The semiconductor devices 20U and 20L are aligned such that the respective one surfaces 31 of the sealing resin bodies 30 are on the same side and the respective rear surfaces 32 are on the same side in the Z direction. Between the semiconductor devices 20U and 20L, the one surfaces 31 are substantially flush with each other in the Z direction, and the rear surfaces 32 are substantially flush with each other in the Z direction.

In each of the semiconductor devices 20U and 20L, the projected portions of signal terminals 80 projecting from the sealing resin body 30 each have substantially an L shape. The projected portion of each signal terminal 80 has one bend portion of approximately 90 degrees. In the projected portion of the signal terminal 80, a portion from the base of the sealing resin body 30 to the bent portion extends in the Y direction, and a portion from the bent portion to the projecting tip end extends in the Z direction and toward a side opposite to the capacitor C1.

The cooling unit 120 mainly cools the semiconductor devices 20. The cooling unit 120 is formed of a material having excellent thermal conductivity, for example, an aluminum-based material. The cooling unit 120 includes a supply pipe 121, a discharge pipe 122, and a heat exchange part 123. Because the cooling unit 120 is provided in the power module 110, the cooling unit 120 is also referred to as an in-module cooling unit.

The heat exchange part 123 is made of a pair of plates 124 and 125. The plates 124 and 125 are each made by using a thin metal plate having substantially a rectangular planar shape. At least one of the plate 124 and the plate 125 has a bulged-shape, such as a shallow pot-like bottomed shape, as being pressed from the plate shape. In the present example, the plate 124 has the pot-like bottomed shape. Outer peripheral portions of the plates 124 and 125 are fixed to each other, such as by swage, and are entirely joined to each other such as by brazing, so that a flow path 126 is formed between the plate 124 and the plate 125.

The heat exchange part 123 has a flat tubular body as a whole. The cooling unit 120 has two heat exchange parts 123. The heat exchange parts 123 are arranged in two stages in the Z direction. The two semiconductor devices 20U and 20L are held between the two heat exchange parts 123 in a state where the two semiconductor devices 20U and L are aligned in the X direction. The two heat exchange parts 123 are arranged so that the plates 124 are opposed each other. One of the two heat exchange parts 123 is arranged adjacent to the one surfaces 31 of the semiconductor devices 20, and the other of the two heat exchange parts 123 is arranged adjacent to the rear surfaces 32 of the semiconductor devices 20. In the configuration where the heat radiation surfaces 54C and 54E are exposed from the sealing resin body 30, as described above, an electrically insulating member such as grease, a ceramic plate or a resin member is arranged between the semiconductor devices 20 and the plate 124 of each heat exchange part 123.

The supply pipe 121 is a tubular body defining a flow path therein, and extends in the Z direction. The supply pipe 121 is provided at one end of the heat exchange part 123, which has substantially the rectangular plane shape, in the X direction, on a side adjacent to the main terminals 70 in the Y direction. The supply pipe 121 is connected to each of the heat exchange parts 123 so that the flow path of the supply pipe 121 is in communication with the flow paths 126 of the heat exchange parts 123. One end of the supply pipe 121 is open in the Z direction, and the opposite end of the supply pipe 121 is connected to the heat exchange part 123 on the second stage. The flow path 126 of the heat exchange part 123 on the first stage is in communication with the flow path of the supply pipe 121 at a middle position of the extension of the supply pipe 121. The heat exchange part 123 on the first stage is adjacent to the open ends of the supply pipe 121 and a discharge pipe 122, and the heat exchange part 123 on the second stage is further from the open ends of the supply pipe 121 and the discharge pipe 122. A part of the supply pipe 121 including the open end projects outside from the protective member 180.

The discharge pipe 122 is a tubular body defining a flow path therein, and extends in the Z direction. The discharge pipe 122 is provided at an end of the heat exchange part 123, which has substantially the rectangular plane shape, opposite to the supply pipe 121 in the X direction, on a side adjacent to the signal terminals 80 in the Y direction. The discharge pipe 122 is connected to each of the heat exchange parts 123, and the flow path of the discharge pipe 122 is in communication with the flow paths 126 of the heat exchange parts 123. The discharge pipe 122 is open in the Z direction on the same side as the supply pipe 121. An end of the discharge pipe 122 opposite to the open end is connected to the heat exchange part 123 on the second stage. The flow path 126 of the heat exchange part 123 on the first stage is in communication with the flow path of the discharge pipe 122 at a middle position of the extension of the discharge pipe 122. A part of the discharge pipe 122 including the open end projects outside from the protective member 180.

As shown by a long dashed double-dotted line arrow in FIG. 26, the refrigerant flows into the flow paths 126 of the heat exchange parts 123 from the supply pipe 121, and spreads inside the flow paths 126. The refrigerant is then discharged from the discharge pipe 122. As described above, the supply pipe 121 and the discharge pipe 122 are located at diagonal positions of the substantially rectangular plane shape of the heat exchange parts 123. Since the supply pipe 121 and the discharge pipe 122 are provided at the diagonal positions, the semiconductor chips 40U and 40L located between the supply pipe 121 and the discharge pipe 122 with respect to the X direction and the Y direction can be effectively cooled. Although not shown, an inner fin may be provided inside the flow path 126 of the heat exchange part 123. The inner fin is a metal plate that is bent and formed into a wavy shape. As the inner fin is provided, heat transfer between each of the plates 124 and 125 and the refrigerant flowing through the flow path 126 can be enhanced.

As the refrigerant flowing through the flow path 126, a phase transition refrigerant such as water or ammonia or a non-phase transition refrigerant such as ethylene glycol can be used. The cooling unit 120 mainly cools the semiconductor devices 20. However, in addition to the cooling function, the cooling unit 120 may have a heating function when the environmental temperature is low. In such a case, the cooling unit 120 may be referred to as a temperature adjusting device. The refrigerant may be referred to as a heat medium.

The capacitor C1 is arranged in the vicinity of the set of the semiconductor devices 20U and 20L of the power module 110. As described above, it is sufficient that the capacitor C1 has, at least, a function of supplying the electric charges necessary for the switching. Therefore, the capacitance of the capacitor C1 is set to, for example, 10 µF to 20 µF. The capacitor C1 has substantially a rectangular parallelepiped shape. The capacitor C1 has a flat shape, in which the thickness, that is, a length in the Z direction is sufficiently smaller than a length in the X direction and a length in the Y direction. As described, the capacitor C1 is small in size. As the capacitor C1, for example, a film capacitor can be used.

In the present example, the capacitor C1 has a rectangular planar shape in which the length the in the X direction is longer than that in the Y direction. In a projection view in the Z direction, most part of the capacitor C1 is located at a position overlapping with the heat exchange part 123 of the cooling unit 120. In the same projection view, the most part of the capacitor C1 overlaps with the most part of the semiconductor devices 20U and 20L, specifically, the semiconductor devices 20U and 20L excluding the projected portions of the main terminals 70 and the projected portions of the signal terminals 80. As such, the capacitor C1 is aligned with the semiconductor devices 20U and 20L in the Z direction. The capacitor C1 having the rectangular planar shape is arranged at a position where the both ends in the X direction do not overlap with the cooling unit 120, that is, arranged so that the both ends in the X direction are located outside the cooling unit 120.

The capacitor C1 is arranged so that the heat exchange part 123 is interposed between the capacitor C1 and the semiconductor devices 20. The capacitor C1 is arranged on the opposite side to the semiconductor device 20 with respect to the heat exchange part 123. In the present example, the capacitor C1 is arranged on the opposite side to the semiconductor device 20 with respect to the heat exchange part 123 of the first stage. That is, the capacitor C1 is located adjacent to the open ends of the supply pipe 121 and the discharge pipe 122 than the closed ends of the supply pipe 121 and the discharge pipe 122. The capacitor C1 is located at a position closer to the semiconductor device 20 than the open ends of the supply pipe 121 and the discharge pipe 122 in the Z direction. The capacitor C1 has a positive electrode terminal (not shown) for external connection on a surface facing the heat exchange part 123 in the Z direction, and a negative electrode terminal (not shown) for external connection on a surface opposite to the surface on which the positive electrode terminal is arranged.

The P bus bar 130, the N bus bar 140, and the output bus bar 150 are metal plate members each including a metal having excellent conductivity such as copper, for example. In the present example, the thickness of each bus bar is almost uniform. The P bus bar 130, the N bus bar 140, and the output bus bar 150 have substantially the same thickness. As the metal plate member, a plate of which thicknesses is partially different can be used. The P bus bar 130, the N bus bar 140, and the output bus bar 150 are electrically separated from the cooling unit 120.

The P bus bar 130 includes a connection portion 131, a common wiring portion 132, and a parallel wiring portion 133. The connection portion 131 is a portion connected to the positive electrode terminal of the capacitor C1. In the present example, in the projection view of the P bus bar 130 in the Z direction, the entire portion overlapping with the capacitor C1 is the connection portion 131. Although not shown, the connection portion 131 may be arranged at the portion overlapping with the capacitor C1 in the projection view in the X direction or the Y direction, that is, on the lateral surface of the capacitor C1. The common wiring portion 132 extends from one end of the connection portion 131 in the Y direction. The common wiring portion 132 is a portion of the P bus bar 130 that functions as the above-described common wiring 11P. As a result, the one upper and lower arm circuit 10 included in the power module 110 and the capacitor C1 are not individually connected to the above-described VH line 12H, but are commonly connected to the above-described VH line 12H. The common wiring portion 132 has a shorter length in the X direction, that is, a shorter width than the connection portion 131. The common wiring portion 132 connects to a central portion of the connection portion 131 in the X direction. The common wiring portion 132 is substantially flush with the connection portion 131 and extends in the Y direction. A part of the common wiring portion 132 projects to the outside of the protective member 180.

The parallel wiring portion 133 functions as, at least, a wiring electrically connecting the positive electrode terminal of the capacitor C1 and the upper arm 10U of the upper and lower arm circuit 10, that is, a wiring connecting the upper and lower arm circuit 10 and the capacitor C1 in parallel. In the present example, further, the parallel wiring portion 133 also functions as a wiring electrically connecting the upper arm 10U to the common wiring 11P, that is, to the common wiring portion 132. The parallel wiring portion 133 extends from an end of the connection portion 131, the end being opposite to the common wiring portion 132.

The parallel wiring portion 133 has a width narrower than that of the connection portion 131. The parallel wiring portion 133 is extended with a constant width. The parallel wiring portion 133 is located on one side of the capacitor C1 with respect to a center line CL1 (see FIG. 23) bisecting the capacitor C1 in the X direction, so as not to extend over the center line CL1 in the X direction. The parallel wiring portion 133 connects to the connection portion 131 on the side adjacent to semiconductor device 20U (semiconductor chip 40U) in the alignment direction of the semiconductor devices 20U and 20L.

The parallel wiring portion 133 has substantially an L shape. The parallel wiring portion 133 has a parallel portion 134 extending in the Y direction from a boundary portion with the connection portion 131 and a bent portion 135 that is bent with respect to the parallel portion 134 and extend in the Z direction. Therefore, the parallel portion 134 is also referred to as a Y direction extension portion. The bent portion 135 is also referred to as a Z direction extension portion. The parallel portion 134 extends in the Y direction towards the opposite side to the common wiring portion 132. The parallel portion 134 is substantially flush with the connection portion 131 and extends in the Y direction.

In the projection view in the Z direction, the parallel portion 134 overlaps with at least a part of each of the seven main terminals 70C and 70E of the semiconductor device 20U. The parallel portion 134 extends up to substantially the same position as the projection tip end portions of the main terminals 70C of the semiconductor device 20U, and overlaps with the entire projected portions of the three main terminals 70C in the projection view. The four main terminals 70E extend up to a position that is farther from the capacitor C1 than the parallel portion 134.

The bent portion 135 extends towards the opposite side to the capacitor C1 in the Z direction. The bent portion 135 has a plate thickness direction to be substantially parallel to the Y direction. In the present example, the entirety of the bent portion 135 is a facing portion 135a facing the output bus bar 150 in the Y direction. The surface of the facing portion 135a and the surface of the output bus bar 150 in the plate thickness direction, that is, the plate surfaces thereof face each other. At the tip end of the facing portion 135a, that is, the tip end of the extension of the parallel wiring portion 133, projections 136 are formed so that the main terminals 70C of the semiconductor device 20U are connected thereto. The projections 136 are correspondingly provided for the main terminals 70. The main terminals 70C are joined by laser welding or the like in a state where the main terminals 70C are placed on end surfaces of the corresponding projections 136. When the projections 136 are provided in this way, the main terminals 70E pass through the recessed portions where the projections 136 are not provided, so that the contact between the P bus bar 130 and the main terminals 70E can be suppressed.

The N bus bar 140 includes a connection portion 141, a common wiring portion 142, and a parallel wiring portion 143. The connection portion 141 is a portion connected to the negative electrode terminal of the capacitor C1. In the present example, in the projection view in the Z direction, the entire portion overlapping with the capacitor C1 is the connection portion 141. Similarly to the connection portion 131, the connection portion 141 may be provided at the portion overlapping with the capacitor C1 in the projection view in the X direction or the Y direction, that is, on the lateral surface of the capacitor C1. The capacitor C1 and the connection portions 131 and 141 arranged on both surfaces of the capacitor C1 are electrically separated from the cooling unit 120. An electrical insulation member is provided between the capacitor C1 including the connection portions 131 and 141 and the cooling unit 120.

The common wiring portion 142 extends from one end of the connection portion 141 in the Y direction. The common wiring portion 142 is a portion that functions as the common wiring 11N in the N bus bar 140. As a result, the one upper and lower arm circuit 10 of the power module 110 and the capacitor C1 are not individually connected to the N line 13, but are commonly connected to the N line 13. The width of the common wiring portion 142 is narrower than the width of the connection portion 141, and substantially the same as that of the common wiring portion 132. The common wiring portion 142 connects to a central portion of the connection portion 141 in the X direction. The common wiring portion 142 is substantially flush with the connection portion 141 and extends in the Y direction. A part of the common wiring portion 132 projects to the outside of the protective member 180.

The common wiring portions 132 and 142 substantially coincide with each other in the projection view in the Z direction. The common wiring portions 132 and 142 are arranged so as to face each other with an interval substantially equal to the thickness of the capacitor C1 in the Z direction. As a result, the inductance of the main circuit wiring can be suppressed.

The parallel wiring portion 143 at least functions as a wiring electrically connecting the negative electrode terminal of the capacitor C1 and the lower arm 10L of the upper and lower arm circuit 10, that is, a wiring connecting the upper and lower arm circuit 10 and the capacitor C1 in parallel. Further, in the present example, the parallel wiring portion 143 also functions as a wiring electrically connecting the lower arm 10L to the common wiring 11N, that is, to the common wiring portion 142. The parallel wiring portion 143 extends from an end of the connection portion 141, the end being opposite to the common wiring portion 142.

A width of the parallel wiring portion 143 is narrower than that of the connection portion 141. The parallel wiring portion 143 is extended with a constant width. The parallel wiring portion 143 is arranged on the side opposite to the parallel wiring portion 133 with respect to the center line CL1 so as not to extend over the center line CL1 of the capacitor C1. The parallel wiring portion 143 connects to the connection portion 141 on the side adjacent to the semiconductor device 20L (semiconductor chip 40L) in the alignment direction of the semiconductor devices 20U and 20L.

The parallel wiring portion 143 has substantially an L shape. The parallel wiring portion 143 includes a parallel portion 144 extending in the Y direction from a boundary portion with the connection portion 141 and a bent portion 145 that is bent with respect to the parallel portion 144 and extends in the Z direction. The parallel portion 144 extends in the Y direction towards the opposite side to the common wiring portion 142. The parallel portion 144 is substantially flush with the connection portion 141 and extends in the Y direction. The parallel portions 134 and 144 are laterally arranged in the X direction with an interval therebetween for ensuring the electrical insulation. The lateral surfaces of the parallel portions 134 and 144 face each other. As a result, the inductance of the main circuit wiring can be reduced.

In the projection view in the Z direction, the parallel portion 144 overlaps with at least a part of each of the seven main terminals 70C and 70E of the semiconductor device 20L. The parallel portion 144 extends up to substantially the same position as the projected tip end portions of the main terminals 70E of the semiconductor device 20L, and overlaps with the entire projected portions of the four main terminals 70E in the projection view. The three main terminals 70C extend up to a position that is farther from the capacitor C1 than the parallel portion 144. The projected tip end portions of the main terminals 70C of the semiconductor device 20U and the projected tip end portions of the main terminals 70E of the semiconductor device 20L are substantially at the same position in the Y direction. As such, the end of extension of the parallel portion 134 and the end of extension of the parallel portion 144 are located at substantially the same position.

The bent portion 145 extends towards the opposite side to the capacitor C1 in the Z direction. The bent portion 145 has a plate thickness direction to be substantially parallel to the Y direction. The extended tip end of the bent portion 145 is located at substantially the same position as the extended tip end of the bent portion 135 of the P bus bar 130. The bent portions 135 and 145 are laterally arranged in the X direction with an interval therebetween for ensuring the electrical insulation. The lateral surfaces of the bent portions 135 and 145 face each other. As a result, the inductance of the main circuit wiring can be suppressed.

In the present example, the N bus bar 140 is located further from the semiconductor device 20 in the Z direction than the P bus bar 130. A part of the bent portion 145 is a facing portion 145a facing the output bus bar 150 in the Y direction. The plate surface of the facing portion 145a and the plate surface of the output bus bar 150 face each other. At the tip end of the facing portion 145a, that is, the tip end of the extension of the parallel wiring portion 143, projections 146 are formed so that the main terminals 70E of the semiconductor device 20L are connected thereto. The projections 146 are correspondingly provided for the main terminals 70E. The main terminals 70E are joined by laser welding or the like in a state where the main terminals 70E are placed on end surfaces of the corresponding projections 146. When the projections 146 are provided in this way, the main terminals 70C pass through the recessed portions where the projections 146 are not provided, so that the contact between the N bus bar 140 and the main terminals 70C can be suppressed.

The parallel wiring portion 133 and the main terminal 70C of the semiconductor device 20U connects the positive electrode of the capacitor C1 to the collector electrode of the upper arm 10U. The parallel wiring portion 143 and the main terminal 70E of the semiconductor device 20L connects the negative electrode of the capacitor C1 to the emitter electrode of the lower arm 10L. In this way, the upper and lower arm circuit 10 and the capacitor C are connected in parallel by the parallel wiring portion 133 and the main terminal 70C of the semiconductor device 20U, and the parallel wiring portion 143 and the main terminal 70E of the semiconductor device 20L, thereby forming the parallel circuit 11. The common wiring portions 132 and 142 connect the parallel circuit to the VH line 12H and the N line 13, which are the electric power lines.

The output bus bar 150 is a bus bar for connecting the connection point between the upper arm 10U and the lower arm 10L to a three-phase winding of the motor generator. The output bus bar 150 is also referred to as an O bus bar. The output bus bar 150 is arranged on the side adjacent to the main terminals 70 than the signal terminals 80 in the Y direction. The output bus bar 150 has the plate thickness direction in the Y direction, and extends in the X direction without having the bent portion. The output bus bar 150 forms at least a part of the output wiring 15 described above. Note that a current sensor (not shown) may be provided on a periphery of the output bus bar 150.

The output bus bar 150 has a wide width portion 151 having a larger length in the Z direction, that is, a larger width, and a narrow width portion 152 having a smaller width than the wide width portion 151. The narrow width portion 152 connects to an end of the wide width portion 151. The narrow width portion 152 is substantially flash with the wide width portion 151, and extends in the X direction. The wide width portion 151 is entirely located inside of the protective member 180. A part of the narrow width portion 152 is located inside of the protective member 180, and a remaining part of the narrow width portion 152 projects outside from the protective member 180.

The wide width portion 151 is arranged to substantially coincide with the area defined, in the X direction, between an end of the parallel wiring portion 143 further from the center line CL1 and an end of the parallel wiring portion 133 further from the center line CL1. The supply pipe 121 is arranged adjacent to the end of the wide width portion 151 in the X direction. The wide width portion 151 is arranged with the predetermined interval from the bent portions 135 and 145 in the Y direction. For example, the predetermined interval substantially corresponds to the length that is obtained by subtracting a plate thickness of the output bus bar 150 from a difference length between the protruded tip ends of the main terminals 70C and the protruded tip ends of the main terminals 70E of the semiconductor device 20U. The wide width portion 151 is arranged in an area in the Z direction from a position overlapping with the capacitor C1 to the position of the plate 125 of the heat exchange part 123 of the second stage.

The wide width portion 151 is formed with a plurality of through holes 153. The main terminals 70E of the semiconductor device 20U and the main terminals 70C of the semiconductor device 20L are inserted into the through holes 153. In the inserted state, the main terminals 70 are connected to the wide width portion 151 (output bus bar 150) by a laser welding or the like. The output bus bar 150 has a facing portion 154p for facing towards the P bus bar 130 and a facing portion 154n for facing towards the N bus bar 140 without overlapping the through holes 153. The facing portion 154p of the output bus bar 150 and the facing portion 135a of the P bus bar 130 face each other with the predetermined interval in the Y direction. The facing portion 154n of the output bus bar 150 and the facing portion 145a of the N bus bar 140 face each other with the predetermined interval in the Y direction.

Since the supply pipe 121 exists, the width of the parallel wiring portion 143 is narrower than that of the parallel wiring portion 133. As a result, the width of the facing portion 145a is narrower than that of the facing portion 135a. However, in the capacitor C1, since the negative electrode terminal is arranged on the surface opposite to the heat exchange part 123, the extension length in the facing portion 145a is obtained. The length of the facing portion 145a in the Z direction is longer than that of the facing portion 135a. As a result, the facing area between the facing portion 135a and the facing portion 154p is substantially equal to the facing area between the facing portion 145a and the facing portion 154n. The inductance can be reduced while suppressing the increase in side in the X direction.

The drive substrate 160 is provided by a printed substrate on which an electronic component (not shown) is mounted. The drive substrate 160 is formed with a drive circuit (driver) that receives the drive instruction from the control circuit 9. The drive substrate 160 corresponds to a circuit board. The drive substrate 160 has substantially a rectangular planar shape. In the present example, in regard to the size of the drive substrate 160, the length in the X direction is substantially the same as the length of the heat exchange parts 123 of the cooling unit 120 in the X direction, and the length in the Y direction is longer than the length of the heat exchange parts 123 in the Y direction. The drive substrate 160 is arranged so as to overlap with most of the semiconductor devices 20U and 20L, in the projection view in the Z direction. Specifically, the drive substrate 160 is arranged so as to overlap with the semiconductor devices 20U and 20L excluding the part of the main terminals 70. The part of the main terminals 70, the bent portions 135 and 145, and the output bus bar 150 are arranged so as not to overlap with the drive substrate 160 in the Y direction. On the side opposite to the main terminals 70, the common wiring portions 132 and 142 project more to outside than the drive substrate 160.

To the drive substrate 160, the signal terminals 80 of the semiconductor devices 20 are connected. In the present example, the drive substrate 160 is formed with multiple through holes (not shown), and the signal terminals 80 are respectively inserted into the through holes and mounted thereon. As a result, the drive signal from the drive circuit formed in the drive substrate 160 is output through the signal terminals 80. The signal terminals 80 are aligned in the X direction. The multiple signal terminals 80 are aligned in one row in the X direction in an area adjacent to an end of the drive substrate 160 in the Y direction, and insert-mounted on the drive substrate 160.

The external connection terminals 170 are terminals for electrically connecting a control substrate 290, on which the control circuit 9 is formed, and the drive substrate 160. The control substrate 290 will be described later. The multiple external connection terminals 170 are connected to the drive substrate 160. In the present example, the drive substrate 160 is formed with multiple through holes (not shown), and the external connection terminals 170 are respectively insert into the through holes and mounted on the drive substrate 160. A part of the external connection terminals 170 transmits the drive instruction of the control circuit 9 to the drive circuit portion of the drive substrate 160.

The external connection terminals 170 each have substantially an L shape. The external connection terminal 170 has one bent portion of approximately 90 degrees. Of the external connection terminal 170, a portion from the connection portion with the drive substrate 160 to the bent portion extends in the Z direction, and a portion from the bent portion to the tip end extends toward the common wiring portions 132 and 142 in the Y direction. A predetermined range from the tip end projects outside from the protective member 180.

The protective member 180 protects other elements forming the power module 110. The protective member 180 forms an outer shape of the power module 110. As the protective member 180, a sealing resin body integrally sealing the other elements, a case molded beforehand, or the like can be used. In a case where the protective member 180 is provided by the case, a potting material or the like may be used together in order to enhance the protection. In the present example, as the protective member 180, the sealing resin body is used. The sealing resin body is molded using a resin material such as an epoxy resin, and thus is also referred to as a molded resin or a resin molded body. The sealing resin body is, for example, formed by a transfer molding method.

The protective member 180 has one surface 181 and a rear surface 182 opposite to the one surface 181 in the Z direction. The one surface 181 and the rear surface 182 are plane surface orthogonal to the Z direction. The protective member 180 of the present example has a substantially truncated quadrangular pyramid shape. Therefore, the protective member 180 has four lateral surfaces 183 to 186. When the one surface 181 is defined as a reference surface, each of the lateral surfaces 183 to 186 is an inclined surface defining an acute angle with respect to the one surface 181.

Components of the power module 110 are arranged, in a direction from the one surface 181 toward the rear surface 182, in a stated order of the connection portion 141 of the N bus bar 140, the capacitor C1, the connection portion 131 of the P bus bar 130, the heat exchange part 123 of the first stage, the semiconductor device 20, the heat exchange part 123 of the second stage, and the drive substrate 160. The supply pipe 121 and the discharge pipe 122 project from the one surface 181 to the outside of the protective member 180. Nothing projects from the rear surface 182. Although not shown, the components may be arranged, in a direction from the one surface 181 toward the rear surface 182, in an order of the drive substrate 160, the heat exchange part 123 of the first stage, the semiconductor device 20, the heat exchange part 123 of the second stage, the connection portion 141 of the N bus bar 140, the capacitor C1, and the connection portion 131 of the P bus bar 130.

Figure 21:
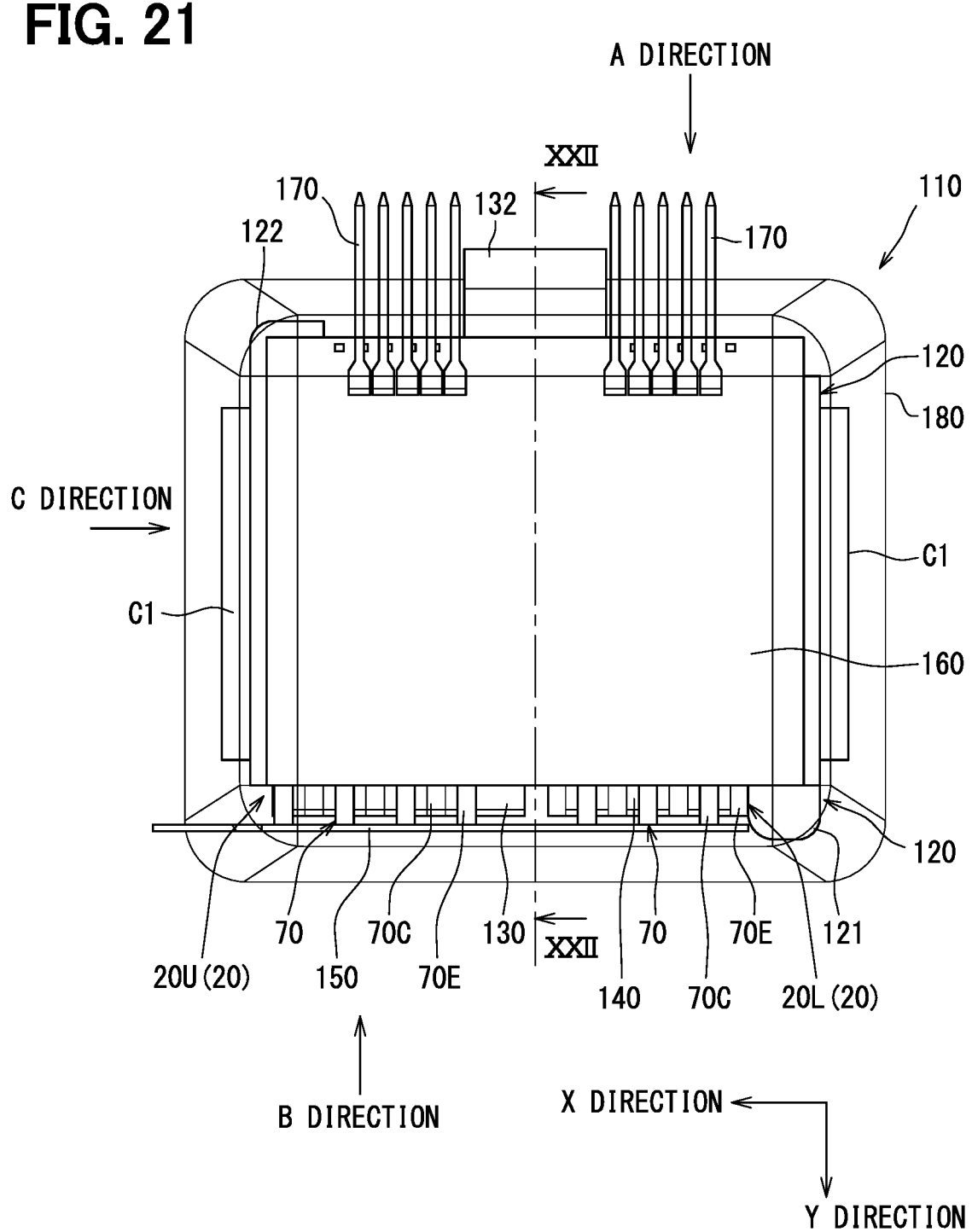
FIG. 21 is a plan view showing a power module.
Figure 22:
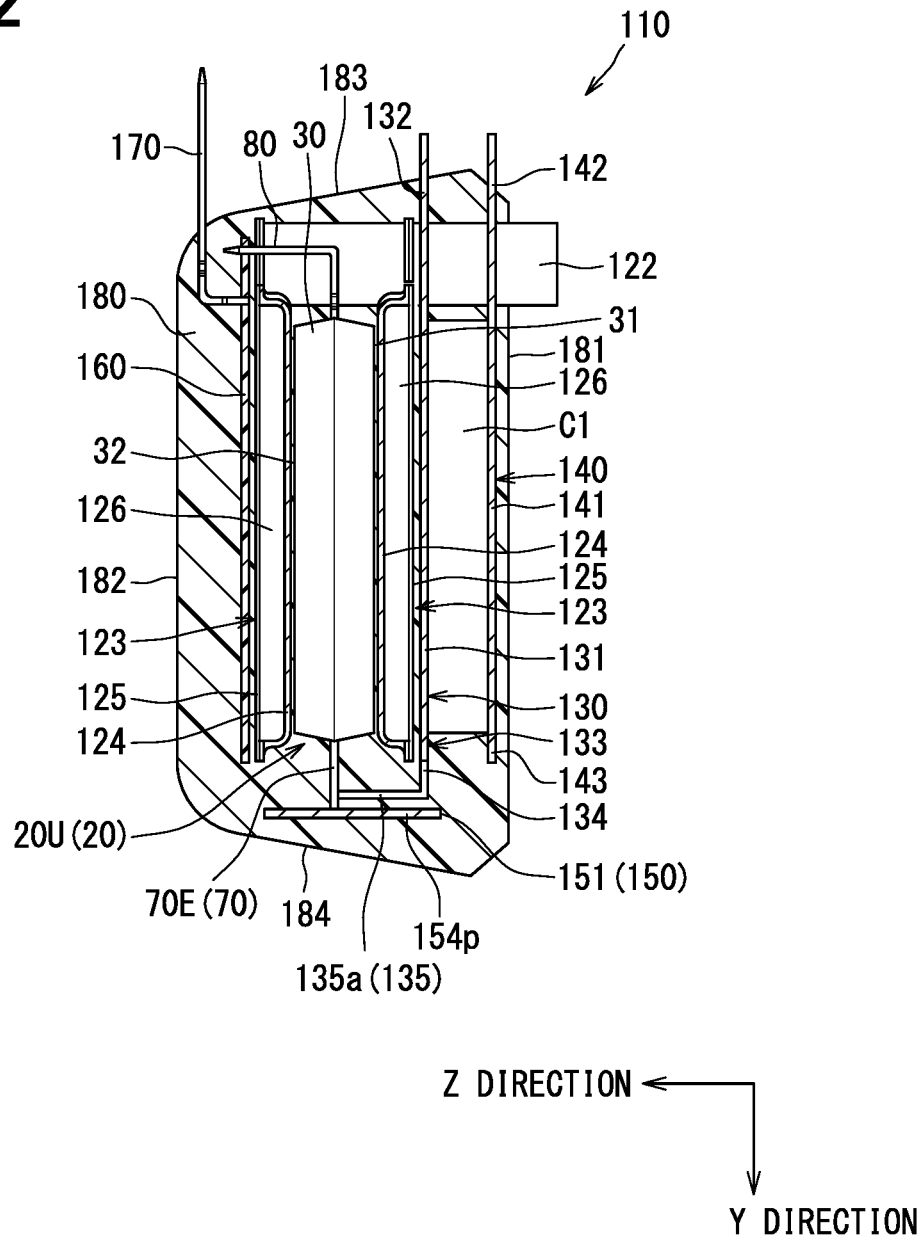
FIG. 22 is a cross-sectional view taken along a line XXII-XXII in FIG. 21.
Figure 23:
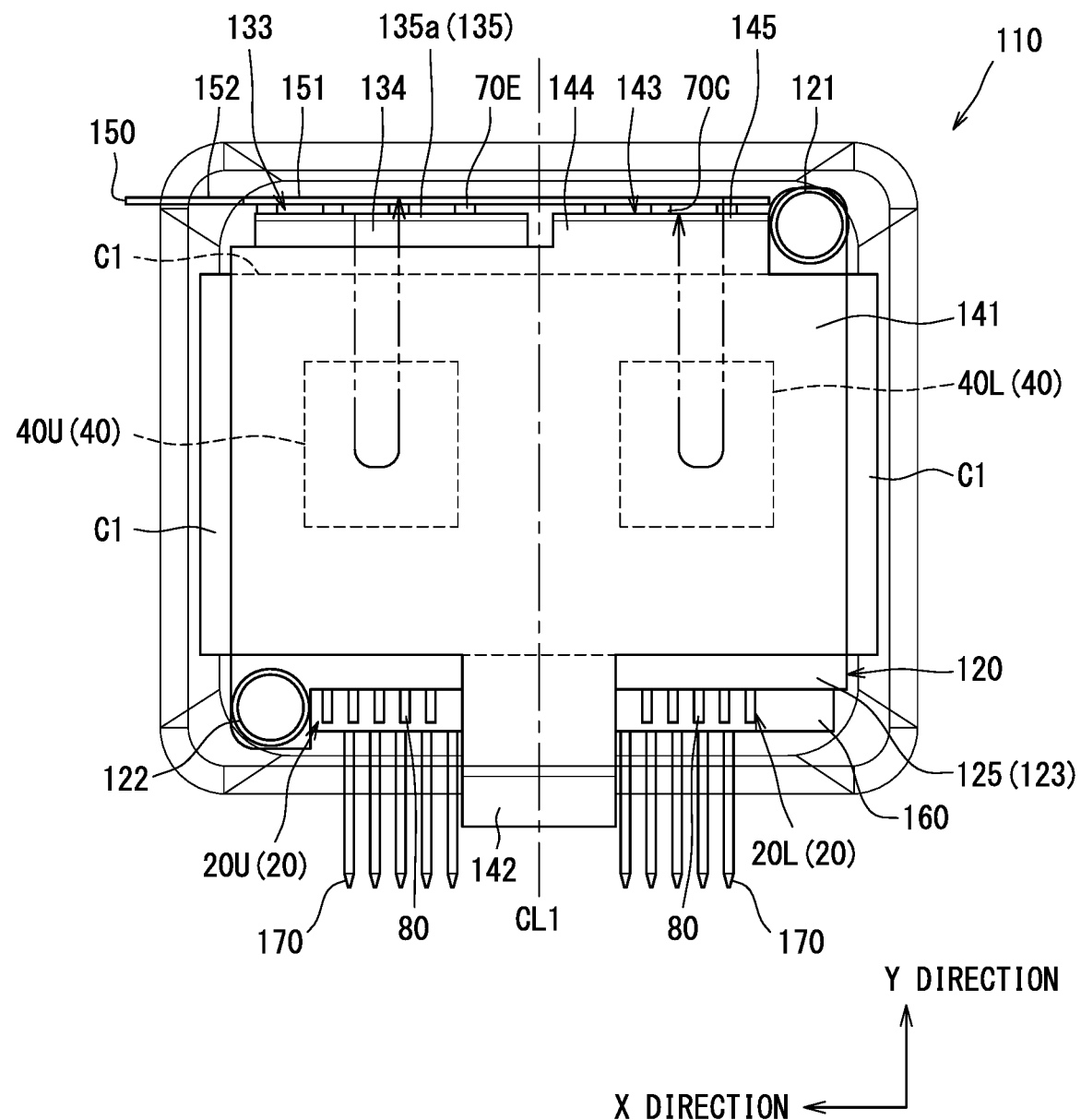
FIG. 23 is a plan view when the power module shown in FIG. 21 is viewed from a back side.
Figure 24:
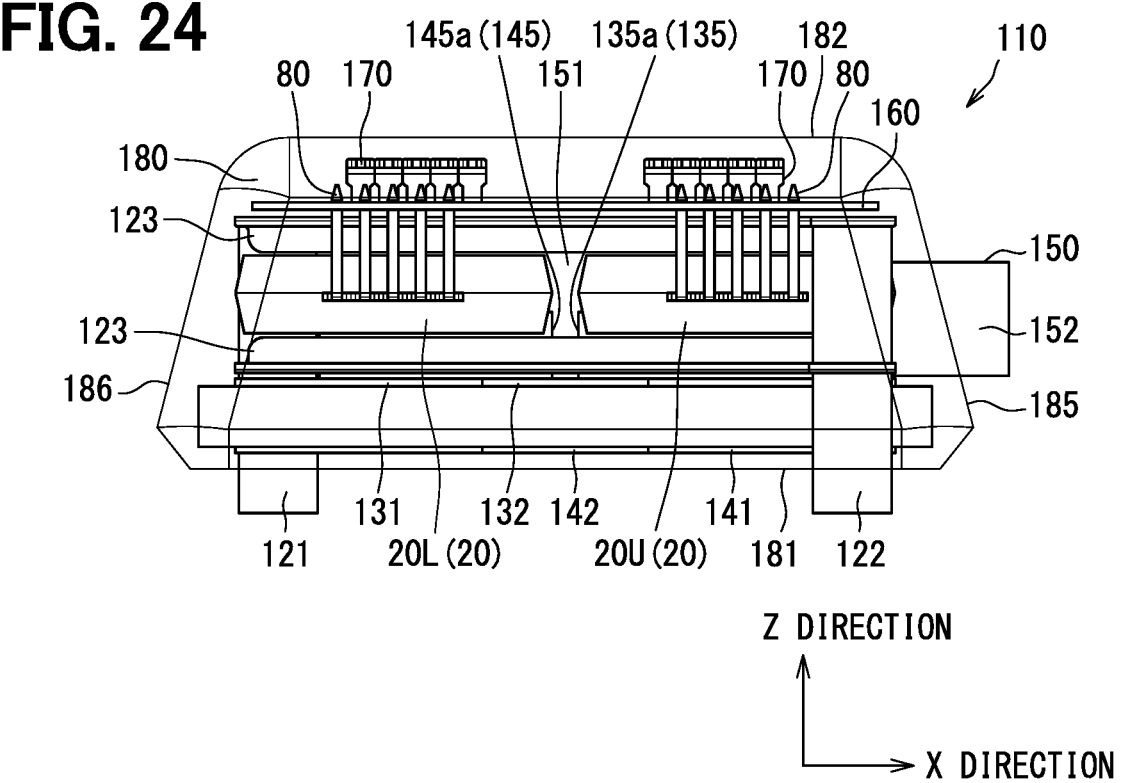
FIG. 24 is a plan view when the power module shown in FIG. 21 is viewed in a direction A.
Figure 25:
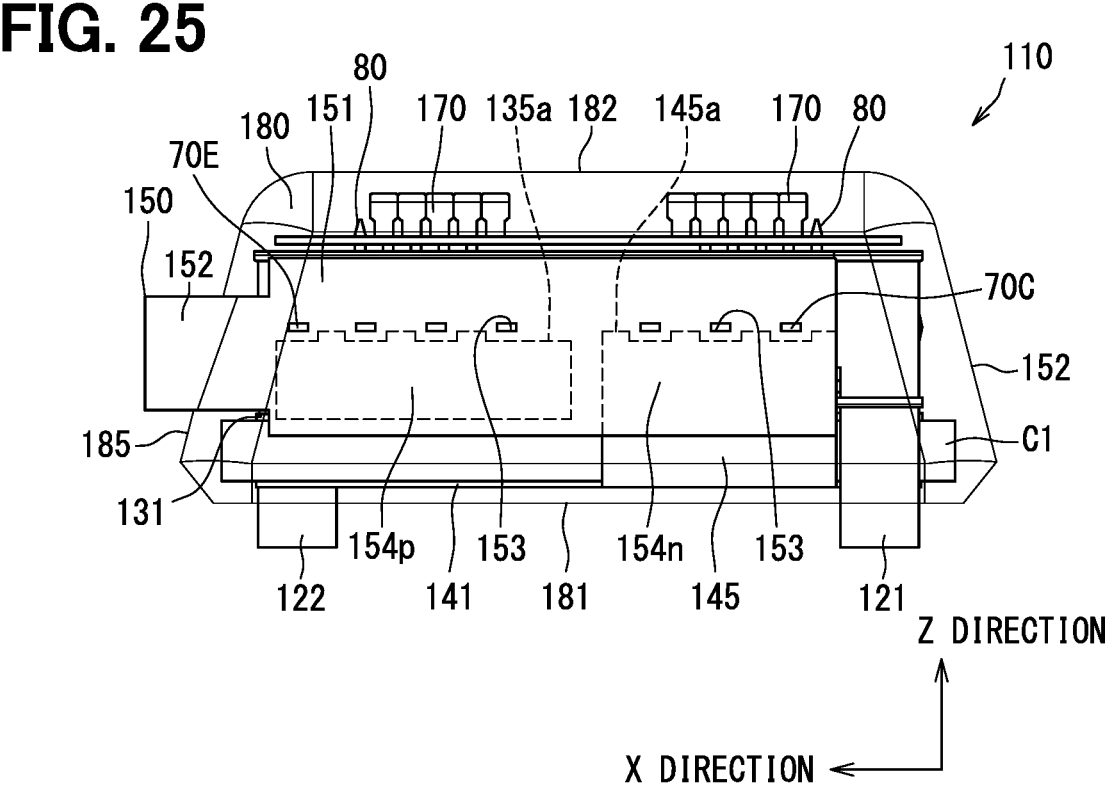
FIG. 25 is a plan view when the power module shown in FIG. 21 is viewed in a direction B.

The common wiring portions 132 and 142 of the P bus bar 130 and the N bus bar 140 project, in the Y direction, from the lateral surface 183 adjacent to the signal terminals 80 to the outside of the protective member 180. From the lateral surface 183, the external connection terminals 170 also project. As shown in FIG. 21, the common wiring portions 132 and 142 are arranged between the external connection terminals 170 of the semiconductor device 20U and the external connection terminals 170 of the semiconductor device 20L, in the X direction. As shown in FIG. 22, the external connection terminals 170 project at positions adjacent to the rear surface 182, and the common wiring portions 132 and 142 project at positions adjacent to the one surface 181. Nothing projects from the lateral surface 184 that is opposite to the lateral surface 183, that is, from the lateral surface 184 adjacent to the main terminals 70. The narrow width portion 152 of the output bus bar 150 projects to the outside of the protective member 180 in the X direction from a lateral surface 185 adjacent to the semiconductor device 20U. Nothing projects from the lateral surface 186 that is opposite to the lateral surface 185, that is, from the lateral surface adjacent to the semiconductor device 20L.

As described above, only the supply pipe 121 and the discharge pipe 122 project from the one surface 181 of the protective member 180. Therefore, in a case where a cooling unit different from the power module 110 is arranged adjacent to the one surface 181 so as to cool the power module 110, the cooling unit can be easily connected to the supply pipe 121 and the discharge pipe 122. Since the common wiring portions 132 and 142 project from the lateral surface different from the lateral surface from which the output bus bar 150 projects, the connection with the electric power lines or the three-phase winding can be simplified.

In this case, the surge generated in accordance with the switching of the upper and lower arm circuit 10 increases with an increase in the amount of current change (current change rate) per unit time, or with an increase in the wiring inductance. In the power module 110 described above, the wiring inductance is reduced, to thereby reduce the above-described surge. Hereinafter, of the structure of the power module 110, a structure that reduces the wiring inductance to enable the reduction of the surge will be described.

Figure 28:
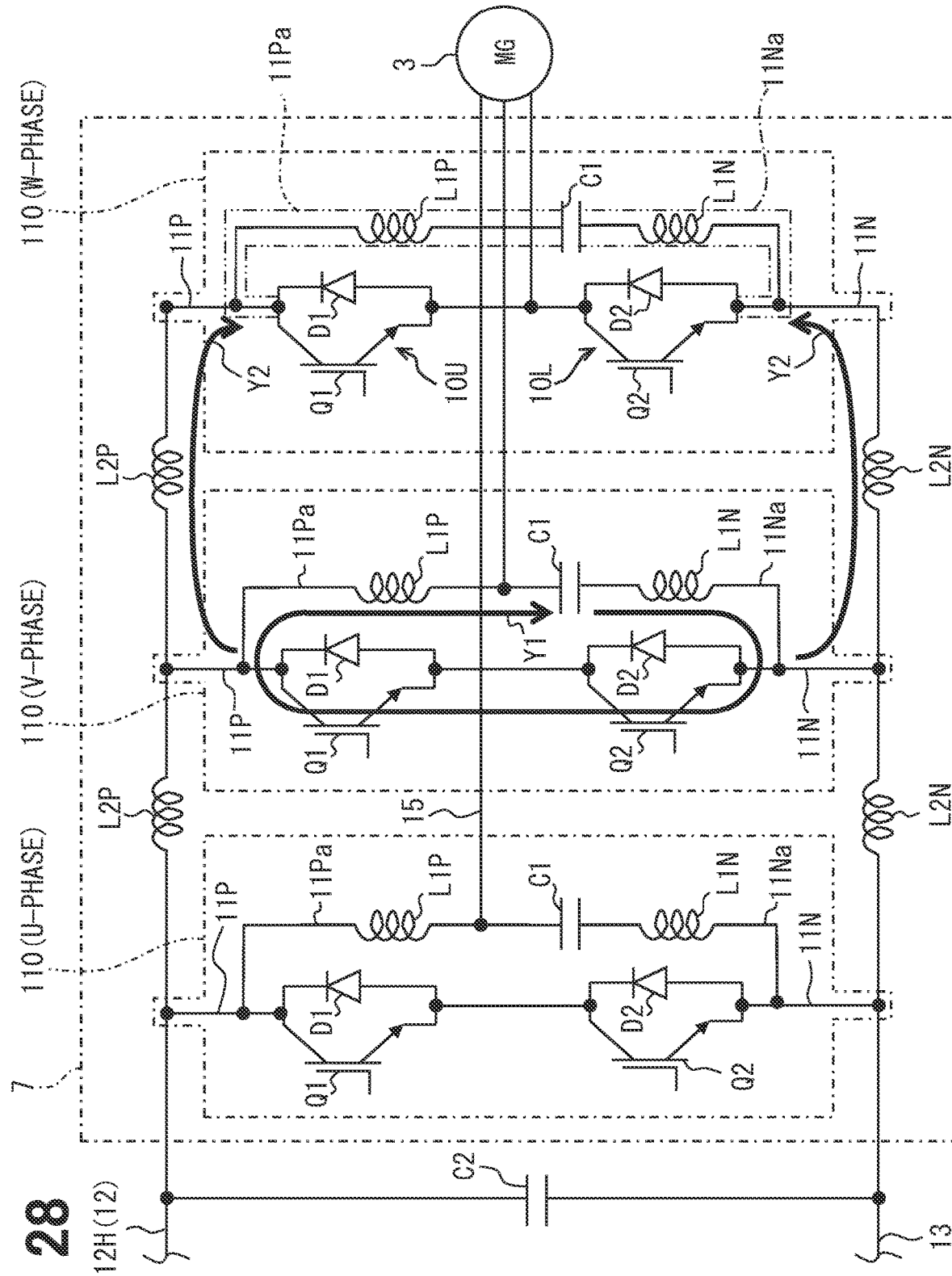
FIG. 28 is an equivalent circuit diagram including a wiring parasitic inductance.

FIG. 28 is a circuit diagram obtained by extracting the inverter 7, the smoothing capacitor C2, and the motor generator 3 from the equivalent circuit diagram of FIG. 1, and shows the wiring inductance parasitic on the circuit. As shown in a dashed dotted line of FIG. 28, the power modules 110 of the respective phases are connected in parallel between the P line 12 and the N line 13, as described above.

On the P line 12, the wiring inductance generated in a portion between connection portions to which the power modules 110 are connected is referred to as an interphase upper inductance L2P. Specifically, the wiring inductance generated in an interphase portion of the P line 12 defined between a connection portion with the common wiring portion 132 of the U phase and a connection portion with the common wiring portion 132 of the V phase is the interphase upper inductance L2P. Further, the wiring inductance generated in an interphase portion of the P line 12 defined between a connection portion with the common wiring portion 132 of the V phase and the a connection portion with the common wiring portion 132 of the W phase is the interphase upper inductance L2P. An impedance generated in proportion to the interphase upper inductance L2P is referred to as an interphase upper impedance.

On the N line 13, the wiring inductance generated in a portion between connection portions to which the power modules 110 of the respective phases are connected is referred to as an interphase lower inductance L2N. Specifically, the wiring inductance generated in an interphase portion of the N line 13 defined between a connection portion with the common wiring portion 142 of the U phase and a connection portion with the common wiring portion 142 of the V phase is the interphase lower inductance L2N. The wiring inductance generated at an interphase portion of the N line 13 defined between a connection portion with the common wiring portion 142 of the V phase and a connection portion with the common wiring portion 142 of the W phase is the interphase lower inductance L2N. An impedance generated in proportion to the interphase lower inductance L2N is referred to as an interphase lower impedance.

A wiring inductance of the electric path from the positive electrode terminal of the capacitor C1 to the upper arm 10U inside the power module 110 is referred to as an in-phase upper inductance L1P. Specifically, the wiring inductance generated on the parallel portion 134 and the bent portion 135 of the P bus bar 130 is the in-phase upper inductance L1P. A wiring of a portion where the in-phase inductance L1P is formed is referred to as an upper wiring 11Pa. An impedance generated in proportion to the in-phase upper inductance L1P is referred to as an in-phase upper impedance.

A wiring inductance of the electric path from the negative electrode terminal of the capacitor C1 to the lower arm 10L inside the power module 110 is referred to as an in-phase lower inductance L1N. Specifically, the wiring inductance generated on the parallel portion 144 and the bent portion 145 of the N bus bar 140 is the in-phase lower inductance L1N. A wiring of a portion where the in-phase lower in-phase L1N is formed is referred to as a lower wiring 11Na. An impedance generated in proportion to the in-phase lower inductance L1N is referred to as an in-phase lower impedance.

In FIG. 28, each impedance has been described in regard to the inverter 7 as an example. However, each impedance corresponds also to the inverter and the converter connected in parallel with the inverter 7, as described hereinafter. That is, the power module 110 provided in a first phase among the phases is referred to as a first power module, and the power module 110 provided in a second phase is referred to as a second power module. An impedance of an electric path from the positive electrode terminal of the capacitor C1 to the upper arm 10U in the first power module corresponds to the in-phase upper impedance. An impedance of an electric path from the positive electrode terminal of the capacitor C1 in the first power module to the upper arm 10U in the second power module corresponds to the interphase upper impedance. An impedance of an electric path from the negative electrode terminal of the capacitor C1 to the lower arm 10L in the first power module corresponds to the in-phase lower impedance. An impedance of an electric path from the negative electrode terminal of the capacitor C1 in the first power module to the lower arm 10L in the second power module corresponds to the interphase lower impedance.

A length of the wiring for forming the interphase upper inductance L2P is longer than a length of the wiring for forming the in-phase upper inductance L1P. Therefore, the interphase upper inductance L2P is larger than the in-phase upper inductance L1P, and the interphase upper impedance is larger than the in-phase upper impedance. A length of the wiring for forming the interphase lower inductance L2N is longer than a length of the wiring for forming the in-phase upper inductance L1P. Therefore, the interphase lower inductance L2N is larger than the in-phase lower inductance L1N, and the interphase lower impedance is larger than the in-phase lower impedance. Each of the interphase upper inductance L2P and the interphase lower inductance L2N is larger than a value obtained by adding the in-phase lower inductance L1N to the in-phase upper inductance L1P.

An arrow Y1 in FIG. 28 indicates a path in which the surge voltage is absorbed by the capacitor C1 in a closed loop circuit formed in the parallel circuit 11 in the V phase. This surge voltage is generated when the switching elements Q1 and Q2 in the V phase are turned on and turned off. Similarly, also in the U phase or the W phase, the surge voltage is absorbed by the capacitor C1 as shown by the arrow Y1. The surge voltage generated and absorbed in the same phase as described above is also referred to as a self-surge voltage in the following description.

The closed loop circuit is a circuit formed by the above-described parallel circuit 11. In the closed loop circuit, the positive electrode terminal of the capacitor C1, the upper wiring 11Pa, the upper and lower arm circuit 10, the lower wiring 11Na, and the negative electrode of the capacitor C1 are connected in series in this order. The closed loop circuit does not include the electric power line. The closed loop circuit is the path in which the surge voltage is absorbed as described above, and is also referred to as a path in which the electric charges required for the switching of the switching elements Q1 and Q2 are supplied from the capacitor C1 to the switching elements Q1 and Q2.

The closed loop circuit is a circuit that does not include the common wirings 11P and 11N. In other words, the P bus bar 130 is branched into a portion shown by a long dashed double-dotted line in FIG. 28 for forming the upper wiring 11Pa and a portion for forming the common wiring 11P. The common wiring 11P of the P bus bar 130 is also referred to as an upper electric power wiring that connects the P line 12 and the upper wiring 11Pa. The N bus bar 140 is branched into a portion shown by a long dashed double-dotted line in FIG. 28 for forming the lower wiring 11Na and a portion for forming the common wiring 11N. The common wiring 11N of the N bus bar 140 is also referred to as a lower electric power wiring that connects the N line 13 and the lower wiring 11Na.

An arrow Y2 in FIG. 28 indicates a path when the self-surge voltage generated in the V phase propagates from the closed loop circuit in the V phase to the closed loop circuit in the W phase via the electric power line. The surge voltage that interferes with the multiple upper and lower arm circuits 10 in such a manner is also referred to as an interference surge voltage in the following description. Similarly to the interference surge voltage propagating between the V phase and the W phase, the interference voltage may occur between the V phase and the U phase or between the W phase and the U phase.

However, since the interphase upper inductance L2P is sufficiently larger than the in-phase upper inductance L1P, the interference surge voltage propagated from another phase to the own phase hardly occurs. The interference surge voltage is extremely smaller than the self-surge voltage.

When the electric charges are supplied to the upper and lower arm circuit 10 connected in parallel, the electric charges are instantaneously supplied from the smoothing capacitor C2 to the capacitor C1. As a result, the capacitor C1 can be made in a state that can supply the electric charges again.

Next, effects of the above-described power module 110 will be described.

The power module 110 includes the upper and lower arm circuit 10, the capacitor C1, the upper wiring 11Pa, the lower wiring 11Na, the common wiring 11P as the upper electric power wiring, and the common wiring 11N as the lower electric power wiring. The upper wiring 11Pa connects the positive electrode terminal of the capacitor C1 and the upper arm 10U. The lower wiring 11Na connects the negative electrode terminal of the capacitor C1 and the lower arm 10L. The common wirings 11P and 11N respectively connect the upper wiring 11Pa and the lower wiring 11Na to the electric power lines.

Accordingly, the power module 110 forms the closed loop circuit that does not include the electric power line. Therefore, when the electric charges required for the switching of the upper and lower arm circuit 10 are supplied from the capacitor C1, the electric charge supply path does not include the electric power line. As such, the wirings of the path, that is, the upper wiring 11Pa and the lower wiring 11Na can be shortened. On the other hand, when the capacitor C1 is abolished contrary to the present embodiment, the electric charges required for the switching are supplied from the smoothing capacitor C2. In such a case, since the electric power path for supplying the electric charges from the smoothing capacitor C2 to the upper and lower arm circuit 10 includes the electric power line, the electric path cannot be sufficiently shortened.

As described above, according to the above described power module 110, it is possible to easily shorten the wiring length that is one factor of the surge voltage occurrence, as compared with the configuration in which the capacitor C1 is abolished. Therefore, the wiring inductances L1P and L1N related to the self-surge voltage can be reduced, and the self-surge voltage generated at the upper and lower arm circuit 10 can be reduced. Moreover, since the above-described closed loop circuit does not include the electric power line, the self-surge voltage is less likely to be super-imposed on the self-surge voltage. Therefore, it is less likely that the self-surge voltage will interfere with the other upper and lower arm circuits 10 through the electric power line.

The power module 110, which is capable of reducing the surge voltage as described above, is provided for each of the phases. Therefore, it is possible to enhance the suppression of the self-surge voltage interference between the upper and lower arm circuits 10 through the electric power line.

Further, in the present example, the upper arm 10U has the multiple main terminals 70C connected to the upper wiring 11Pa, and the lower arm 10L has the multiple main terminals 70E connected to the lower wiring 11Na. Therefore, the self-surge voltages of the adjacent main terminals 70C and 70E act so as to cancel out each other, and it is possible to reduce the in-phase upper inductance L1P and the in-phase lower inductance L1N. As such, the suppression of the self-surge voltage is enhanced.

Further, in the present example, the output bus bar 150 (that is, output wiring 15) connecting the main terminals 70E of the upper arm 10U and the main terminals 70C of the lower arm 10L is provided. The output bus bar 150 has the facing portions 154p and 154n facing the upper wiring 11Pa and the lower wiring 11Na. Therefore, the self-surge voltages act so as to cancel out each other between the facing portions 154p and 154n of the output bus bar 150 and the upper wiring 11Pa and the lower wiring 11Na. Hence, it is possible to reduce the in-phase upper inductance L1P and the in-phase lower inductance L1N. As such, the suppression of the self-surge voltage is enhanced.

In the present example, particularly, in the configuration having the semiconductor devices 20 of the 1-in-1 package structure, the P bus bar 130 and the N bus bar 140 face the output bus bar 150 in the Y direction, as described above. In the projection view in the Y direction, the output bus bar 150 and the semiconductor devices 20 overlap each other. The facing portion 135a of the P bus bar 130 is arranged between the semiconductor chip 40U and the output bus bar 150 in the Y direction. Similarly, the facing portion 145a of the N bus bar 140 is arranged between the semiconductor chip 40L and the output bus bar 150 in the Y direction. As a result, the current path from the P bus bar 130 to the output bus bar 150 via the semiconductor chip 40U and the current path from the output bus bar 150 to the N bus bar 140 via the semiconductor chip 40L are formed as shown by the long dashed double-dotted line arrows in FIG. 23. Accordingly, it is possible to reduce the area of the current loop, as compared with a 2-in-1 package in which two semiconductor chips forming the upper and lower arm circuit 10 are formed in one package. As a result, the self-surge voltage can be further reduced.

Further, in the present example, the interphase upper impedance is larger than the in-phase upper impedance. The interphase lower impedance is larger than the in-phase lower impedance. Therefore, as shown by the arrows Y2 in FIG. 28, it is possible to restrict the surge voltage from propagating over the closed loop circuit of each phase and interfering.

Further, in the present example, the smoothing capacitor C2 is connected to the upper and lower arm circuit 10 in parallel, and smooths the voltage of the electric power line. According to this, the voltage fluctuation of the electric power line can be suppressed. Since the electric charges can be instantaneously supplied from the smoothing capacitor C2 to the capacitor C1, the capacitance of the capacitor C1 can be reduced. As such, it is possible to reduce the size of the capacitor C1.

The example in which the two semiconductor devices 20 each having the 1-in-1 package structure are used as the semiconductor devices 20 has been described. However, the present embodiment is not limited to the example described. A semiconductor device having a 2-in-1 package structure in which elements for the two arms (upper arm 10U and lower arm 10L) forming the upper and lower arm circuit 10 are packaged in a unit can be used.

The arrangement of the main terminals 70 is not limited to the example described above. In the case of the 1-in-1 package, the semiconductor device 20 may have at least one main terminal 70C and at least one main terminal 70E. The main terminal 70 having the same potential may be divided into multiple terminals. For example, the main terminal 70C may be divided into multiple terminals. By parallelizing the multiple terminals, it is possible to reduce the entire inductance of the divided terminals. In the case of the 2-in-1 package, it is sufficient to have at least one main terminal 70C of the upper arm 10U, and at least one main terminal 70E of the lower arm 10L, and at least one output terminal.

Figure 29:
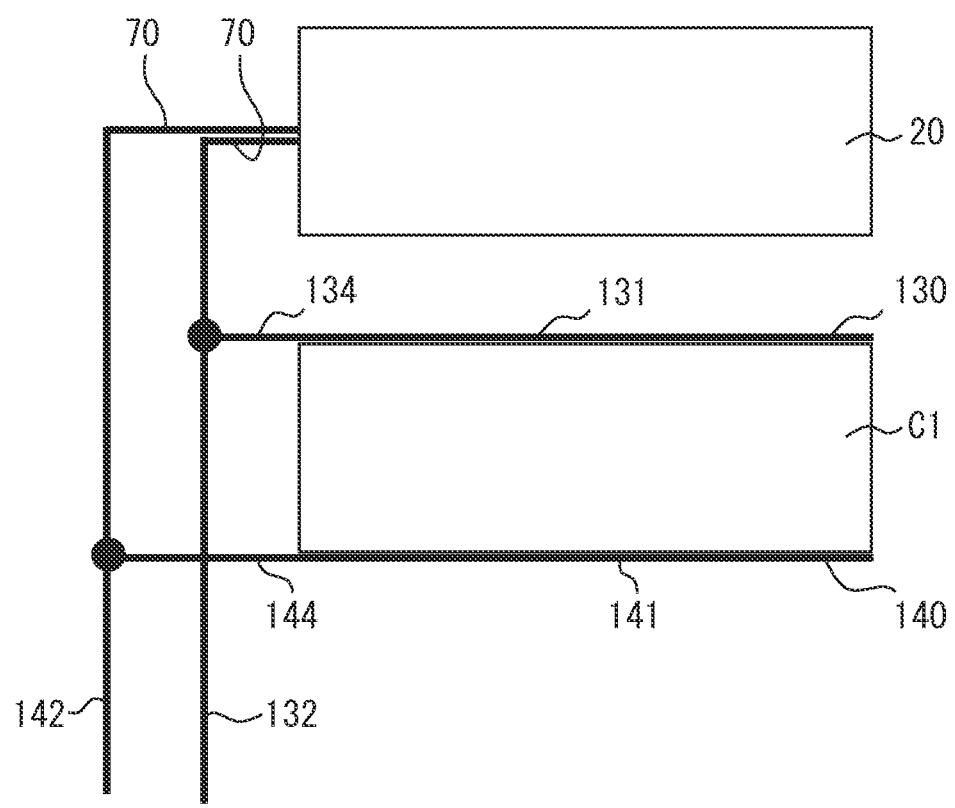
FIG. 29 is a schematic diagram showing another example of FIG. 27.

In the example shown in FIG. 27, the common wiring portions 132 and 142 extend opposite to the parallel portions 134 and 144 with respect to the connection portions 131 and 141. On the other hand, as shown in FIG. 29, the common wiring portions 132 and 142 may extend on the same side as the parallel portions 134 and 144 with respect to the connection portions 131 and 141. The extending direction of the common wiring portions 132 and 142 may be differentiated between the upper arm 10U and the lower arm 10L. For example, the common wiring portions 132 and 142 may not be arranged so as to face each other.

In the example shown in FIG. 27, the upper arm 10U and the lower arm 10L have the multiple main terminals 70C and 70E. However, the upper arm 10U and the lower arm 10L may have at least one main terminal 70C and one main terminal 70E. In the example shown in FIG. 27, the main terminal 70C and the main terminal 70E are alternately arranged. Alternatively, the multiple main terminals 70C may be arranged next to each other or the multiple main terminals 70E may be arranged next to each other.

Contrary to the example shown in FIG. 27, the interphase upper impedance may be smaller than the in-phase upper impedance. The interphase lower impedance may be smaller than the in-phase lower impedance.

As another example of the power module 110, at least one of the cooling unit 120, the drive substrate 160, and the protective member 180 may be deleted from the power module 110. The electric power conversion device 5 may not have the smoothing capacitor C2. The capacitor C1 may be arranged outside the protective member 180. The structure of the cooling unit 120 may not be limited to the example described above. A part of the semiconductor device 20 forming the upper and lower arm circuit 10 may be inserted into the flow path 126 of the cooling unit 120 to be immersed in the refrigerant. In such a configuration, the capacitor C1 may be placed on the cooling unit 120 to be connected to the semiconductor device 20. In the case where the capacitor C1 is immersed in the refrigerant, it is possible to suppress the surge voltage while cooling the semiconductor device 20 from both sides.

(Motor Generator)

Figure 30:
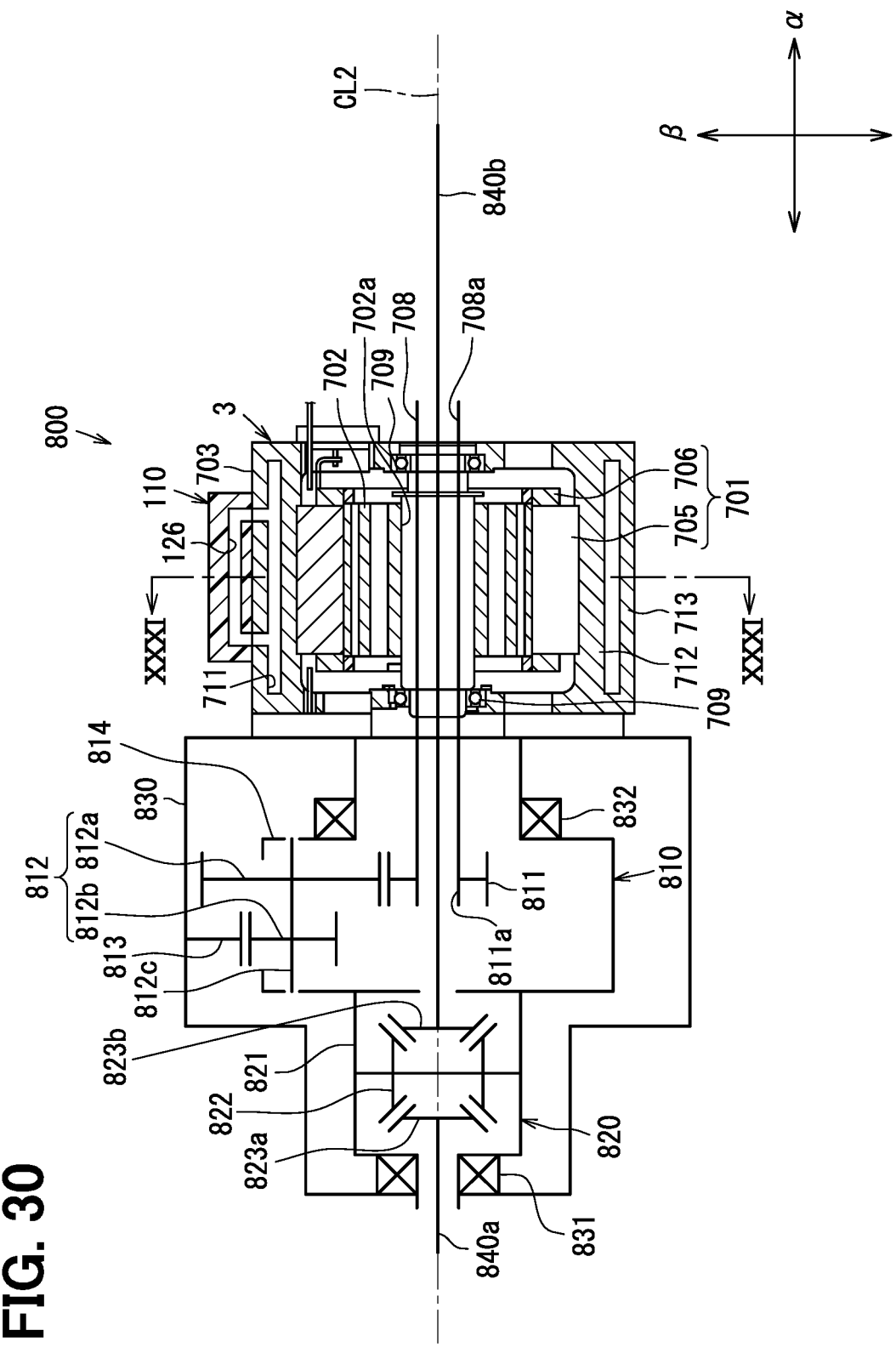
FIG. 30 is a diagram showing a schematic configuration of a rotary electric machine.
Figure 31:
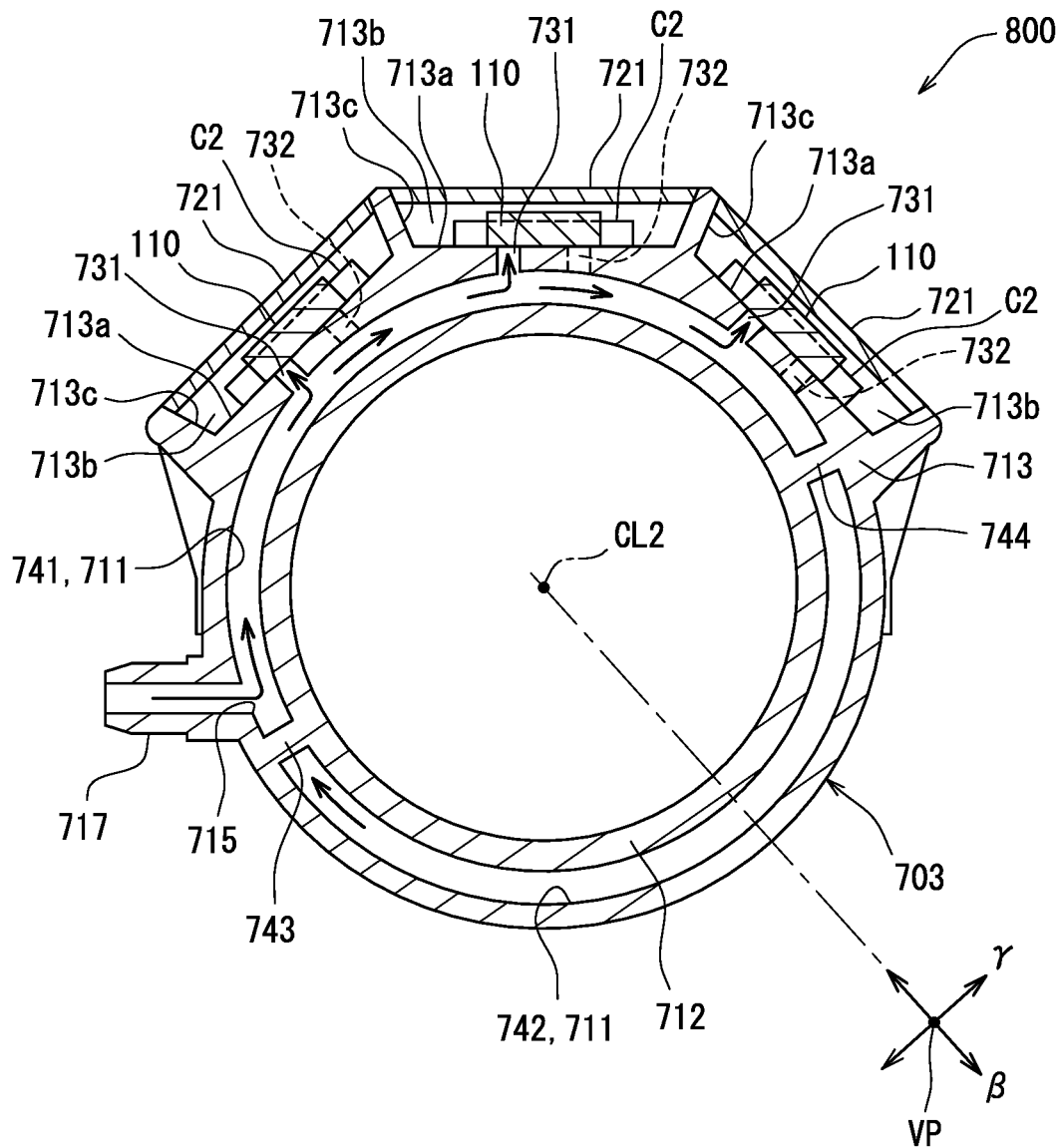
FIG. 31 is a cross-sectional view taken along a line XXXI-XXXI in FIG. 30.

As shown in FIG. 30, the motor generator 3 has an annular stator 701, a rotor 702 provided inside the stator 701, and a housing 703 accommodating the stator 701 and the rotor 702 therein. The motor generator 3 corresponds to a rotary electric machine. In the present embodiment, the rotor 702 rotates about the center line CL2 of the rotor 702, and a direction in which the center line CL2 extends is referred to as an axial direction α. In this case, a radial direction β of the stator 701 and a circumferential direction γ of the stator 701 are both orthogonal to the axial direction α. In FIG. 31, a virtual point VP on the center line CL2 is assumed. At the virtual point VP, the axial direction α, the radial direction β, and the circumferential direction γ are orthogonal to each other.

As shown in FIG. 30, the stator 701 is fixed to the housing 703, and the outer peripheral surface of the stator 701 faces the housing 703. The stator 701 includes an annular stator core 705 and a stator winding 706 wound around the stator core 705. The stator core 705 is formed by a plurality of annular electromagnetic steel sheets stacked in the axial direction α, so that the stator core 705 has a tubular shape as a whole. The stator winding 706 includes a plurality of conductor segments. The stator winding 706 is formed by connecting these conductor segments to each other in a state of being mounted on the stator core 705. The conductor segment includes a long conductor and an insulating coating covering the outer peripheral surface of the conductor. The insulating film is formed of a resin material such as a polyimide resin. The stator core 705 is provided with a plurality of slots penetrating in the stator core 705 in the axial direction α. The conductor segments are inserted into the slots, thereby to form the stator core 705.

The rotor 702 has a rotor hole 702a that is coaxial with the rotor 702 and extends along the center line CL2. Thus, the rotor 702 has an annular shape due to the rotor hole 702a. The rotor 702 includes a plurality of permanent magnets, and the outer peripheral surface of the rotor 702 is formed by these permanent magnets. In the rotor 702, the plurality of permanent magnets form a plurality of magnetic poles having alternately different polarities in the circumferential direction γ. The outer peripheral surface of the rotor 702 is separated from the inner peripheral surface of the stator 701 in a radially inward direction.

The motor generator 3 includes a motor shaft portion 708 fixed to the rotor 702 and bearing portions 709 that rotatably supports the motor shaft portion 708. The center line of the motor shaft portion 708 coincides with the center line CL2 of the rotor 702, and the motor shaft portion 708 rotates together with the rotor 702. The motor shaft portion 708 extends from the rotor 702 in the axial direction α. The motor shaft portion 708 is fixed to the rotor 702 in a state of being inserted in the rotor hole 702a. The motor shaft portion 708 is a long tubular member, and has a motor shaft hole 708a coaxial with the motor shaft portion 708 and extending along the center line CL2. The bearing portions 709 are fixed to the housing 703. Two bearing portions 709 are provided so as to be spaced apart from each other in the axial direction α.

As shown in FIG. 30 and FIG. 31, the housing 703 has a housing flow path 711 through which a refrigerant flows. In the housing 703, the housing flow path 711 is provided between the inner peripheral surface and the outer peripheral surface arranged in the radial direction β. The housing flow path 711 extends in the radial direction β and the circumferential direction γ. The housing flow path 711 extends along the outer peripheral surface of the stator 701, and is circular while going around in the circumferential direction γ. In the axial direction α, the length dimension of the housing flow path 711 is larger than the length dimension of the stator 701, and both ends of the housing flow path 711 project outward from the stator 701. Note that in FIG. 31, components such as the stator 701 and the rotor 702 accommodated in the housing 703 are not shown.

The housing 703 has an inner cooling part 712 provided inside the housing flow path 711 in the radial direction and an outer cooling part 713 provided on the outer side of the housing flow path 711 in the radial direction. The housing 703 is made of a metal material. In particular, at least the inner cooling part 712 and the outer cooling part 713 are made of a material having thermal conductivity. The inner cooling part 712 forms at least a part of the inner peripheral surface of the housing 703, and the outer cooling part 713 forms at least a part of the outer peripheral surface of the housing 703. The inner cooling part 712 and the outer cooling part 713 extend in the axial direction α and the circumferential direction γ along the housing flow path 711, and each forms an annular shape by circulating in the circumferential direction γ. The inner cooling part 712 covers the entire housing flow path 711 on the radially inner side of the housing flow path 711, and the outer cooling part 713 covers the entire housing flow path 711 on the radially outer side. The inner cooling part 712 corresponds to a first cooling part and a housing cooling part, and the outer cooling part 713 corresponds to a second cooling part.

The housing 703 has an inner peripheral part that forms an inner peripheral surface of the housing 703 and an outer peripheral part that forms an outer peripheral surface of the housing 703. The inner cooling part 712 is included in the inner peripheral part and forms at least a portion of the inner peripheral part. The outer cooling part 713 is included in the outer peripheral part and forms at least a portion of the outer peripheral part.

The housing 703 has an inflow hole 715 (see FIG. 34) for allowing the refrigerant to flow into the housing flow path 711 and an outflow hole 716 (see FIG. 34) for allowing the refrigerant to flow out from the housing flow path 711. The inflow hole 715 and the outflow hole 716 are through holes that penetrate the outer cooling part 713 in the radial direction β. The housing 703 is provided with an inflow pipe 717 that allows the refrigerant to flow into the inflow hole 715 and an outflow pipe 718 that allow the refrigerant to flow out from the outflow hole 716. The inflow pipe 717 and the outflow pipe 718 extend radially outward from the housing 703, and can connect to the refrigerant pipe through which the refrigerant flows.

A vehicle is equipped with a cooling circuit that cools the refrigerant flowing through the housing flow path 711. The cooling circuit includes a heat exchanger, such as a radiator, that cools the refrigerant by heat exchange with air or the like, a circulation pump that circulates the refrigerant, and a refrigerant pipe that circulates the refrigerant. In the cooling circuit, the housing flow path 711 is connected in series with the heat exchanger, and the refrigerant cooled by the heat exchanger flows into the housing flow path 711. The refrigerant pipe of the cooling circuit is connected to the inflow pipe 717 and the outflow pipe 718.

In the housing 703, when the refrigerant cooled by the cooling circuit flows into the housing flow path 711, the internal cooling part 712 and the external cooling part 713 are cooled by the refrigerant. Then, heat exchange is performed between the inner cooling part 712 and the stator 701, and hence the stator 701 is cooled.

(Electric Power Conversion Device)

Figure 32:
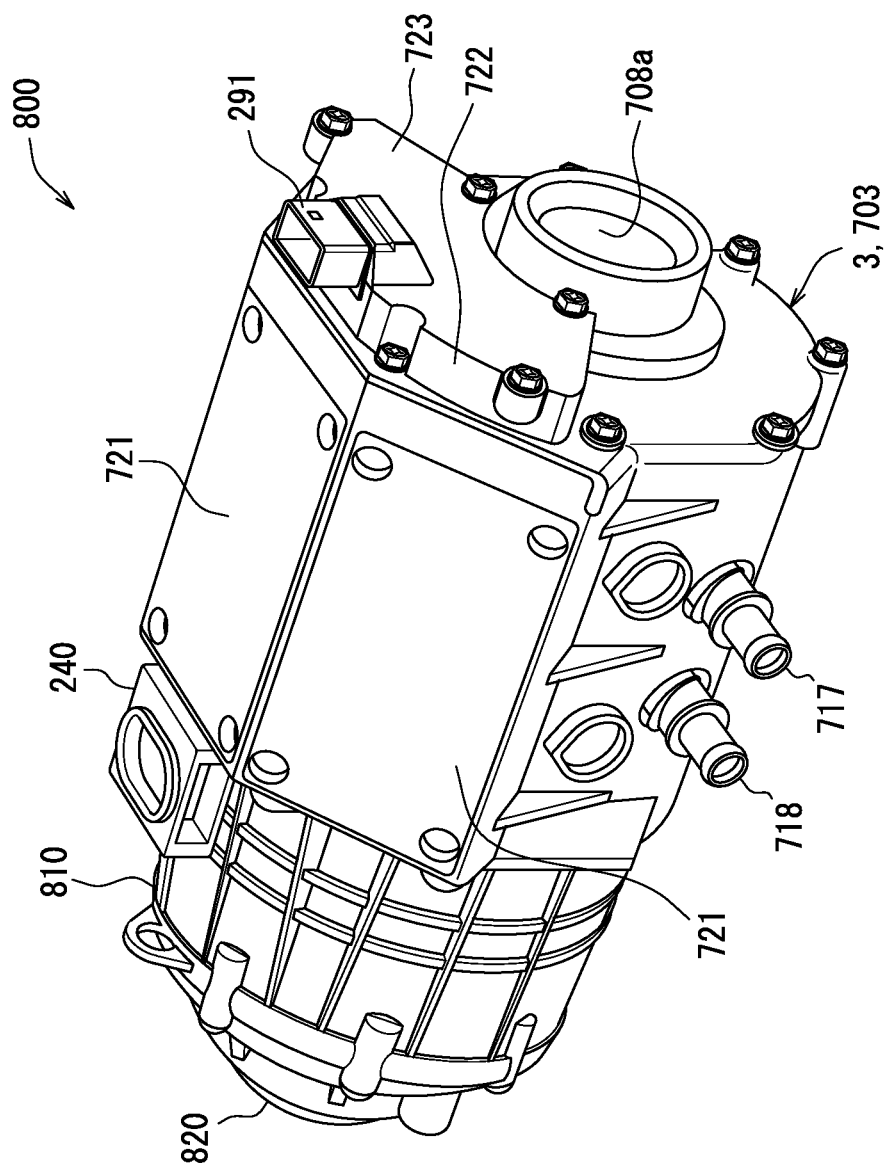
FIG. 32 is a perspective view of a rotary electric machine unit.

The electric power conversion device 5 is attached to the motor generator 3. A unit in which the electric power conversion device 5 and the motor generator 3 are assembled and integrated with each other is referred to as an electromechanical integrated-type motor unit 800. As shown in FIG. 32, the motor unit 800 has a speed reducer 810 and a differential gear 820. The speed reducers 810 and the differential gear 820 are attached to the motor generator 3 in the similar manner to the electric power conversion device 5. The speed reducer 810 and the differential gear 820 will be described later. The motor unit 800 corresponds to a rotary electric machine unit.

In the present embodiment, the electric power conversion device 5 does not have a storage case for accommodating components such as the power modules 110 and the smoothing capacitor C2. That is, the electric power conversion device 5 is not packaged into one package. Therefore, the components of the electric power conversion device 5 are individually attached to the housing 703.

As described above, the motor generator 3 is a three-phase rotary electric machine, and the power conversion device 5 has the power modules 110 correspondingly for the respective phases such as the U-phase, V-phase, and W-phase. The electric power conversion device 5 includes multiple smoothing capacitors C2. In this embodiment, the electric power conversion device 5 has three power modules 110 and three smoothing capacitors C2.

Figure 33:
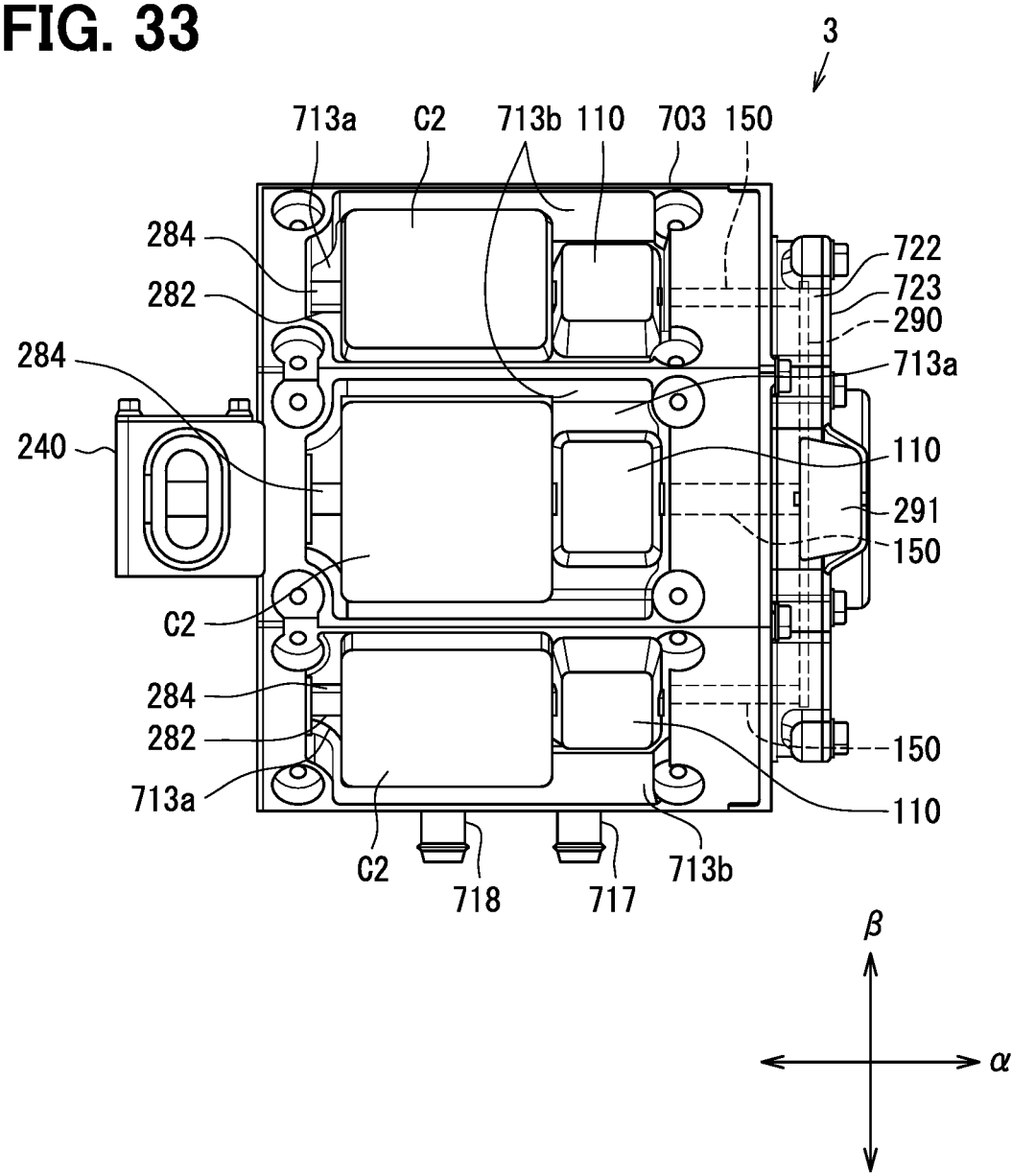
FIG. 33 is a view of a motor generator when viewed in a radial direction.

As shown in FIG. 33, the power modules 110 and the smoothing capacitors C2 are individually attached to the outer peripheral surface of the housing 703. The three power modules 110 are arranged in the circumferential direction γ. Each of the three power modules 110 extends in the tangential direction orthogonal to the radial direction β and extends in the axial direction α. The three power modules 110 are not arranged evenly in the circumferential direction γ, but the two power modules 110 at both ends are arranged adjacent to the middle power module 110 in the circumferential direction γ. For example, assuming a cross-section of the housing 703 taken in a direction orthogonal to the center line CL2, the three power modules 110 are included in a range of a central angle of 180 degrees.

Similarly to the three power modules 110, the three smoothing capacitors C2 are also arranged in the circumferential direction. The power module 110 and the smoothing capacitor C2 are arranged one by one in the axial direction α, and both extend in the tangential direction orthogonal to the radial direction β and extend in the axial direction α. In this case, there are three sets of the power module 110 and the smoothing capacitor C2 arranged in the axial direction α. In each set, the power module 110 is located between one end of the housing 703 and the smoothing capacitor C2. That is, in each set, the arrangement order of the power module 110 and the smoothing capacitor C2 in the axial direction α is the same.

The housing 703 has an installation surface 713a on the outer cooling part 713. The installation surface 713a is a part of the outer peripheral surface formed by the outer cooling part 713, and extends in the tangential direction orthogonal to the radial direction β and the axial direction α. Three installation surfaces 713a are arranged in the circumferential direction γ, and one set of the power module 110 and the smoothing capacitor C2 is installed on one installation surface 713a.

As shown in FIGS. 31 and 33, the outer cooling part 713 is provided with installation recesses 713b each recessed in a radially inward direction. The bottom surface of the installation recess 713b is the installation surface 713a, and the power module 110 and the smoothing capacitor C2 are received in the installation recess 713b. Three installation recesses 713b are arranged in the circumferential direction γ, and one set of the power module 110 and the smoothing capacitor C2 is received in one installation recess 713b. In the radial direction β, the depth dimension of the installation recess 713b is larger than both the thickness dimension of the power module 110 and the thickness dimension of the smoothing capacitor C2. The installation recess 713b has an inner wall surface 713c extending radially outward from the installation surface 713a. The inner wall surface 713c surrounds the power module 110 and the smoothing capacitor C2 from all sides. The inner wall surface 713c is spaced apart from the power module 110 and the smoothing capacitor C2 in the axial direction α and the circumferential direction γ.

An installation cover 721 is attached to the housing 703 for covering the installation recess 713b from the outside in the radial direction. The power module 110 and the smoothing capacitor C2 received in the installation recess 713b are protected by the installation cover 721. The outer surface of the installation cover 721 is provided with ribs that protrude outward in the radial direction. These ribs enhance the heat dissipation performance and strength of the installation cover 721. Note that, in FIG. 33, the installation cover 721 is not shown.

The electric power conversion device 5 has the control substrate 290 on which the control circuit 9 is formed, and a signal connector 291 mounted on the control substrate 290. The control substrate 290 is formed by mounting an electronic component on a printed board. The control substrate 290 includes a microcomputer as the electronic component. The control substrate 290 is attached to the housing 703 in the similar manner to the power module 110 and the smoothing capacitor C2.

The housing 703 has a substrate accommodating portion 722 accommodating the control substrate 290. The substrate accommodating portion 722 is provided at the end of the housing 703, the end being adjacent to the power module 110 than the smoothing capacitor C2 in the axial direction α. The substrate accommodating portion 722 is provided by a portion protruding from the end surface of the housing 703 in the axial direction α. The substrate accommodating portion 722 provides an internal space opening therein in the axial direction α. The control substrate 290 is installed in the internal space of the board accommodating portion 722 in a direction in which the plate surface is orthogonal to the axial direction α. A substrate cover 723 is attached to the housing 703 to cover the opening of the substrate accommodating portion 722. The control substrate 290 is protected by the substrate cover 723.

The signal connector 291 is attached to the housing 703 in a state of protruding outward in the radial direction from the substrate accommodating portion 722. The signal connector 291 can be connected to a connector of an in-vehicle device, such as an upper ECU. When the signal connector 291 and the connector of the in-vehicle device are connected to each other, signals can be exchanged between the in-vehicle device and the control circuit 9. The signal connector 291 has a connection port to receive the connector of the in-vehicle device, and the connection port faces outward in the radial direction. The connection port of the signal connector 291 may face in the axial direction α or in the radial direction β. For example, the connection port may face in a direction opposite to the installation recess 713b in the axial direction α, or may face toward the inflow pipe 717 in the circumferential direction γ. The shape, installation position, and direction of the connection port of the signal connector 291 are preferably set so that the size of the housing 703 is as small as possible in the radial direction β. In this case, the housing 703 can be reduced in size in the radial direction β.

The power module 110 is installed on the installation surface 713a so that the output bus bar 150 extends toward the substrate accommodating portion 722 in the axial direction α. The housing 703 is formed with a communication hole for allowing communication between the internal space of the installation recess 713b and the internal space of the substrate accommodating portion 722, and the output bus bar 150 of the power module 110 is inserted into the communication hole. The output bus bar 150, which is the output wiring 15, is connected to the stator winding 706 of the motor generator 3 in the substrate accommodating portion 722. The output bus bar 150 reaches the internal space of the substrate accommodating portion 722 by projecting outward from the stator 701 in the axial direction α. The length dimension of the output bus bar 150 in the axial direction α is the same between the respective power modules 110. The connection portion between the output bus bar 150 and the stator winding 706 is covered with the control substrate 290 or the substrate cover 723. The output bus bar 150 corresponds to an output wiring.

The electric power conversion device 5 has an input terminal block 240 to which the connector of the DC power supply 2 is connected. The input terminal block 240 is provided at an end portion of the housing 703 opposite to the substrate accommodating portion 722. The input terminal block 240 has a positive electrode terminal and a negative electrode terminal for electrically connecting the DC power supply 2 and the electric power conversion device 5, and a housing for housing the positive electrode terminal and the negative electrode terminal. The positive electrode terminal and the negative electrode terminal function as, for example, terminals for inputting the DC voltage supplied from the DC power supply 2 to the electric power conversion device 5. Each of the positive electrode terminal and the negative electrode terminal may be formed of one conductive member (for example, bus bar), or may be formed of multiple conductive members electrically connected.

The input terminal block 240 has a connection port to which the connector of the DC power supply 2 can be connected. The connection port faces in the circumferential direction γ. The connection port faces in the circumferential direction γ and in a direction close to the inflow pipe 717, for example. The connection port of the input terminal block 240 may face in the axial direction α or in the radial direction β. The shape, installation position, and orientation of the installation port of the input terminal block 240 are preferably set so that the size of the housing 703 is as small as possible in the radial direction β. In this case, the housing 703 can be reduced in size in the radial direction β.

The electric power conversion device 5 has N bus bars 282 constituting the above-described N line 13 and VH bus bars 284 constituting the above-described VH line 12H. These bus bars 282 and 284 are each formed by processing, for example, pressing a metal plate material having an excellent conductivity such as copper. The N bus bars 282 and the VH bus bars 284 are electrically connected to the power modules 110 and the smoothing capacitors C2. The N bus bar 282 and the VH bus bar 284 are provided on the outer peripheral side of the housing 703 to extend in the axial direction α. The N bus bar 282 and the VH bus bar 284 extend from the smoothing capacitor C2 toward the input terminal block 240 in the axial direction α, and are electrically connected to the input terminal block 240.

(Cooling of Motor Unit)

Figure 34:
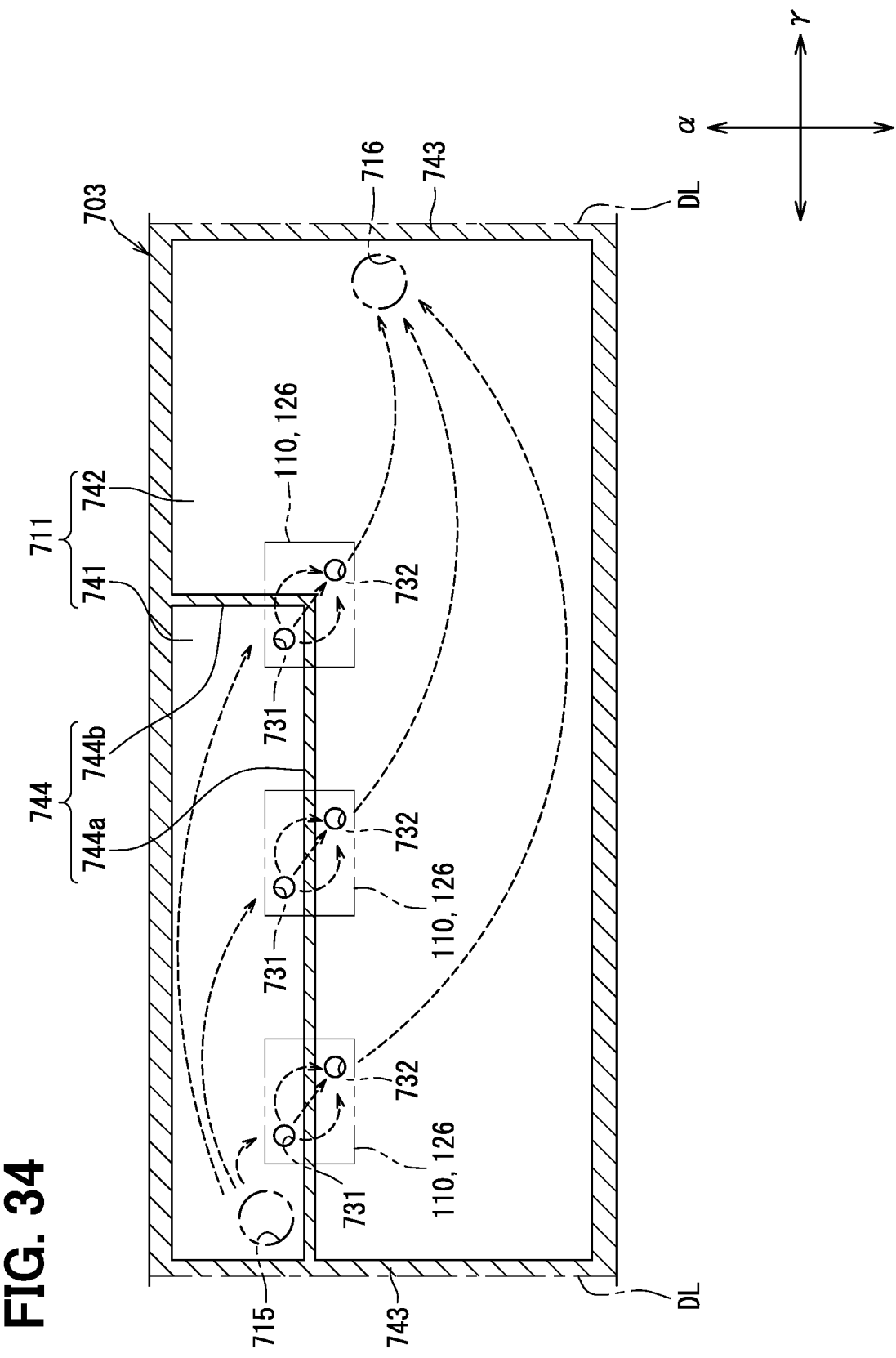
FIG. 34 is a diagram for explaining a configuration of a housing flow path.
Figure 35:
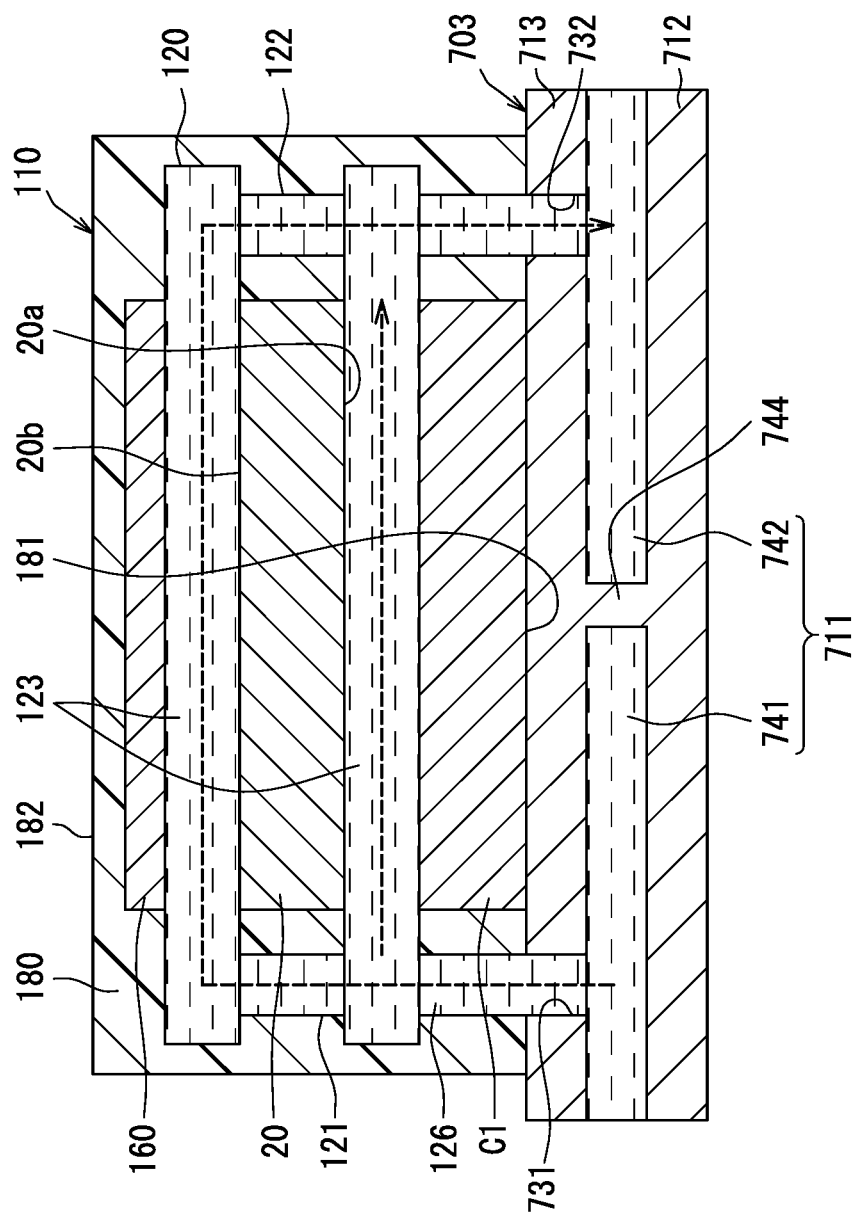
FIG. 35 is a schematic cross-sectional view showing a cooling structure.

Next, the cooling structure of the motor unit 800 will be described with reference to FIGS. 31, 34, and 35. Note that FIG. 34 shows a cross-sectional view of the annular housing 703 taken in the circumferential direction γ and in parallel with the center line CL2, assuming a state in which the annular housing 703 is extended so that the circumferential direction γ corresponds to the horizontal axis. In FIG. 35, for convenience, the power module 110 has one semiconductor device 20.

As shown in FIGS. 31, 34, and 35, the refrigerant flowing through the housing flow path 711 can pass through the cooling unit 120 of the power module 110. In the cooling unit 120, an upstream end portion and a downstream end portion of the flow path 126 are both connected to the housing flow path 711. The housing 703 has a supply hole 731 for supplying the refrigerant from the housing flow path 711 to the power module 110, and a discharge hole 732 for discharging the refrigerant from the power module 110 to the housing flow path 711. The supply hole 731 and the discharge hole 732 are both provided in the outer cooling part 713. The supply hole 731 and the discharge hole 732 are through holes that penetrate the outer cooling part 713 in the radial direction β. One set of the supply hole 731 and the discharge hole 732 is provided for each power module 110.

The supply pipe 121 of the cooling unit 120 is inserted into the supply hole 731, and the supply pipe 121 and the outer cooling part 713 are connected to each other. The discharge pipe 122 of the cooling unit 120 is inserted into the discharge hole 732, and the discharge pipe 122 and the outer cooling part 713 are connected to each other. The connection portion between the supply pipe 121 and the outer cooling part 713, and the connection portion between the discharge pipe 122 and the outer cooling part 713 are each fluid-tightly sealed by an annular elastic member such as an O-ring or a sealing member that is in a liquid state before being cured, by welding or the like.

As shown in FIG. 34, the housing flow path 711 has an inflow region 741 in communication with the inflow hole 715 and an outflow region 742 in communication with the outflow hole 716. In the housing 703, the inflow region 741 and the outflow region 742 are separated from each other. The inflow region 741 and the outflow region 742 are communicated with each other through the flow paths 126 of the power modules 110. In the housing flow path 711, all the supply holes 731 are in communication with the inflow region 741, and all the discharge holes 732 are in communication with the outflow region 742. The housing 703 has partition portions 743 and 744 that partition the housing flow path 711 into the inflow region 741 and the outflow region 742.

Of the partition portions 743 and 744, the first partition portion 743 is provided between the inflow hole 715 and the outflow hole 716. The inflow hole 715 and the outflow hole 716 are arranged in the axial direction α in the outer cooling part 713, and the first partition portion 743 is provided between the inflow hole 715 and the outflow hole 716. In this configuration, the refrigerant that has flowed into the housing flow path 711 from the inflow hole 715 flows around the housing 703 one turn in the circumferential direction γ, and then flows out from the outflow hole 716. Therefore, the entirety of the outer peripheral surface of the stator 701 is easily cooled by the refrigerant flowing through the housing flow path 711. In FIG. 34, the first partition portion 743 is shown to extend straight in the axial direction α. However, in reality, the first partition portion 743 also has a portion inclined with respect to the axial direction α.

Of the partition portions 743 and 744, the second partition portion 744 is provided between the supply holes 731 and the discharge holes 732. In the set of the supply hole 731 and the discharge hole 732, the supply hole 731 and the discharge hole 732 are at least separated from each other in the axial direction α. The supply holes 731 of the respective sets and the discharge holes 732 of the respective sets are arranged parallel to each other in the circumferential direction γ. The second partition portion 744 has a peripheral wall portion 744a extending in the circumferential direction γ and an axial wall portion 744b extending in the axial direction. The peripheral wall portion 744a is provided between each supply hole 731 and each discharge hole 732. The peripheral wall portion 744a is provided at a position close to one of ends of the housing 703, the one being adjacent to the substrate accommodating portion 722 in the axial direction α. In the housing flow path 711 in which the thickness dimension in the radial direction β is uniform, the volume of the inflow region 741 is smaller than the volume of the outflow region 742.

The inflow region 741 and the outflow region 742 both extend in the circumferential direction γ. The plurality of power modules 110 are arranged in the circumferential direction γ in the order of the power module 110 of the U phase, the power module 110 of the V phase, and the power module 110 of the W phase of the inverter 7 as a function of distance from the inflow hole 715.

The power module 110 is provided upstream of the smoothing capacitor C2 with respect to the housing flow path 711. A portion of the housing flow path 711 facing the power module 110 in the radial direction β is arranged upstream of a portion of the housing flow path 711 facing the smoothing capacitor C2 in the radial direction β. The portion facing the power module 110 includes a portion of the inflow region 741 and a portion of the outflow region 742, and the portion facing the smoothing capacitor C2 includes a portion of the outflow region 742. A portion of the outflow region 742 facing the power module 110 is arranged upstream of a portion of the outflow region 742 facing the smoothing capacitor C2 because the portion of the outflow region 742 facing the power module 110 is arranged at a position closer to the discharge hole 732 than the portion facing the smoothing capacitor C2. The inflow region 741 and the outflow region 742 correspond to the portion to which the power modules 110 face, and the outflow region 742 corresponds to the portion to which the smoothing capacitors C2 face.

In the present embodiment, the power module 110 has the cooling unit 120. The power module 110 has a structure shown in FIG. 22. That is, in the power module 110, the capacitor C1, the heat exchange part 123 of the first stage, the semiconductor device 20, the heat exchange part 123 of the second stage, the drive substrate 160 are arranged in this order in the direction away from the one surface 181 of the protective member 180.

As shown in FIG. 35, the semiconductor device 20 has one surface 20a and a rear surface 20b opposite to the one surface 20a in the thickness direction of the semiconductor device 20. In the power module 110, the housing flow path 711 is provided on a side adjacent to the one surface 20a of the semiconductor device 20, and the flow path 126 extends along the rear surface 20b. In this case, the one surface 20a of the semiconductor device 20 and the outer cooling part 713 of the housing 703 opposed with each other with the capacitor C1 and the like interposed therebetween, and the rear surface 20b of the semiconductor device 20 and the one surface of the heat exchange part 123 of the second stage face each other. Further, one surface of the capacitor C1 and the outer cooling part 713 of the housing 703 face each other. The rear surface of the capacitor C1 opposite to the one surface facing the outer cooling part 713 of the housing 703 faces the one surface of the heat exchange part 123 of the first stage in the thickness direction.

In regard to the power module 110, the cooling unit 120 corresponds to a module cooling unit, and the flow path 126 corresponds to a module flow path. Further, the one surface 181 of the protective member 180 corresponds to one surface of the power module 110, and the rear surface 182 of the protective member 180 corresponds to a rear surface of the power module 110.

In the housing flow path 711, the inflow region 741 and the outflow region 742 communicate with each other via the flow path 126 of the power module 110. The inflow region 741, the flow path 126, and the outflow region 742 form one flow path. Therefore, the same refrigerant flows through the flow paths 126 and 711.

In the structure described above, the refrigerant flows as described below. In the housing 703, the refrigerant supplied from the inflow hole 715 into the inflow region 741 of the housing flow path 711 flows through the inflow region 741 toward the supply hole 731, as shown in FIG. 34. Then, the refrigerant flows from the inflow region 741 to the outflow region 742 through the flow path 126 of the power module 110.

Specifically, the refrigerant flows from the inflow region 741 to each of the heat exchange parts 123 of the two stages through the supply pipe 121, and is discharged from the discharge pipe 122 to the outflow region 742. As described above, the supply pipe 121 and the discharge pipe 122 are provided at the diagonal positions with respect to the heat exchange parts 123 having substantially the rectangular planar shape. Further, the supply pipe 121 is located closer to the inflow hole 715 in the circumferential direction γ than the discharge pipe 122. Therefore, the refrigerant flows through the flow paths 126 in the heat exchange parts 123 as shown by the broken line arrows in FIGS. 34 and 35.

The refrigerant that has flowed from the flow paths 126 into the outflow region 742 flows toward the outflow hole 716 while flowing along the smoothing capacitor C2 arranged adjacent to the outer cooling part 713 and along the stator 701 arranged adjacent to the inner cooling part 712, and then flows out from the outflow hole 716. In this case, the refrigerant cools the smoothing capacitor C2 by exchanging heat with the outer cooling part 713 of the housing 703, and cools the stator 701 by exchanging heat with the inner cooling part 712.

(Speed Reducer, Differential Gear)

As shown in FIG. 30, the motor unit 800 includes a unit case 830 accommodating a speed reducer 810 and a differential gear 820, and transmission shaft portions 840a and 840b for transmitting a driving force to left and right wheels. The unit case 830 is provided next to the motor generator 3 in the axial direction α, and is attached to the motor generator 3. In the motor unit 800, the motor generator 3, the speed reducer 810, and the differential gear 820 are aligned in the axial direction α. The center line of the speed reducer 810 and the center line of the differential gear 820 both coincide with the center line CL2 of the rotor 702.

The speed reducer 810 is a device that reduces the rotation speed of the motor generator 3 and outputs the rotation. The speed reducer 810 includes a sun gear 811, a compound planetary gear 812, a fixed gear 813, and a planet carrier 814. The sun gear 811 has a plurality of external teeth extending outward in the radial direction. The sun gear 811 is coaxial with the motor shaft portion 708 of the motor generator 3 and is fixed to the motor shaft portion 708. The sun gear 811 rotates together with the motor shaft portion 708. The sun gear 811 has a sun gear hole 811a coaxial with the sun gear 811 and extending along the center line CL2. The fixed gear 813 has a plurality of internal teeth extending inward in the radial direction, and is fixed to the unit case 830.

The compound planetary gear 812 has a first gear 812a that meshes with the sun gear 811 and a second gear 812b that meshes with the fixed gear 813. The first gear 812a and the second gear 812b both have a plurality of external teeth extending outward in the radial direction. The first gear 812a and the second gear 812b are fixed to each other in a state of being coaxially arranged in the axial direction α, and the second gear 812b rotates together with the first gear 812a. The first gear 812a is a large-diameter gear having a larger diameter than the second gear 812b, and the second gear 812b is a small-diameter gear.

A planetary shaft portion 812c, which is coaxial with the first gear 812a and the second gear 812b, is rotatably fixed to the planet carrier 814. The planetary shaft portion 812c rotates with the rotation of the planet carrier 814, and moves in the circumferential direction γ with the rotation of the sun gear 811. The number of times the planetary shaft portion 812c rotates around the center line CL2 is a value reduced by a predetermined ratio with respect to the rotation speed of the motor shaft portion 708. In the present embodiment, the speed reducer 810 is configured to reduce the rotation speed of the motor shaft portion 708 to output the rotation reduced in speed. Alternatively, the speed reducer 810 may be a speed increaser configured to increase the rotation speed of the motor shaft portion 708 to output the rotation increased in speed.

The differential gear 820 is a differential device that outputs power according to the difference in rotational resistance when the rotational resistance of the wheel is different between the left wheel and the right wheel, and connects the left and right transmission shaft portions 840a and 840b. The differential gear 820 has a differential case 821, a pinion gear 822, and side gears 823a and 823b. The differential case 821 is attached to the planet carrier 814. The pinion gear 822 is rotatably attached to the differential case 821 with its rotation axis orthogonal to the center line CL2, and moves in the circumferential direction γ together with the differential case 821.

The side gears 823a and 823b each have a rotation axis orthogonal to the rotation axis of the pinion gear 822, and are arranged coaxially with each other. The side gears 823a and 823b are coaxially arranged on the motor shaft portion 708 and mesh with the pinion gear 822. Of the side gears 823a and 823b, the first transmission shaft portion 840a is coaxially fixed to the first side gear 823a, and the second transmission shaft portion 840b is coaxially fixed to the second side gear 823b. In the differential gear 820, when the differential case 821 is rotating and the pinion gear 822 is not rotating, the first side gear 823a and the second side gear 823b rotate at the same speed. On the other hand, when the pinion gear 822 rotates, the first side gear 823a and the second side gear 823b rotate at different speeds.

The first side gear 823a is provided on the side opposite to the motor generator 3 with the second side gear 823b interposed therebetween in the axial direction α. The first transmission shaft portion 840a extends from the first side gear 823a in the axial direction α toward the side opposite to the motor generator 3. The second transmission shaft portion 840b extends in the axial direction α from the second side gear 823b toward the motor generator 3. The second transmission shaft portion 840b penetrates the motor generator 3, the speed reducer 810, and the unit case 830, and extends to the side opposite to the first transmission shaft portion 840a with the motor generator 3 interposed therebetween. The second transmission shaft portion 840b is inserted into the motor shaft portion hole 708a and the sun gear hole 811a, and is rotatable inside these holes 708a and 811a.

Bearings 831 and 832 that rotatably support the first transmission shaft portion 840a are attached to the unit case 830. The bearing portions 831, 832 are provided so as to be separated from each other in the axial direction α. For example, the bearing portion 831 is provided at the end of the unit case 830 adjacent to the first transmission shaft portion 840a, and the bearing portion 832 is provided at the end of the unit case 830 adjacent to the second transmission shaft portion 840b.

The speed reducer 810 may have a plurality of rollers that rotate due to friction between the contact surfaces of the gears, in place of or in addition to the plurality of gears that rotate with the teeth meshed with each other. For example, the speed reducer has a sun roller having the function of the sun gear 811, a fixed roller having the function of the fixed gear 813, and a composite planet roller having the function of the composite planetary gear 812. In this configuration, for the purpose of improving the friction effect, the contact surfaces of each of the pair of fixed rollers arranged coaxially with the planetary rollers may be tilted by a predetermined angle with respect to the rotation axis of the planetary rollers, to thereby increase the contact area between the fixed roller and the planetary roller. Further, in a speed reducer in which a planetary roller is interposed between a pair of fixed rollers arranged coaxially, an elastic member that presses the planetary roller toward at least one of the pair of fixed rollers may be provided.

(Effects of Motor Unit)

Next, effects of the motor unit 800 of the present embodiment will be described.

According to the present embodiment, since the inner cooling part 712 of the housing 703 extends along the outer peripheral surface of the stator 701, the stator 701 can be cooled in a wide range by the inner cooling part 712. Therefore, it is possible to suppress the occurrence of abnormalities in the stator 701, such as deterioration of the coating of the stator winding 706 due to high temperature. Further, since the plurality of power modules 110 are individually attached to the housing 703 along the outer cooling part 713, each power module 110 can be arranged at a position as close as possible to the housing flow path 711. That is, each power module 110 can be individually installed at a position and in an orientation such that the cooling effect of the outer cooling part 713 is high. Therefore, the cooling effect can be enhanced for both the motor generator 3 and the electric power conversion device 5.

Moreover, since the plurality of power modules 110 are arranged in the circumferential direction γ, each power module 110 can be arranged adjacent to the one end the housing 703 in the axial direction α. Therefore, when the power module 110 and the stator winding 706 are connected by the board accommodating portion 722 at one end of the housing 703, each power module 110 can be arranged at a position as close as possible to the substrate accommodating portion 722. In this case, since the output bus bar extending from the power module 110 can be shortened as much as possible, the heat generated by the output bus bar 150 can be reduced. As described above, since the heat generated in the motor unit 800 is reduced, the cooling effect in the motor unit 800 can be further enhanced.

In a configuration in which a plurality of power modules 110 are individually attached to the housing 703, there is a concern that the configuration for electrically connecting the power module 110 and the stator 701 is complicated. On the other hand, according to the present embodiment, since the power modules 110 are arranged in the circumferential direction γ, the output bus bars 150 extending from the power modules 110 are extended straight in the axial direction α toward the substrate accommodating portion 722. Therefore, it is not necessary to arrange the output bus bar 150 extending from one power module 110 so as to avoid the other power modules 110. As such, the shape of the output bus bars 150 can be simplified and the installation work of the output bus bars 150 can be facilitated.

Further, the plurality of power modules 110 are arranged in the circumferential direction γ and fixed to the housing 703. Therefore, the motor unit 800 can be reduced in size in the radial direction β, as compared with a configuration in which the power modules 110 are arranged, for example, in the radial direction β and fixed to the housing 703. In addition, the smoothing capacitor C2 and the power module 110 are arranged along the outer peripheral surface of the housing 703. Therefore, for example, the motor unit 800 can be reduced in size in the radial direction β, as compared with a configuration in which the smoothing capacitor C2 and the power module 110 are arranged in the radial direction β. Moreover, since the plurality of smoothing capacitors C2 are arranged along the outer peripheral surface of the housing 703, the motor unit 800 can be reduced in size in the radial direction β, as compared with a configuration in which a plurality of smoothing capacitors C2 are arranged, for example, in the radial direction β.

According to the present embodiment, the output bus bar 150 of the power module 110 extends in the axial direction α and toward the one end of the housing 703. In this configuration, it is possible to easily realize a configuration of arranging the connecting portion electrically connecting the output bus bar 150 and the stator winding 706 at a position outside of the stator 701 in the axial direction α. Therefore, the work load when connecting the output bus bar 150 and the stator winding 706 can be reduced.

According to the present embodiment, the output bus bar 150 extends toward the one of ends of the housing 703, the one being adjacent to the power modules 110 than the other. In this configuration, the length dimension of the output bus bar 150 can be shortened as much as possible. Therefore, it is possible to shorten the output bus bar 150, to facilitate the work of attaching the output bus bar 150 to the housing 703, to reduce the heat generated due to the power loss of the output bus bar 150, and the like.

According to the present embodiment, the smoothing capacitor C2 is attached to the housing 703 in a state of being arranged side by side with the power module 110 in the axial direction α, and the outer cooling part 713 of the housing 703 cools the smoothing capacitor C2 by the refrigerant flowing through the housing flow path 711. In this configuration, since the power module 110 and the smoothing capacitor C2 are both cooled by the outer cooling part 713, the cooling effect of the motor unit 800 can be enhanced. Moreover, since the smoothing capacitor C2 is arranged next to the power module 110 in the axial direction α, the power module 110 can be arranged between the connection terminal of the stator 701 and the smoothing capacitor C2. Therefore, in addition to the simplification of the configuration for electrically connecting the power module 110 and the stator 701, the configuration for electrically connecting the power module 110 and the smoothing capacitor C2 can be simplified.

According to the present embodiment, the plurality of smoothing capacitors C2 are arranged in the circumferential direction γ, similarly to the plurality of power modules 110. In this configuration, in one set of the power module 110 and the smoothing capacitor C2, since the power module 110 and the smoothing capacitor C2 can be arranged at positions as close as possible, the electrical wiring connecting the power module 110 and the smoothing capacitor C2 can be shortened. In addition, the heat generated due to the power loss in the electric wiring can be reduced.

According to the present embodiment, the plurality of smoothing capacitors C2 are arranged along the outer cooling part 713. In this configuration, the separation distance between the smoothing capacitor C2 and the housing flow path 711 can be made as small as possible. That is, the smoothing condensers C2 can be individually installed at positions and in orientations such that the cooling effect by the outer cooling part 713 is enhanced. Therefore, the cooling effect of the smoothing capacitors C2 by the outer cooling part 713 can be enhanced.

According to the present embodiment, the portion of the housing flow path 711 facing the power module 110 is located upstream of the portion of the housing flow path 711 facing the smoothing capacitor C2. In this configuration, the refrigerant cooled by the cooling circuit flows into the housing flow path 711 through the inflow hole 715 and then approaches the power module 110 before the smoothing capacitor C2. In this case, since the power module 110 is cooled by the refrigerant before the refrigerant receiving heat from the smoothing capacitor C2 in the housing flow path 711, the cooling effect of the power module 110 by the refrigerant can be enhanced.

According to the present embodiment, the inflow region 741 and the outflow region 742 are connected through the flow paths 126 of the respective power modules 110. Therefore, it is possible to realize a configuration in which the refrigerant easily flows from the housing flow path 711 into the flow paths 126 of the power modules 110.

According to the present embodiment, the flow paths 126 of the respective power modules 110 are in parallel with each other. In this configuration, the inflow region 741 and the outflow region 742 are connected by each of the three flow paths 126 of the three power modules 110, each power module 110 having one flow path 126. Therefore, the amount of refrigerant flowing from the inflow region 741 into the outflow region 742 is increased, as compared with a configuration in which the inflow region 741 and the outflow region 742 are connected through only one flow path 126. Further, since the pressure loss in each flow path 126 is also reduced, it is possible to easily increase the amount of refrigerant flowing through one flow path 126. Therefore, even if the flow rate of the refrigerant flowing through the flow path 126 of the power module 110 is smaller than that of the housing flow path 711, the amount of the refrigerant flowing from the inflow region 741 into the outflow region 742 through the flow paths 126 of the respective power modules 110 into the outflow region 742 can be increased as much as possible. In this case, since the amount of the refrigerant circulating in the cooling circuit per unit time is unlikely to be insufficient, the cooling effect achieved by the refrigerant flowing in the housing flow path 711 and the flow paths 126 can be enhanced.

According to the present embodiment, the power module 110 is attached to the outer peripheral surface of the housing 703, and the outer cooling part 713 forms at least a part of the outer peripheral surface of the housing 703. In this configuration, the power modules 110 can be cooled by the outer cooling part 713, which can realize the simplification of the structure for fixing the power modules 110 to the housing 703 and can facilitate the mounting work of the power modules 110.

According to the present embodiment, the power module 110 is installed inside the installation recess 713b. In the installation recess 713b, the installation surface 713a and the inner wall surface 713c are both cooled by the refrigerant flowing through the housing flow path 711. In this case, the installation surface 713a can cool the one surface 181 of the power module 110 from the inner side in the radial direction, while the inner wall surfaces 713c of the installation recess 713b can cool the lateral surfaces of the power module 110 in the circumferential direction γ and the axial direction α. Therefore, the cooling effect of the power module 110 installed in the installation recess 713b can be enhanced.

According to the present embodiment, the smoothing capacitor C2 is installed inside the installation recess 713b. In this case, similarly to the power module 110, the installation surface 713a can cool the one surface of the smoothing capacitor C2 from the inner side in the radial direction, while the inner wall surfaces 713c of the installation recess 713b can cool the lateral surfaces of the smoothing capacitor C2 in the circumferential direction γ and the axial direction α. Therefore, the cooling effect of the smoothing capacitor C2 installed in the installation recess 713b can be enhanced.

Further, the housing 703 has an annular shape, and the thickness dimension in the radial direction β is relatively small. Therefore, the temperature distribution of the refrigerant in the radial direction β in the housing flow path 711, specifically, the temperature difference between the inner cooling part 712 and the outer cooling part 713 is less likely to occur. As a result, the stator 701 can be effectively cooled by the inner cooling part 712, and the power modules 110 and the smoothing capacitors C2 can be effectively cooled by the outer cooling part 713.

The power module 110 also includes the cooling unit 120. The flow path 126 of the cooling unit 120 is in communication with the housing flow path 711 so that the refrigerant flows from the housing flow path 711 into the flow path 126 of the cooling unit 120 and flows again into the housing flow path 711 from the flow path 126 of the cooling unit 120. In this way, the refrigerant can be introduced from the housing 703 into the cooling unit 120 inside of the power module 110, and thus the semiconductor device 20 can be cooled inside of the power module 110. The semiconductor device 20 is arranged on the surface of the cooling unit 120. Therefore, the semiconductor device 20 can be effectively cooled. Further, in the cooling unit 120, the capacitor C1 is arranged on the opposite side of the semiconductor device 20. Therefore, the capacitor C1 can also be effectively cooled. The capacitor C1 corresponds to a module capacitor.

In the housing 703, the housing flow path 711 is separated into the upstream region 234a and the downstream region 234b. The flow path 126 of the power module 110 connects the upstream region 741 and the downstream region 742. In such a configuration, the refrigerant easily flows into the flow path 126 of the cooling unit 120. Therefore, the semiconductor device 20 and the capacitor C1 can be cooled more effectively.

Figure 36:
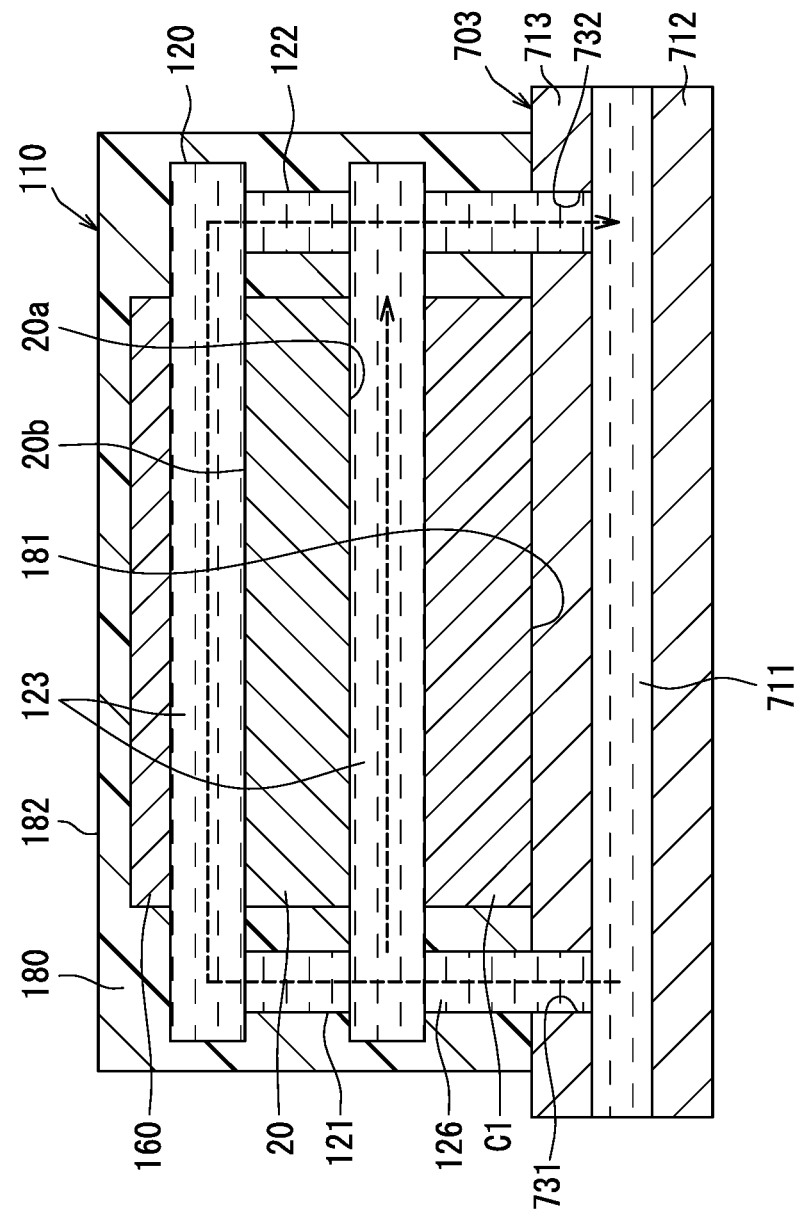
FIG. 36 is a schematic cross-sectional view showing another example of the housing flow path for the cooling structure.

As another example shown in FIG. 36, the power module 110 may be arranged with respect to the housing 703 having the housing flow path 711 that is not partitioned, and the flow path 126 may be connected to the housing flow path 711. For example, the housing flow path 711 is not separated into the inflow region 741 and the outflow region 742. FIG. 36 corresponds to FIG. 35. However, in consideration of the size of the power module 110, the cross-sectional area of the flow path 126 is smaller than that of the housing flow path 711 in the flow direction of the refrigerant. The housing flow path 711 is a main flow path common to the plurality of power modules 110, and the flow path 126 of the cooling unit 120 is a sub flow path. Therefore, as shown in the present example, it is preferable to employ the configuration in which the refrigerant can easily flow into the cooling unit 120.

Although not shown, the housing 703 may, for example, have a connecting region connecting the inflow region 741 and the outflow region 742, and the cross-sectional area of this connecting region may be smaller than the inflow region 741 and the outflow region 742. When the housing 703 has the connecting region, the resistance of the refrigerant flowing from the inflow region 741 to the outflow region 742 is increased, and the refrigerant can easily flow toward the cooling unit 120. However, the configuration shown in the present example is more effective.

Further, the heat exchange parts 123 of the cooling unit 120 are arranged in two stages. That is, the cooling unit 120 is branched into two stages in the Z direction. The cooling unit 120 (the heat exchange parts 123) is provided with inner fins to have a higher heat transfer coefficient than the outer cooling part 713 of the housing 703. The semiconductor device 20 is interposed between the heat exchange parts 123 of the two stages, and the capacitor C1 is arranged on the side opposite to the semiconductor device 20 with respect to at least one of the heat exchange parts 123 of the two stages. In this configuration, the semiconductor device 20 can be cooled by the heat exchange parts 123 of the two stages, on both sides in the Z direction. Therefore, the semiconductor device 20 can be cooled more effectively. Further, the capacitor C1 can be cooled by the heat exchange part 123. Accordingly, the capacitor C1 can be effectively cooled.

Further, the capacitor C1 is arranged on the opposite side to the semiconductor device 20 with respect to the heat exchange part 123 of one of the two stages, and the drive substrate 160 is arranged on the opposite side to the semiconductor device 20 with respect to the heat exchange part 123 of the other one of the two stages. Further, the signal terminals 80 of the semiconductor device 20 is connected to the drive substrate 160. In such a configuration, the drive substrate 160 can be cooled while reducing the size in the direction orthogonal to the Z direction. Moreover, the signal terminals 80 can be shortened. Since the semiconductor device 20 and the drive substrate 160 can be connected in a shorter distance, it is possible to suppress the delay of the on and off timings of the switching elements Q1 and Q2. In addition, noise resistance can be improved.

The electric power conversion device 5 includes the smoothing capacitor C2, in addition to the multiple power modules 110 constituting the inverter 7. The capacitance of the smoothing capacitor C2 is larger than the capacitance of the capacitor C1 of each power module 110. In this way, since the smoothing capacitor C2 is provided separately from the capacitors C1, it is sufficient that the capacitors C1 have a function of supplying the electric charges required for switching the switching elements Q1 and Q2 constituting the upper and lower arm circuits 10 connected in parallel. Therefore, the size of the capacitors C1 can be reduced. Further, since the electric power conversion device 5 has the smoothing capacitor C2, fluctuations of the DC voltage can be suppressed. In the present example, particularly, the capacitor C1 and the upper and lower arm circuit 10 are connected to the VH line 12H and the N line 13 as the electric power lines via the common wirings 11P and 11N. Specifically, the capacitor C1 and the upper and lower arm circuit 10 are connected to the VH bus bar 284 and the N bus bar 282 via the common wiring portions 132 and 142. Therefore, as described above, the surge voltage can be suppressed. The capacitor C1 corresponds to a first capacitor, and the smoothing capacitor C2 corresponds to a second capacitor.

Figure 37:
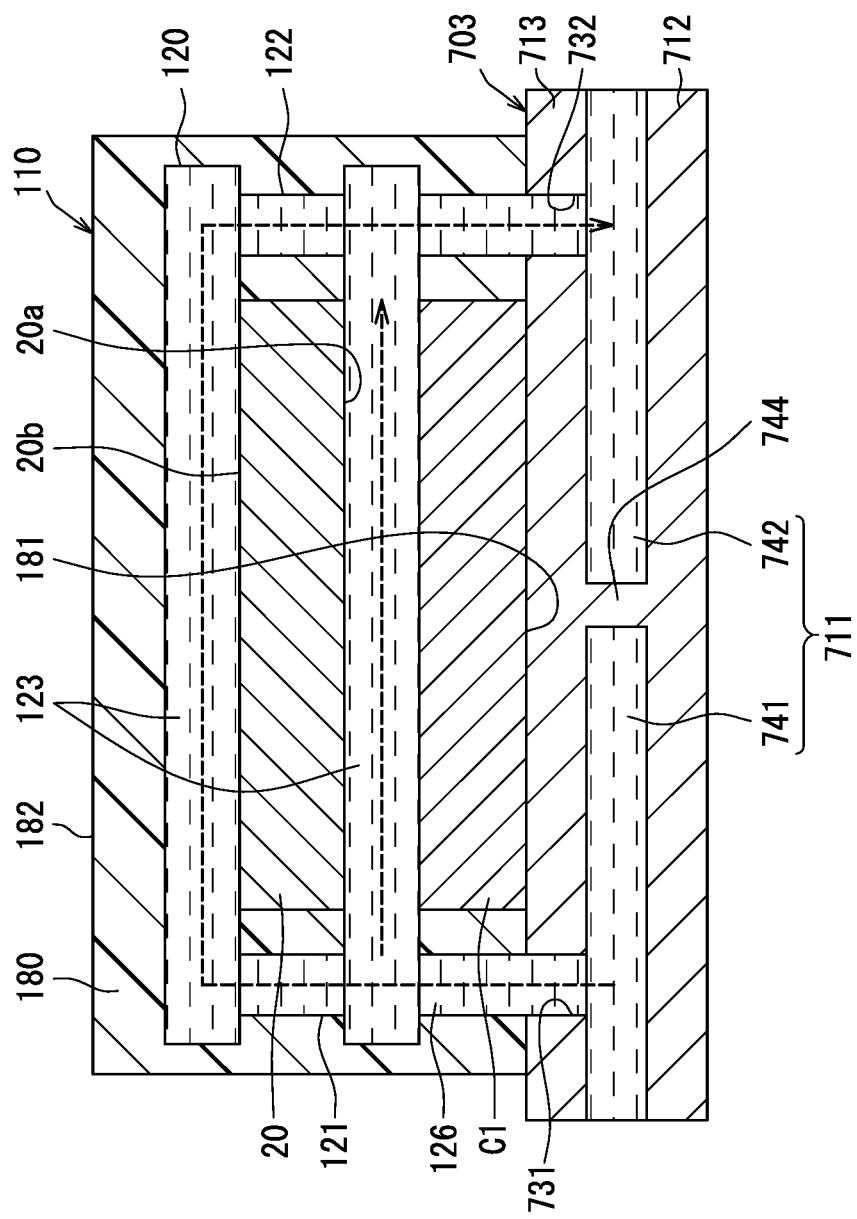
FIG. 37 is a schematic cross-sectional view showing another example of the configuration of a power module for the cooling structure.

The power module 110 employed to the electric power conversion device 5 is not limited to have the configuration shown in the present example. For example, the power module 110 including the semiconductor device 20 of the 2-in-1 package structure as described above can also be adopted. Further, as the main terminals 70, those having various configurations as described above can be adopted. The example in which the power module 110 has the drive substrate 160 has been described. However, the present embodiment is not limited to such an example. Similarly to the control substrate 290, the drive substrate 160 may be provided separately from the power module 110. In such a case, as shown in FIG. 37, the power module 110 is not provided with the drive substrate 160 between the heat exchange part 123 of the second stage and the rear surface 182.

Figure 38:
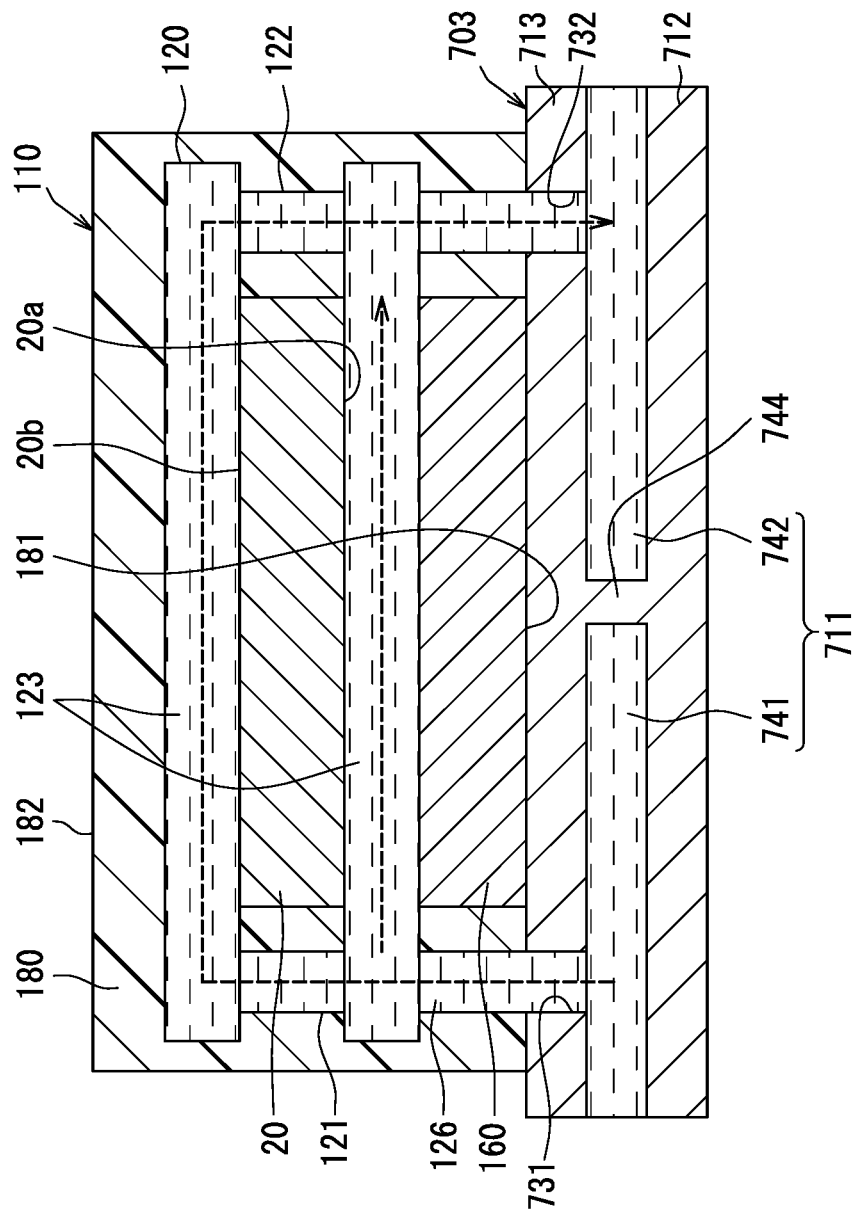
FIG. 38 is a schematic cross-sectional view showing another example of the position of a drive substrate for the cooling structure.

Further, the power module 110 may not have the capacitor C1. In such a configuration, as shown in FIG. 38, the power module 110 has the drive substrate 160, for example, between the heat exchange part 123 of the first stage and the housing 703, in place of the capacitor C1. In this configuration, the drive substrate 160 is cooled by the outer cooling part 713 of the housing 703.

The example in which the semiconductor device 20 is arranged between the heat exchange parts 123 of the two stages in the power module 110 has been described. However, the present embodiment is not limited to such an example. The capacitor C1 may be arranged between the heat exchange parts 123 of the two stages, and the semiconductor device 20 may be arranged between the housing 703 and the heat exchange part 123 of the first stage. However, it is preferable to cool the semiconductor device 20 having a larger temperature change per unit time between the heat exchange parts 123 of the two stages.

The example in which the semiconductor device 20 is arranged adjacent to the housing 703 in the power module 110 has been described. However, the present embodiment is not limited to such an example. The capacitor C1 may be arranged between the heat exchange part 123 and the housing 703. However, it is preferable to cool the semiconductor device 20 having a larger temperature change per unit time between the heat exchange part 123 and the housing 703.

The plurality of power modules 110 arranged in the circumferential direction γ may be displaced in the radial direction β. The power module 110 and the smoothing capacitor C2 may be arranged next to each other in the circumferential direction γ. The plurality of smoothing capacitors C2 may be arranged next to each other in the axial direction α. Further, the plurality of power modules 110 may not be equidistant from the center line CL2 in the radial direction β. Even in this case, it can be regarded that the power modules 110 are still arranged in the circumferential direction γ.

The power module 110 and the smoothing capacitor C2 may not be in a state of extending in the tangential direction orthogonal to the radial direction β, but may be in a state of being inclined with respect to the tangential direction. That is, the one surface 181 of the power module 110 or the one surface of the smoothing capacitor C2 may not be orthogonal to the radial direction β. For example, it is assumed that the power modules 110, which are arranged in the circumferential direction γ, are parallel to each other. In this configuration, on the outer peripheral surface of the housing 703, one of the plurality of power modules 110 is placed in a direction in which the one surface 181 is orthogonal to the radial direction β, and the remaining power modules 110 are placed in a state of being parallel to the one. In this configuration, the plurality of power modules 110 may be arranged in a straight line in the tangential direction. Even in this case, it can be regarded that the power modules 110 are still arranged in the circumferential direction γ.

The number of power modules 110 attached to the housing 703 may be less than three or more than three. Further, the number of smoothing capacitors C2 attached to the housing 703 may not be the same as that of the power modules 110. Further, among the components constituting the electric power conversion device 5, components different from the power modules 110 and the smoothing capacitors C2 may be individually attached to the housing 703.

The inner wall surface 713c of the installation recess 713b may be in contact with the power module 110 and the smoothing capacitor C2 without being separated from the power module 110 and the smoothing capacitor C2 in the radial direction β and the axial direction α. In this case, the cooling effect of the power module 110 and the smoothing capacitor C2 by the inner wall surface 713c, which is a part of the outer peripheral surface of the outer cooling part 713, can be enhanced.

In the housing 703, the installation surface 713a on which the power module 110 and the smoothing capacitor C2 are installed may not be the bottom surface of the installation recess 713b. That is, the power module 110 and the smoothing capacitor C2 may be installed in a state of protruding outward in the radial direction from the outer peripheral surface of the housing 703 without being housed in the installation recess 713b.

The housing flow path 711 may not go around the housing 703 in the circumferential direction γ. For example, the housing flow path 711 may not be provided in the portion of the housing 703 that extends along the flow path 126 of the power module 110. Even in this configuration, the power module 110 can be cooled from the inside by the refrigerant flowing through the flow path 126. Further, the housing flow path 711 may be provided with respect to the end surface of the housing 703. For example, it is assumed that the housing flow path 711 is provided at an end face portion forming the end face of the housing 703. In this configuration, the end face portion serves as a cooling portion having thermal conductivity, and this cooling portion can cool the stator 701 from the outside in the axial direction α. Further, the power module 110 and the smoothing capacitor C2 may be attached to the end face portion.

It is sufficient that at least a part of the power module 110 and at least a part of the smoothing capacitor C2 is aligned with the housing flow path 711 in the radial direction β. Further, the power module 110 and the smoothing capacitor C2 may not be aligned with the housing flow path 711 in the radial direction β. That is, the power module 110, the smoothing capacitor C2, and the housing flow path 711 may be arranged at positions displaced from each other in the radial direction β or the circumferential direction γ.

The housing 703 may have a plurality of the housing flow paths 711. For example, it is assumed that the plurality of housing flow paths 711 are provided so as not to exchange refrigerants with each other. The power modules 110 may be arranged for one of the housing flow paths 711, and the smoothing capacitors C2 may be arranged for the other housing flow path 711.

The housing 703 may have a plurality of the outer cooling parts 713. For example, the power module 110 and the smoothing capacitor C2 may be provided in separate outer cooling parts 713. The plurality of power modules 110 may be individually arranged for the outer cooling parts 713. The plurality of smoothing capacitors C2 may be individually arranged for the outer cooling parts 713.

Second Embodiment

The present embodiment can refer to the preceding embodiment. Therefore, the descriptions of the parts common to the drive system 1, the electric power conversion device 5, the semiconductor device 20, the power module 110, and the motor unit 800 described in the preceding embodiment will be omitted.

Figure 39:
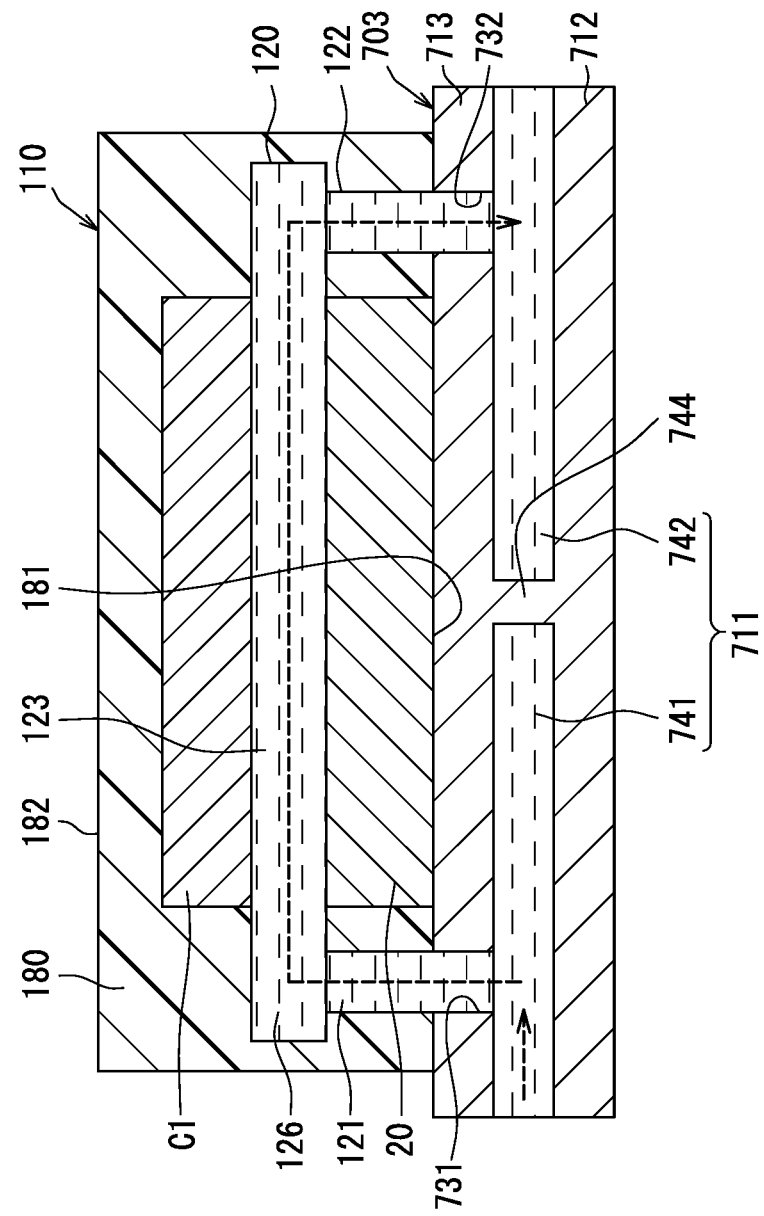
FIG. 39 is a schematic cross-sectional view showing a cooling structure of a motor unit according to a second embodiment.

As shown in FIG. 39, in the present embodiment, the cooling unit 120 of the power module 110 has the heat exchange part 123 of one stage. FIG. 39 corresponds to FIG. 35. Also in the present embodiment, the refrigerant flows from the housing flow path 711 into the flow path 126 of the power module 110. The semiconductor device 20 is arranged between the heat exchange part 123 and the housing 703, and the capacitor C1 connected in parallel to the semiconductor device 20 is arranged on the side opposite to the semiconductor device 20 with respect to the heat exchange part 123. The power module 110 may not have the drive substrate 160. The other configurations are similar to those of the preceding embodiment (for example, see FIG. 35).

Also in the present embodiment, the semiconductor device 20 and the capacitor C1 are thus arranged in the Z direction. Further, the power modules 110 each having such a configuration are arranged on the outer peripheral surface of the housing 703. Therefore, it is possible to reduce the size of the electric power conversion device 5 in the direction orthogonal to the Z direction while enabling the cooling of the semiconductor device 20.

Further, in the same power module 110, the semiconductor device 20 is arranged closer to the housing 703 than the capacitor C1. Therefore, the semiconductor device 20 can be effectively cooled by the refrigerant flowing through the housing 703.

Further, the semiconductor device 20 is arranged between the heat exchange part 123 and the housing 703. Therefore, the semiconductor device 20 can be cooled on both sides in the Z direction by the heat exchange part 123 and the housing 703. As a result, the semiconductor device 20 can be further effectively cooled. The capacitor C1 can also be cooled by the heat exchange part 123.

The heat exchange part 123 is not particularly limited to the configuration shown in FIG. 39. For example, as shown in FIG. 36, it may have a configuration having an undivided housing flow path 711 or a configuration having the above-mentioned connecting region.

Figure 40:
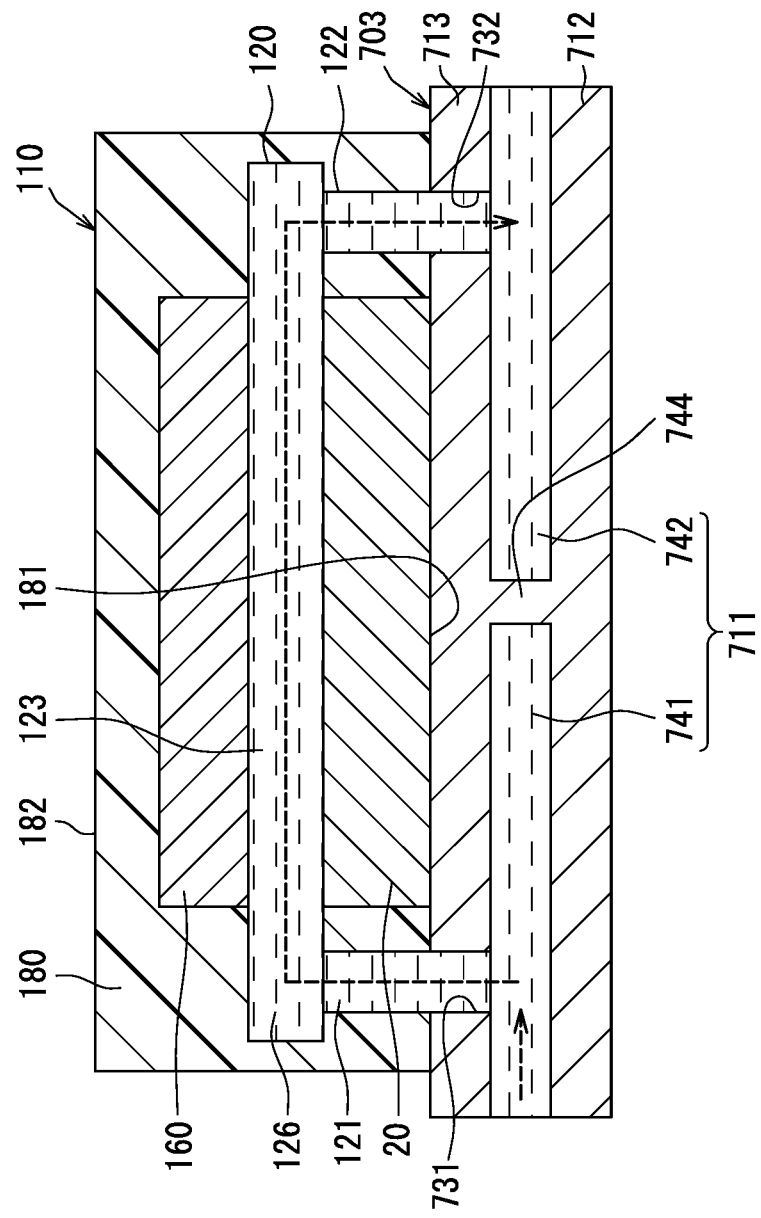
FIG. 40 is a schematic cross-sectional view showing another example of a position of a drive substrate for the cooling structure.
Figure 41:
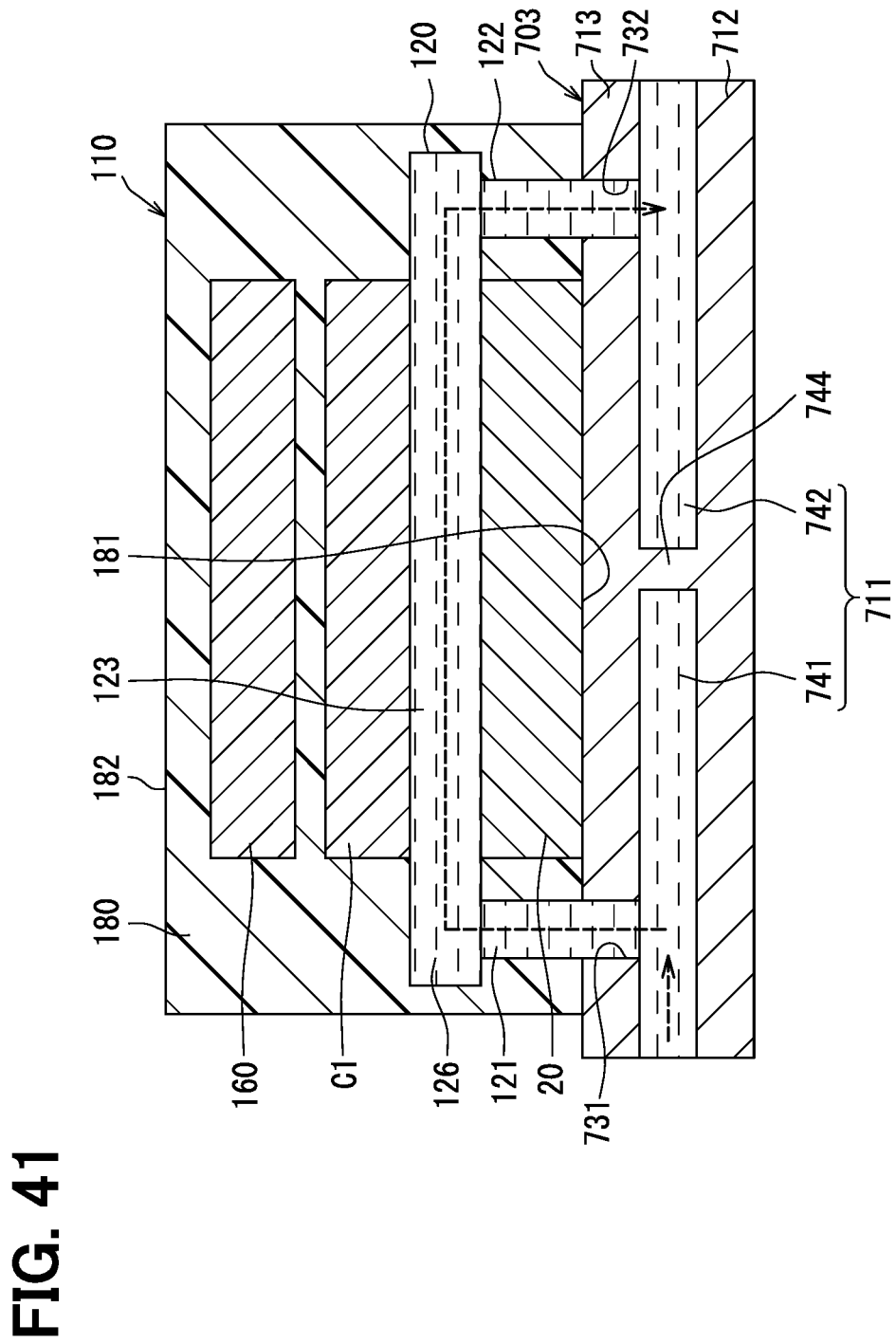
FIG. 41 is a schematic cross-sectional view showing another example of the positions of a capacitor and the drive substrate for the cooling structure.

In the power module 110, the example in which, of the capacitor C1 and the drive substrate 160, only the capacitor C1 is arranged on the side opposite to the semiconductor device 20 with respect to the heat exchange part 123 has been described. However, the present embodiment is not limited to such a configuration. For example, as shown in FIG. 40, the drive substrate 160 may be provided on the side opposite to the semiconductor device 20 with respect to the heat exchange part 123. Further, as shown in FIG. 41, both of the capacitor C1 and the drive substrate 160 may be provided on the side opposite to the semiconductor device 20 with respect to the heat exchange part 123. In this configuration, the capacitor C1 is provided between the heat exchange part 123 and the drive substrate 160.

Third Embodiment

Figure 42:
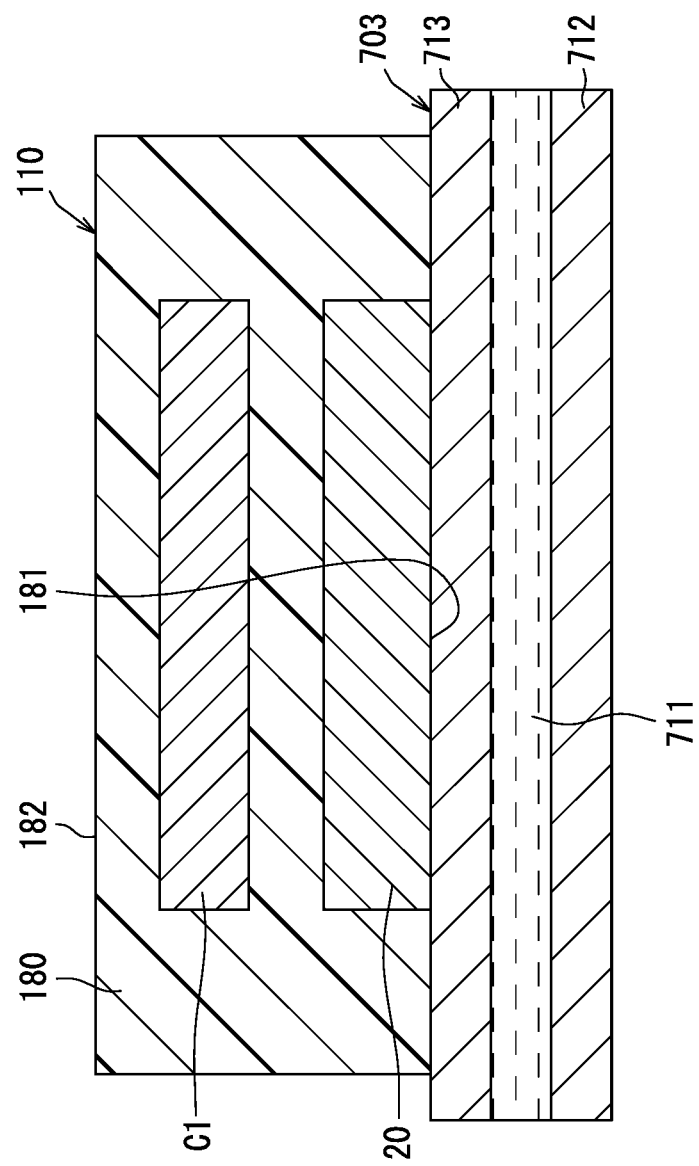
FIG. 42 is a schematic cross-sectional view showing a cooling structure of a motor unit according to a third embodiment.

The present embodiment can refer to the preceding embodiment. Therefore, the description of the parts common to the drive system 1, the electric power conversion device 5, the semiconductor device 20, the power module 110, and the motor unit 800 shown in the preceding embodiment will be omitted. As shown in FIG. 42, in the present embodiment, the power module 110 does not have the cooling unit 120 and the drive substrate 160 described above. Also in this embodiment, the power module 110 is arranged in the outer cooling part 713 of the housing 703. Inside the power module 110, the semiconductor device 20 is arranged adjacent to the outer cooling part 713 of the housing 703. Further, the housing flow path 711 is not separated into the upstream and the downstream. The other configurations are similar to those of the preceding embodiment (for example, see FIG. 35).

Also in the present embodiment, the semiconductor device 20 and the capacitor C1 are arranged in the Z direction as described above. Then, the power module 110 having such a configuration is arranged on the outer cooling part 713 of the housing 703. Therefore, it is possible to reduce the size of the electric power conversion device 5 in the direction orthogonal to the Z direction while enabling the cooling of the semiconductor device 20.

Further, in the same power module 110, the semiconductor device 20 is arranged closer to the outer cooling part 713 of the housing 703 than the capacitor C1. Therefore, the semiconductor device 20 can be effectively cooled by the outer cooling part 713.

The example in which the semiconductor device 20 is arranged adjacent to the outer cooling part 713 in the power module 110 has been described. However, the present embodiment is not limited to such a configuration. The capacitor C1 may be arranged adjacent to the outer cooling part 713. However, it is preferable to cool the semiconductor device 20 having a large temperature change per unit time on the side adjacent to the outer cooling part 713.

Fourth Embodiment

The present embodiment can refer to the preceding embodiment. Therefore, the descriptions of the parts common to the drive system 1, the electric power conversion device 5, the semiconductor device 20, the power module 110, and the motor unit 800 shown in the preceding embodiment will be omitted.

Figure 43:
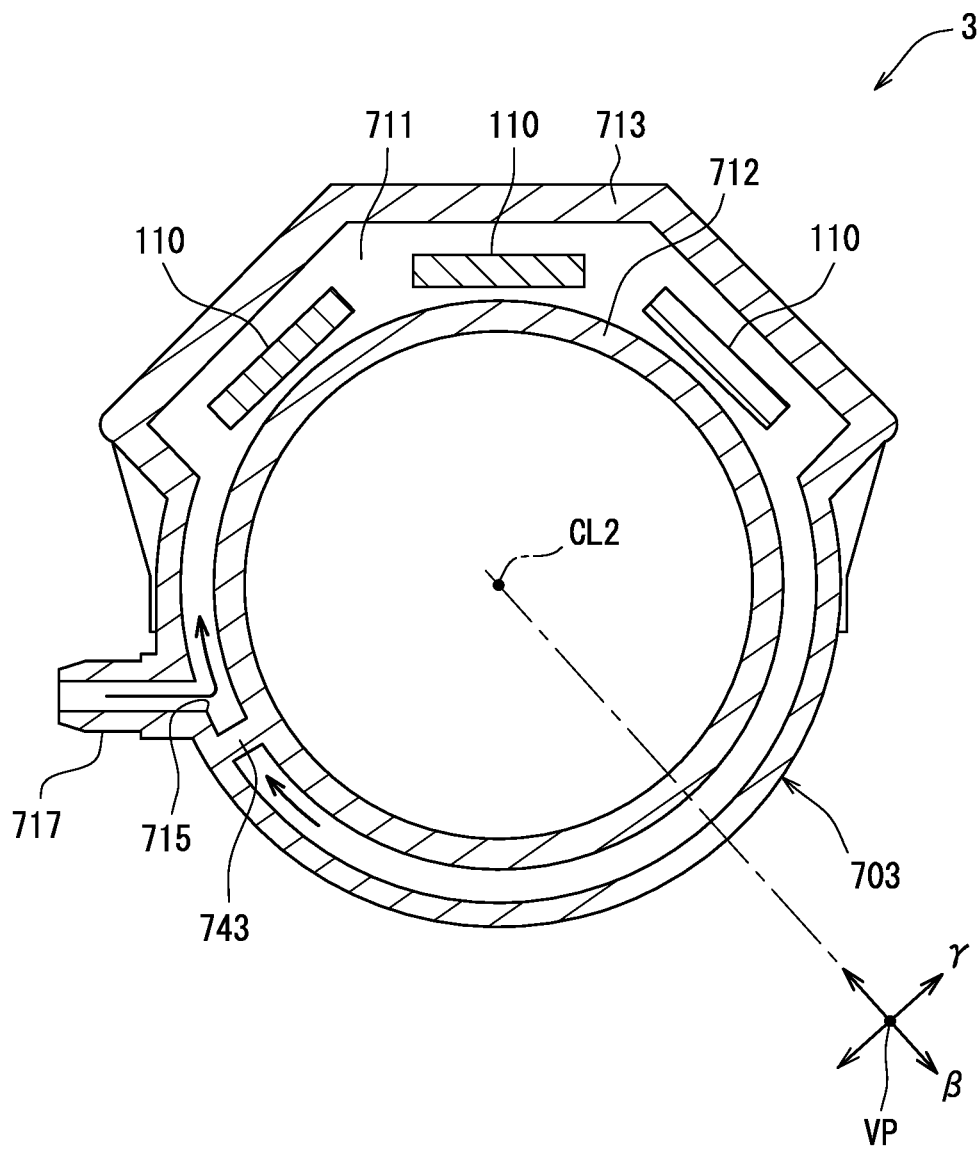
FIG. 43 is a cross-sectional view of a housing taken in a direction orthogonal to an axial direction in a motor unit according to a fourth embodiment.

As shown in FIGS. 43 and 44, in the present embodiment, the power module 110 is accommodated in the housing flow path 711. The power modules 110 are arranged to extend in the axial direction α inside the housing flow path 711. The power modules 110 are separated in a radially outward direction from the inner cooling part 712, and is separated in a radially inward direction from the outer cooling part 713. In the housing flow path 711, the refrigerant flows between the power modules 110 and the inner cooling part 712, as well as between the power modules 110 and the outer cooling part 713. The one surface 181 of the power module 110 faces the inner cooling part 712, and the rear surface 182 of the power module 110 faces the outer cooling part 713. In the housing flow path 711, each of the one surface 181 and the rear surface 182 of the power module 110 is directly cooled by the refrigerant.

In the present embodiment, the housing flow path 711 is not separated into the inflow region 741 and the outflow region 742. The housing 703 has the first partition portion 743, but does not have the second partition 744. Similarly to the first embodiment as described above, the refrigerant flowing from the inflow hole 715 into the housing flow path 711 flows in the housing flow path 711 to go around one turn in the circumferential direction γ, and then flows out from the outflow hole 716. Further, the plurality of power modules 110 are arranged at predetermined intervals in the circumferential direction γ, similarly to the first embodiment described above. Therefore, in the housing flow path 711, the refrigerant flowing from the inflow hole 715 passes through the plurality of power modules 110 one by one in order.

The housing 703 is provided with an insertion hole 703a that allows the power module 110 to be inserted into the housing flow path 711. The insertion hole 703a is provided at one end of the housing 703. The insertion hole 703a penetrates the housing 703 in the axial direction α, and the power module 110 closes the insertion hole 703a in a state of being inserted into the housing flow path 711 through the insertion hole 703a. In the insertion hole 703a, the connection portion between the power module 110 and the housing 703 is hermetically sealed with a sealing material or the like. In this case, at least a part of the power module 110 is immersed in the refrigerant in the housing flow path 711. In particular, the semiconductor device 20 is arranged at a position inside the housing flow path 711 in both the axial direction α and the radial direction β.

Both the output bus bar 150 of the power module 110 and the connection terminal 701d of the stator 701 are arranged adjacent to the one end surface of the housing 703 in the axial direction α. The connection terminal 701d is a terminal extending from the stator winding 706 of the stator 701. The output bus bar 150 and the connection terminal 701d extend in the axial direction α from the power module 110 and the stator 701. In this configuration, the connection between the output bus bar 150 and the connection terminal 701d can be simplified, and the work load for the connection can be reduced. Further, since the output bus bar 150 can be shortened as much as possible, power loss and heat generation in the output bus bar 150 can be suppressed.

According to the present embodiment, the power module 110 is accommodated in the housing flow path 711 in a state where the refrigerant flows along both sides of the power module 110. In this configuration, since both the one surface 181 and the rear surface 182 of the power module 110 are directly cooled by the refrigerant, the cooling effect of the power module 110 by the refrigerant flowing through the housing flow path 711 can be enhanced. Further, in the state where the plurality of power modules 110 are immersed in the refrigerant in the housing flow path 711, all of the power modules 110 are directly cooled by the refrigerant. Therefore, it is possible to suppress that the cooling effect of the refrigerant varies between the power modules 110.

Figure 45:
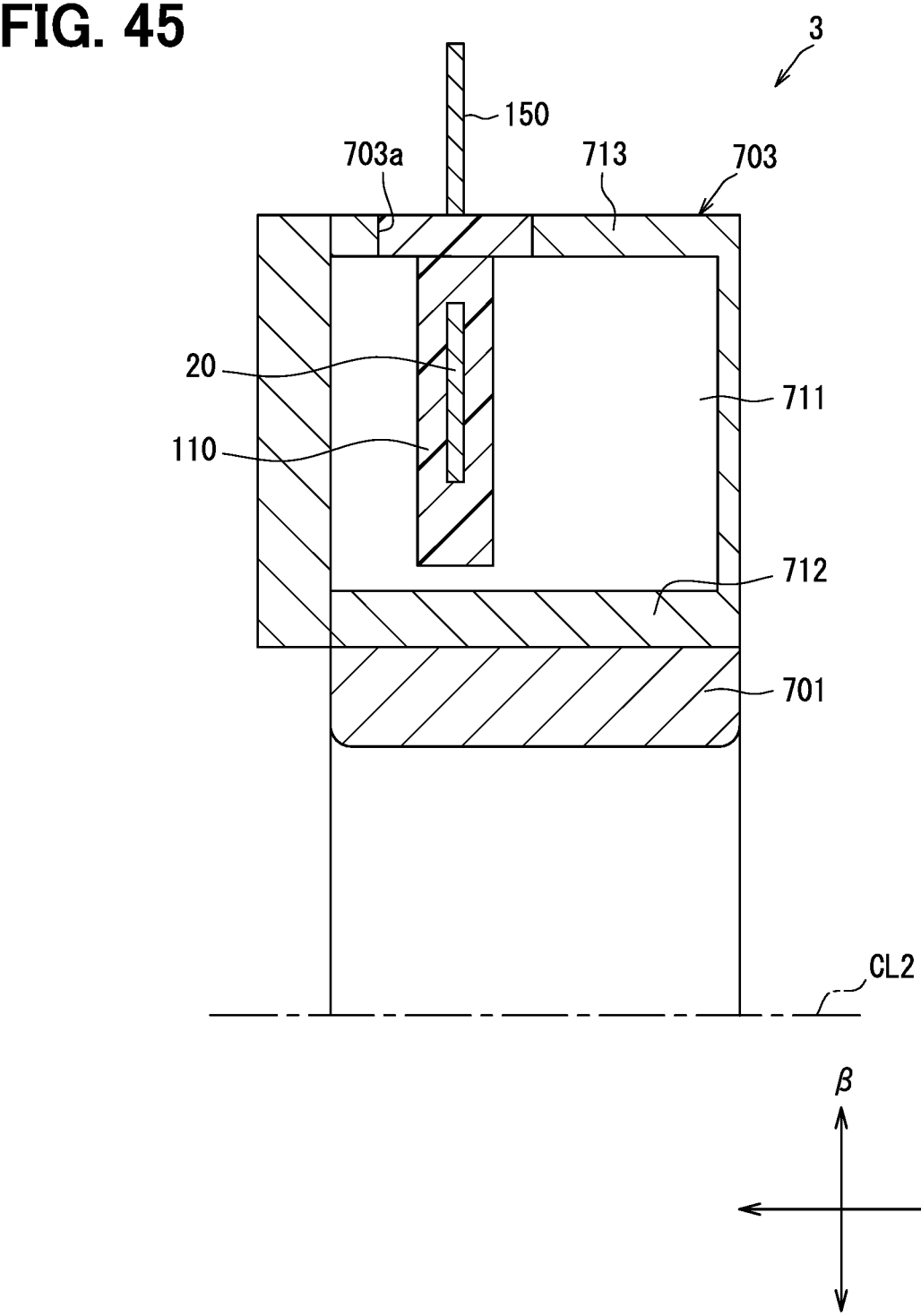
FIG. 45 is a schematic plan view showing another example of arrangement of power modules in a housing flow path.

The power module 110 may be accommodated in the housing flow path 711 in a state of extending in the radial direction α. For example, as shown in FIG. 45, it is assumed that the insertion hole 703a is provided in the outer cooling part 713. In this configuration, the power module 110 is inserted into the housing flow path 711 through the insertion hole 703a in a state of extending in the radial direction β, and the output bus bar 150 is provided radially outside the housing 703. Further, the power module 110 may be housed in the housing flow path 711 in a direction in which the output bus bar 150 is arranged side by side in the housing 703 in the radial direction β.

In the housing flow path 711, the power module 110 may be in contact with at least one of the inner cooling part 712 and the outer cooling part 713. For example, in a configuration in which the power module 110 is in contact with only one of the inner cooling part 712 and the outer cooling part 713, there is a high possibility that the refrigerant does not flow between the one of the inner cooling part 712 and the outer cooling part 713, but the refrigerant flows between the other of the inner cooling part 712 and the outer cooling part 713 and the power module 110. Therefore, the refrigerant can cool the power module 110 from the side adjacent to the other of the inner cooling part 712 and the inner cooling part 713. Further, even in a configuration in which the power module 110 is in contact with both the inner cooling part 712 and the outer cooling part 713, the refrigerant flows away from the power module 110 in the axial direction α, so that the power module 110 can be cooled by the refrigerant.

In the power module 110 of the present embodiment, the entirety of the semiconductor device 20 is located inside the housing flow path 711. Alternatively, only a part of the semiconductor device 20 may be located inside the housing flow path 711. That is, at least a part of the semiconductor device 20 may be located inside the housing flow path 711.

In the present embodiment, the smoothing capacitor C2 is attached to the outer peripheral surface of the housing 703, similarly to the first embodiment described above. On the other hand, the smoothing capacitor C2 may be accommodated inside the housing flow path 711, similarly to the power module 110. Similarly to the power module 110, the smoothing capacitor C2 may be accommodated inside the housing flow path 711 in a state of extending in the axial direction α, or may be accommodated inside the housing flow path 711 in a state of extending in the radial direction β. Further, similarly to the power module 110, the smoothing capacitor C2 may be in contact with at least one of the outer cooling part 713 and the inner cooling part 712.

The housing 703 may not have the outer cooling part 713. That is, the outer peripheral portion of the housing 703 may not have the outer cooling part 713. Also in this case, the housing 703 can be cooled by the refrigerant as long as the smoothing capacitor C2 is accommodated in the housing flow path 711.

Fifth Embodiment

The present embodiment can refer to the preceding embodiment. Therefore, the description of the parts common to the drive system 1, the electric power conversion device 5, the semiconductor device 20, the power module 110, and the motor unit 800 shown in the preceding embodiments such as the fourth embodiment will be omitted.

Figure 46:
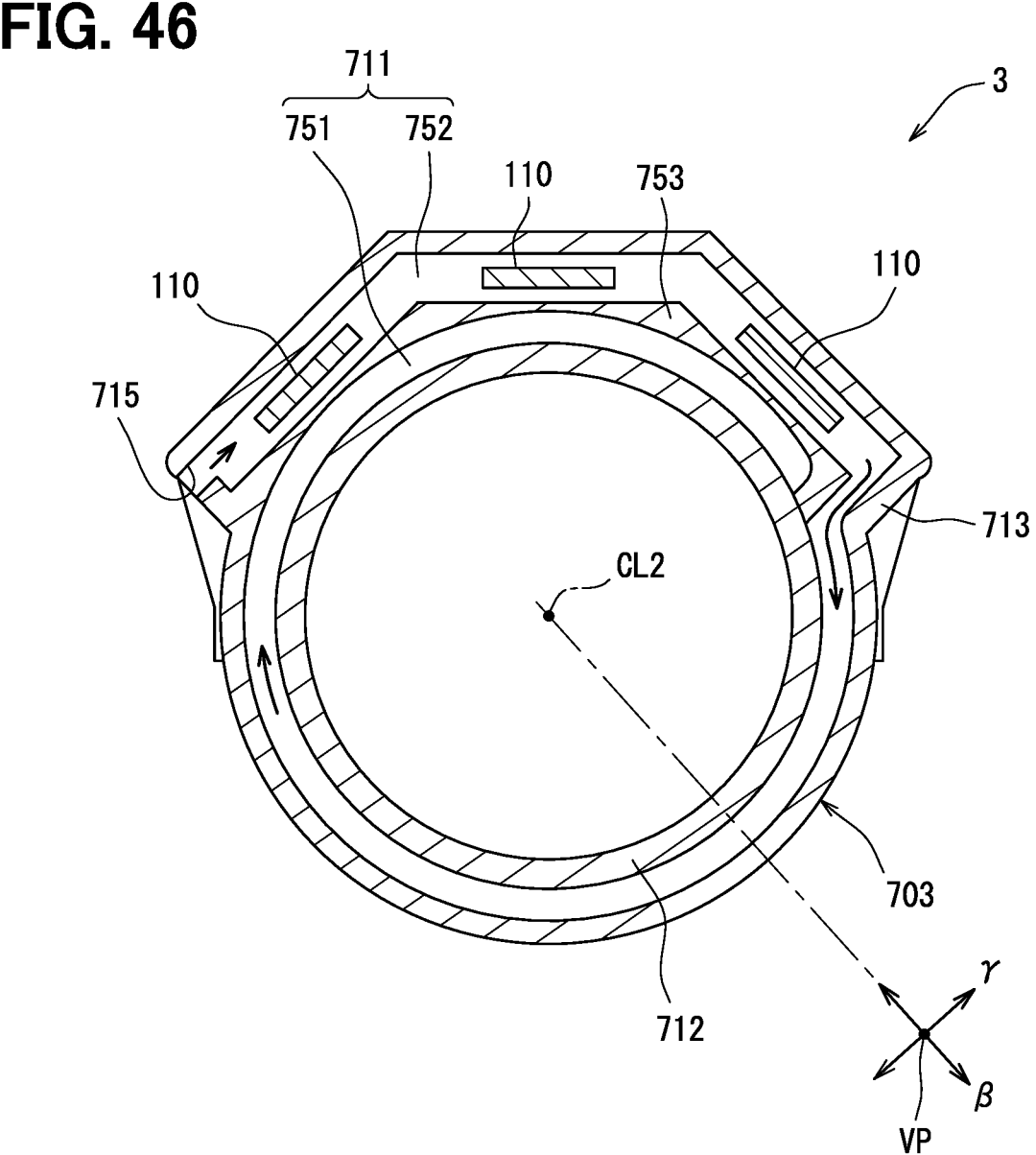
FIG. 46 is a cross-sectional view of a housing taken in a direction orthogonal to an axial direction in a motor unit according to a fifth embodiment.
Figure 47:
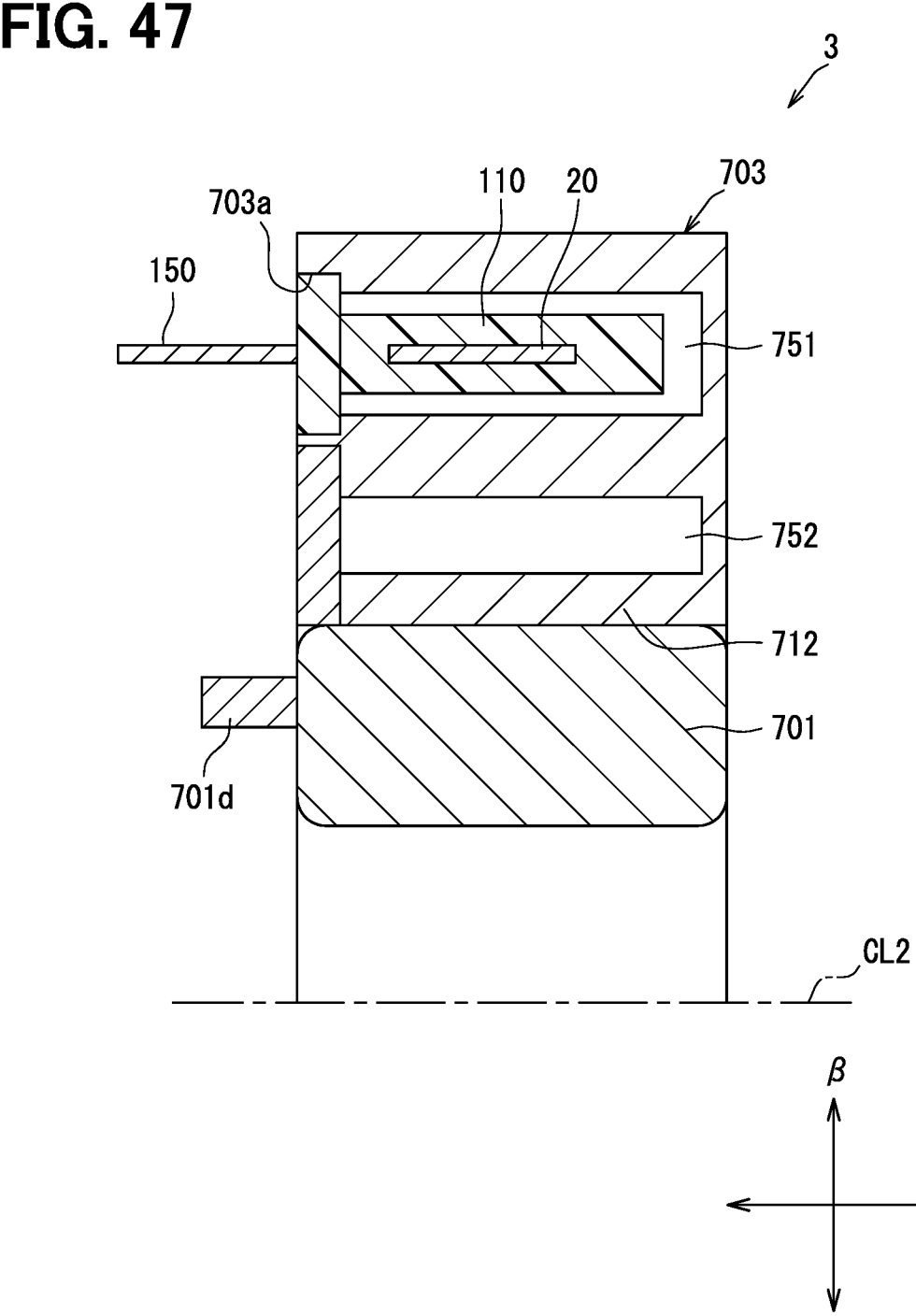
FIG. 47 is a cross-sectional view of a housing around power modules in a direction orthogonal to a circumferential direction.

In the present embodiment, as shown in FIG. 46 and FIG. 47, differently from the fourth embodiment described above, the housing flow path 711 includes an inner flow path 751 and an outer flow path 752 located radially outside the inner flow path 751. The inner flow path 751 and the outer flow path 752 both extend along the radial direction β. The outer flow path 752 is in communication with the inflow hole 715, and the inner flow path 751 is in communication with the outflow hole 716. In the housing flow path 711, the outer flow path 752 is arranged upstream of the inner flow path 751.

The inner flow path 751 has an annular shape that extends one turn in the circumferential direction γ, and the outer flow path 752 has a shape that does not extend one turn around the center line CL2. The outer flow path 752 is arranged next to the inner flow path 751 in the radial direction β. The housing 703 has an inner/outer partition portion 753 that separates the inner flow path 751 and the outer flow path 752. The inner/outer partition portion 753 is provided between the inner flow path 751 and the outer flow path 752 in the radial direction β, and extends in the circumferential direction γ. The inner/outer partition portion 753 is formed of a material having thermal conductivity, similarly to the inner cooling part 712 and the outer cooling part 713.

The plurality of power modules 110 are accommodated in the outer flow path 752 of the housing flow path 711. In this case, the power modules 110 are provided between the inner/outer partition portion 753 and the outer flow path 752 in the radial direction β.

The power module 110 is in a state of extending in the axial direction α inside the outer flow path 752. The power module 110 is separated radially outward from the inner/outer partition portion 753, and is separated radially inward from the outer cooling part 713. In the outer flow path 752, the refrigerant flows between the power module 110 and the inner/outer partition portion 753, as well as between the power module 110 and the outer cooling part 713. The one surface 181 of the power module 110 faces the inner/outer partition portion 753, and the rear surface 182 of the power module 110 faces the outer cooling part 713. In the outer flow path 752, each of the one surface 181 and the rear surface 182 of the power module 110 is directly cooled by the refrigerant.

In the housing flow path 711, the refrigerant flowing from the inflow hole 715 into the outer flow path 752 passes through each power module 110, flows into the inner flow path 751, makes one turn in the circumferential direction γ in the inner flow path 751, and then flows out from the hole 716. Further, the plurality of power modules 110 are arranged at predetermined intervals in the circumferential direction γ, similarly to the first embodiment described above. Therefore, in the outer flow path 752, the refrigerant flowing from the inflow hole 715 passes through the plurality of power modules 110 one by one in order.

According to the present embodiment, the power modules 110 are accommodated in the outer flow path 752 with the refrigerant flowing along both sides of each power module 110. In this configuration, since both the one surface 181 and the rear surface 182 of the power module 110 are directly cooled by the refrigerant, the cooling effect of the power module 110 by the refrigerant flowing through the outer flow path 752 can be enhanced. Further, in the state where the plurality of power modules 110 are immersed in the refrigerant in the outer flow path 752, all of the power modules 110 are directly cooled by the refrigerant. Therefore, it is less likely that the cooling effect of the refrigerant will be varied between the power modules 110.

According to the present embodiment, in the housing flow path 711, the outer flow path 752 for cooling the respective power modules 110 is provided upstream of the inner flow path 751 for cooling the stator 701. In this configuration, the power modules 110 can be cooled by the refrigerant flowing from the inflow hole 715 into the housing flow path 711 in a state where the temperature has not risen. In other words, it is possible to restrict the refrigerant whose temperature has risen due to the cooling of the stator 701 from cooling the power modules 110.

Here, the stator 701 has a relatively low responsiveness to temperature changes, and the power modules 110 have a relatively high responsiveness to temperature changes. That is, the temperature of the stator 701 is less likely to change, but the temperature of the power modules 110 is likely to change as the vehicle travels. The temperature of both the stator 701 and the power module 110 rises as the vehicle travels. However, when the vehicle is temporarily stopped due to a traffic signal or the like, the temperature of the stator 701 hardly drops during such a short stop period, whereas the temperature of the power module 110 drops to some extent even in such a short stop period. Then, when the vehicle starts traveling again, the temperature of the power modules 110 tends to rise sharply. In this case, since the power modules 110 are housed in the outer flow path 752 provided on the upstream side in the housing flow path 711, it is effective for the motor unit 800 at the start of traveling to cool the power modules 110 by the refrigerant whose temperature has not risen.

It is not always necessary that the outer flow path 752 extends along the inner flow path 751 as long as the outer flow path 752 is housed in the housing 703. For example, it is assumed that the inner flow path 751 and the outer flow path 752 are not arranged in the radial direction β. Even in this configuration, if the distance from the inner peripheral surface of the housing 703 in the radial direction β is larger in the outer flow path 752 than in the inner flow path 751, the refrigerant flowing in the outer flow path 752 cools the power modules 110 prior to the stator 701.

As examples of the configuration in which the housing flow path 711 exist on both the one surface 181 and the rear surface 182 of the power module 110, in addition to the configuration of the present embodiment, there is a configuration in which the power modules 110 are arranged between the inner flow path 751 and the outer flow path 752 in the radial direction β. In this configuration, an accommodating portion such as a hole is provided in the inner/outer partition portion 753, and the power module 110 is accommodated in this accommodating portion. In this case, the inner/outer partition portion 753 cools the power module 110 with the refrigerant flowing through the inner flow path 751 and the outer flow path 752.

The present disclosure is not limited to the embodiments illustrated. The present disclosure encompasses the illustrated embodiments and modifications based on the embodiments by those skilled in the art. For example, the disclosure is not limited to the combination of elements shown in the embodiments. The present disclosure may be implemented in various combinations. The plurality of embodiments can be combined without any inconsistency. Each embodiment or an embodiment obtained by combining a plurality of embodiments embodies technical ideas from various viewpoints.

The example in which the electric power conversion device 5 constitutes the inverter 7 for the motor generator 3 and the smoothing capacitor C2 is shown, but the present disclosure is not limited thereto. In the present disclosure, the power modules 110 are necessarily cooled by the refrigerant flowing in the housing flow path 711. The electric power conversion device 5 may be configured to include only the power modules 110 constituting the inverter 7. The electric power conversion device 5 may not have the smoothing capacitor C2 in a case where the capacitors C1 have a function of smoothing the DC voltage. In such a case, in the three-phase inverter, the capacitance of the capacitor C1 of each parallel circuit 11 is, for example, about 300 µF.

Explanations of the reference numerals are added hereinafter. Reference numeral 3 indicates a motor generator as a rotary electric machine. Reference numeral 5 indicates an electric power conversion device. Reference numeral 10 indicates an upper and lower arm circuit. Reference numerals 20, 20U, and 20L indicate semiconductor devices. Reference numeral 20a indicates one surface. Reference numeral 20b indicates a rear surface. Reference numeral 110 indicates a power module. Reference numeral 120 indicates a cooling unit as a module cooling unit. Reference numeral 126 indicates a flow path as a module flow path. Reference numeral 150 indicates an output bus bar as an output terminal. Reference numeral 181 indicates one surface. Reference numeral 182 indicates a rear surface. Reference numeral 701 indicates a stator. Reference numeral 702 indicates a rotor. Reference numeral 703 indicates a housing. Reference numeral 711 indicates a housing flow path. Reference numeral 712 indicates an inner cooling part as a first cooling part and a housing cooling part. Reference numeral 713 indicates an outer cooling part as the second cooling part. Reference numeral 715 indicates an inflow hole. Reference numeral 716 indicates an outflow hole. Reference numeral 741 indicates an inflow region as an opposing portion. Reference numeral 742 indicates an outflow region as an upstream side portion. Reference numeral 751 indicates an inner flow path. Reference numeral 752 indicates an outer flow path. Reference numeral 800 indicates a motor unit as a rotary electric machine unit. Reference numeral C1 indicates a capacitor as a module capacitor. Reference numeral C2 indicates a smoothing capacitor. Reference numeral CL2 indicates a center line. Reference numeral α indicates an axial direction. Reference numeral γ indicates a circumferential direction.

What is claimed is:

1. A rotary electric machine unit, comprising:
   a rotary electric machine that has an annular stator, a rotor disposed on an inner side of the stator, and a housing accommodating the stator and the rotor therein; and
   an electric power conversion device that converts an electric power to be supplied to the rotary electric machine from DC power to AC power, wherein
   the electric power conversion device includes a plurality of power modules each having semiconductor devices constituting an upper arm circuit and a lower arm circuit and being attached to the housing individually from each other,
   the housing includes:
      a housing flow path through which a refrigerant flows, the housing flow path being located on a radially outer side of the stator so that a virtual plane perpendicular to a centerline of the rotor intersects both the housing flow path and a stator core of the stator;
      a first cooling part that extends along an outer peripheral surface of the stator and cools the stator with the refrigerant flowing in the housing flow path, the outer peripheral surface of the stator being a radially outer surface of the stator and extending in a circumferential direction about the centerline of the rotor; and
      a second cooling part that cools the power modules with the refrigerant flowing in the housing flow path and that is disposed on a radially outer side of the housing flow path,
   the plurality of power modules are disposed radially outside of the stator and are arranged along the second cooling part in sequence in the circumferential direction, and
   the second cooling part is configured so that each power module is cooled from opposite sides with the refrigerant.

2. The rotary electric machine unit according to claim 1, wherein
   the power modules each have an output terminal that extends toward an end of the housing in an axial direction along which the centerline extends to output an electric power to the rotary electric machine.

3. The rotary electric machine unit according to claim 2, wherein
   the power modules are arranged at positions adjacent to one of ends of the rotary electric machine, and
   the output terminals extend toward the one of the ends of the rotary electric machine adjacent to the power modules.

4. The rotary electric machine unit according to claim 1, wherein
   the electric power conversion device includes a smoothing capacitor connected in parallel to the upper and lower arm circuits, the smoothing capacitor being attached to the housing at a position next to the power modules in an axial direction along which the centerline extends, and
   the second cooling part cools the smoothing capacitor with the refrigerant flowing through the housing flow path, in addition to the power modules.

5. The rotary electric machine unit according to claim 4, wherein
   the electric power conversion device includes a plurality of the smoothing capacitors, and
   the smoothing capacitors are arranged in the circumferential direction along the housing.

6. The rotary electric machine unit according to claim 5, wherein
   the plurality of smoothing capacitors are arranged along the second cooling part.

7. The rotary electric machine unit according to claim 4, wherein
   the power modules and the smoothing capacitor are arranged along the housing flow path, and
   a region of the housing flow path facing the power modules is located upstream of a region of the housing flow path facing the smoothing capacitor.

8. The rotary electric machine unit according to claim 1, wherein
   the power modules are each attached to the housing in an orientation so that one surface of each semiconductor device is adjacent to the housing flow path,
   the electric power conversion device includes a module cooling unit,
   the module cooling unit is provided in each power module and includes a module flow path through which the refrigerant flows so as to cool the semiconductor device, and
   the module flow path diverges from the housing flow path and extends along a rear surface of the semiconductor device opposite to the one surface in a thickness direction of the semiconductor device.

9. The rotary electric machine unit according to claim 8, wherein
   each power module includes a module capacitor connected in parallel to the upper and lower arm circuits,
   the module capacitor is arranged opposite to the semiconductor device with respect to the module flow path in the thickness direction, and
   the module cooling unit cools the module capacitor with the refrigerant flowing in the module flow path, in addition to the semiconductor device.

10. The rotary electric machine unit according to claim 8, wherein
   the housing is formed with an inflow hole that allows the refrigerant to flow in the housing flow path and an outflow hole that allows the refrigerant to flow out from the housing flow path,
   the housing flow path includes an inflow region in communication with the inflow hole and an outflow region partitioned relative to the inflow region and in communication with the outflow hole, and the inflow region and the outflow region are in communication with each other via the module flow paths of the power modules.

11. The rotary electric machine unit according to claim 10, wherein
the module flow paths are in parallel to each other so that the refrigerant in the inflow region flows into the outflow region via only any one of the module flow paths.

12. The rotary electric machine unit according to claim 10, wherein
the module flow paths are connected in series so that the refrigerant flows from the inflow region to the outflow region via the module flow paths.

13. The rotary electric machine unit according to claim 1, wherein
the power modules are attached to an outer peripheral surface of the housing, and
the second cooling part forms at least a part of the outer peripheral surface of the housing.

14. A rotary electric machine unit, comprising:
a rotary electric machine that has an annular stator, a rotor disposed on an inner side of the stator, and a housing accommodating the stator and the rotor therein; and
an electric power conversion device that converts an electric power to be supplied to the rotary electric machine from DC power to AC power, wherein
the housing includes:
a housing flow path that extends along an outer peripheral surface of the stator and allows a refrigerant to flow therein, the outer peripheral surface of the stator being a radially outer surface of the stator and extending in a circumferential direction about a centerline of the rotor; and
a housing cooling part that defines the housing flow path and that cools the stator with the refrigerant flowing through the housing flow path,
the electric power conversion device includes:
a plurality of power modules that each have semiconductor devices constituting an upper arm circuit and a lower arm circuit and that are attached to the housing individually from each other radially outside of the stator and in sequence in the circumferential direction along the housing flow path, each power module being oriented such that one surface of each semiconductor device is adjacent to the housing; and
a module cooling unit that includes a module flow path that (i) is in communication with the housing flow path, (ii) extends along a rear surface of each semiconductor device opposite to the one surface, and (iii) cools the semiconductor devices with the refrigerant flowing in the module flow path.

15. A rotary electric machine unit, comprising:
a rotary electric machine that has an annular stator, a rotor disposed on an inner side of the stator, and a housing accommodating the stator and the rotor therein; and
an electric power conversion device that converts an electric power to be supplied to the rotary electric machine from DC power to AC power, wherein
the housing includes:
a housing flow path that allows a refrigerant to flow therein and that extends along an outer peripheral surface of the stator so that a virtual plane perpendicular to a centerline of the rotor intersects both the housing flow path and a stator core of the stator, the outer peripheral surface of the stator being a radially outer surface of the stator and extending in a circumferential direction about the centerline of the rotor; and
a housing cooling part that defines the housing flow path and that cools the stator with the refrigerant flowing through the housing flow path,
the electric power conversion device includes a plurality of power modules that each include semiconductor devices constituting an upper arm circuit and a lower arm circuit, each of the semiconductor devices having one surface and a rear surface opposite to the one surface in a thickness direction, and
the plurality of power modules are attached to the housing individually from each other and are arranged in sequence in the circumferential direction along the housing flow path such that the housing flow path exists on both the one surface and the rear surface of each semiconductor device and each semiconductor device is cooled with the refrigerant flowing in the housing flow path.

16. The rotary electric machine unit according to claim 15, wherein
each of the power modules is accommodated in the housing flow path at least at a part so that the housing flow path exists on both the one surface and the rear surface of each semiconductor device and the semiconductor device is cooled with the refrigerant flowing in the housing flow path.

17. The rotary electric machine unit according to claim 16, wherein
the housing flow path includes an inner flow path extending along an inner peripheral surface of the housing and an outer flow path located upstream of the inner flow path and on an outer side of the inner flow path, and
the power modules are accommodated in the outer flow path.

* * * * *